(12) United States Patent  
Thompson

(10) Patent No.: US 7,403,542 B1  
(45) Date of Patent: Jul. 22, 2008

(54) METHOD AND SYSTEM FOR PROCESSING NETWORK DATA PACKETS

(75) Inventor: Michael I. Thompson, Colfax, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 792 days.

(21) Appl. No.: 10/620,040

(22) Filed: Jul. 15, 2003

Related U.S. Application Data

(60) Provisional application No. 60/397,419, filed on Jul. 19, 2002.

(51) Int. Cl.  
*H04J 3/24* (2006.01)

(52) U.S. Cl. .................. 370/474; 370/389; 370/412; 709/250

(58) Field of Classification Search ............ 370/474, 370/351, 360, 392, 394, 389, 395.52, 395.71, 370/469, 471, 476, 463; 709/202, 230, 232, 709/235, 236, 243, 245, 250; 710/1, 52  
See application file for complete search history.

(56) References Cited

U.S. PATENT DOCUMENTS

| | | | | |
|---|---|---|---|---|
| 5,937,169 | A | 8/1999 | Connery et al. | ......... 395/200.8 |
| 6,246,683 | B1 | 6/2001 | Connery et al. | ............ 370/392 |
| 6,247,060 | B1 | 6/2001 | Boucher et al. | ............ 709/238 |
| 6,334,153 | B2 | 12/2001 | Boucher et al. | ............ 709/230 |
| 6,373,841 | B1 * | 4/2002 | Goh et al. | .................. 370/389 |
| 6,389,479 | B1 | 5/2002 | Boucher et al. | ............ 709/243 |
| 6,393,487 | B2 | 5/2002 | Boucher et al. | ............ 709/238 |
| 6,427,171 | B1 | 7/2002 | Craft et al. | .................. 709/230 |
| 6,427,173 | B1 | 7/2002 | Boucher et al. | ............ 709/238 |
| 6,434,620 | B1 * | 8/2002 | Boucher et al. | ............ 709/230 |
| 6,470,173 | B1 | 10/2002 | Okada et al. | .................. 455/82 |
| 6,470,415 | B1 | 10/2002 | Starr et al. | .................. 711/104 |
| 6,526,446 | B1 * | 2/2003 | Yang et al. | .................. 709/230 |
| 6,591,302 | B2 | 7/2003 | Boucher et al. | ............ 709/230 |
| 6,687,757 | B1 * | 2/2004 | Ben-Ze'ev et al. | .......... 709/250 |
| 6,791,947 | B2 * | 9/2004 | Oskouy et al. | ............... 370/238 |
| 7,076,568 | B2 * | 7/2006 | Philbrick et al. | ............ 709/250 |
| 7,103,317 | B2 * | 9/2006 | Chang et al. | ............... 455/66.1 |
| 7,149,226 | B2 * | 12/2006 | Wolrich et al. | ............... 370/412 |
| 7,167,927 | B2 * | 1/2007 | Philbrick et al. | ............ 709/250 |
| 2001/0053150 | A1 * | 12/2001 | Clear et al. | .................. 370/392 |
| 2002/0062333 | A1 * | 5/2002 | Anand et al. | ................. 709/105 |
| 2002/0095519 | A1 * | 7/2002 | Philbrick et al. | ............ 709/250 |
| 2002/0156908 | A1 * | 10/2002 | Basso et al. | .................. 709/231 |
| 2002/0174244 | A1 * | 11/2002 | Beckwith et al. | ............ 709/231 |
| 2003/0046330 | A1 * | 3/2003 | Hayes | ........................ 709/201 |

(Continued)

*Primary Examiner*—Ricky Ngo  
*Assistant Examiner*—Gary Mui  
(74) *Attorney, Agent, or Firm*—Klein, O'Neill & Singh, LLP

(57) ABSTRACT

A system for transmitting and receiving TCP/IP data packets using a hardware engine is provided. The system includes an inbound MAC Receive state machine for processing MAC frames received from a network; an inbound IP verifier state machine for verifying IP packet headers; an inbound IP fragment processing state machine for processing and reassembling IP fragments; and an inbound TCP state machine for processing TCP segments received from an IP layer. The system also includes an outbound MAC Transmit state machine that sends MAC frames to a network; an outbound IP state machine that processes IP data to be passed to a MAC layer for transmission; and an outbound TCP state machine that processes TCP data to be passed to the IP layer for transmission.

17 Claims, 51 Drawing Sheets

U.S. PATENT DOCUMENTS

2003/0046418 A1* 3/2003 Raval et al. ................. 709/237
2003/0058889 A1* 3/2003 Lansing et al. .............. 370/471
2003/0108066 A1* 6/2003 Trippe ....................... 370/474
2003/0196081 A1* 10/2003 Savarda et al. .............. 713/153
2003/0231625 A1* 12/2003 Calvignac et al. ........... 370/389
2006/0209897 A1* 9/2006 Joung ........................ 370/474

* cited by examiner

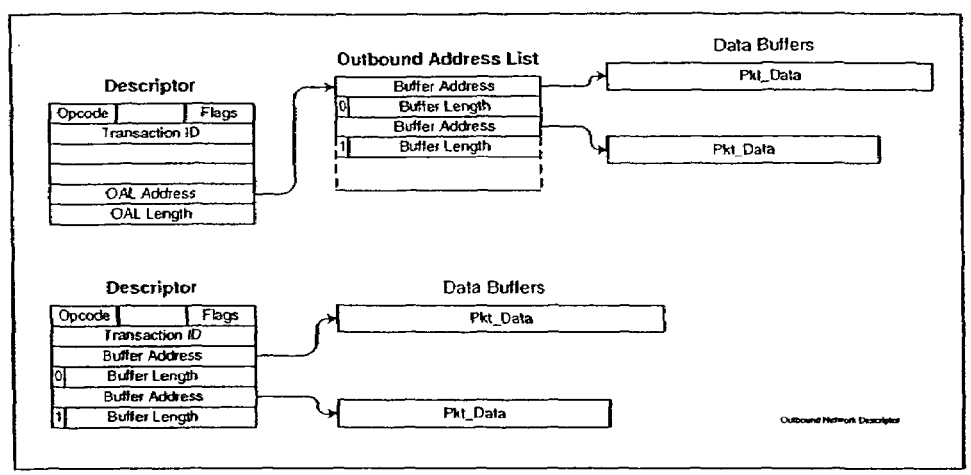
Figure 3A-1 Network IOCB Example

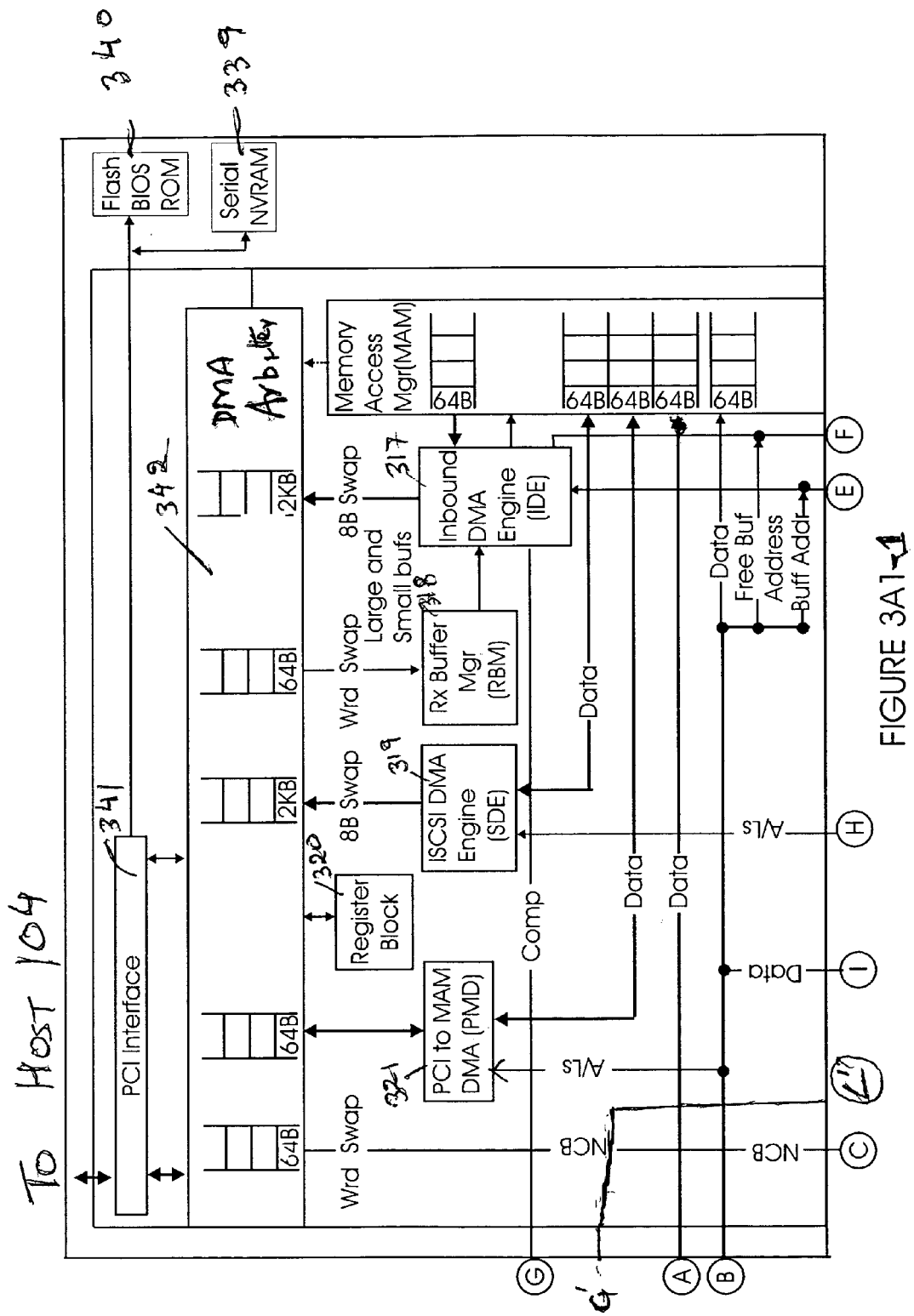
FIGURE 3A1-1

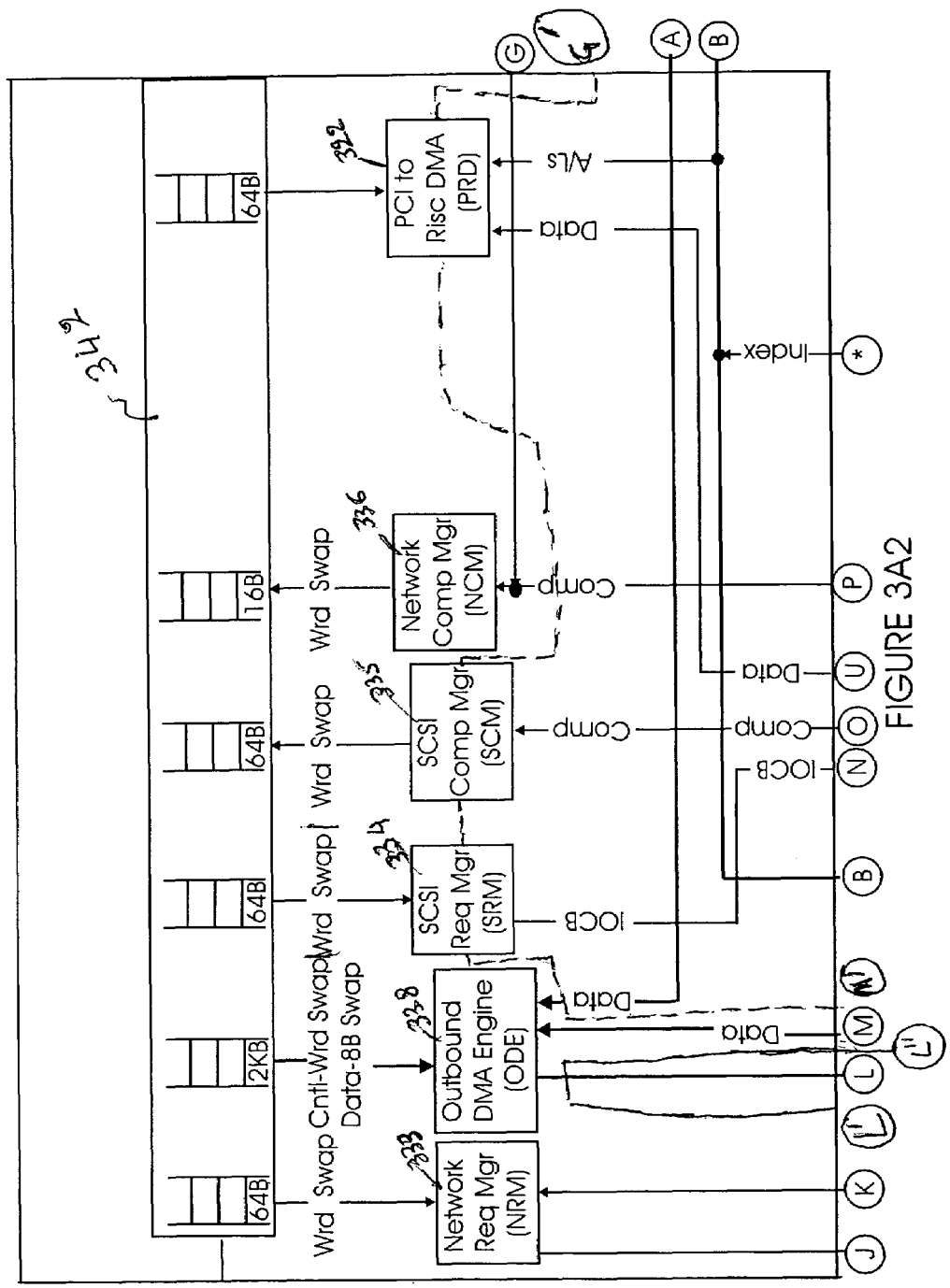
FIGURE 3A2

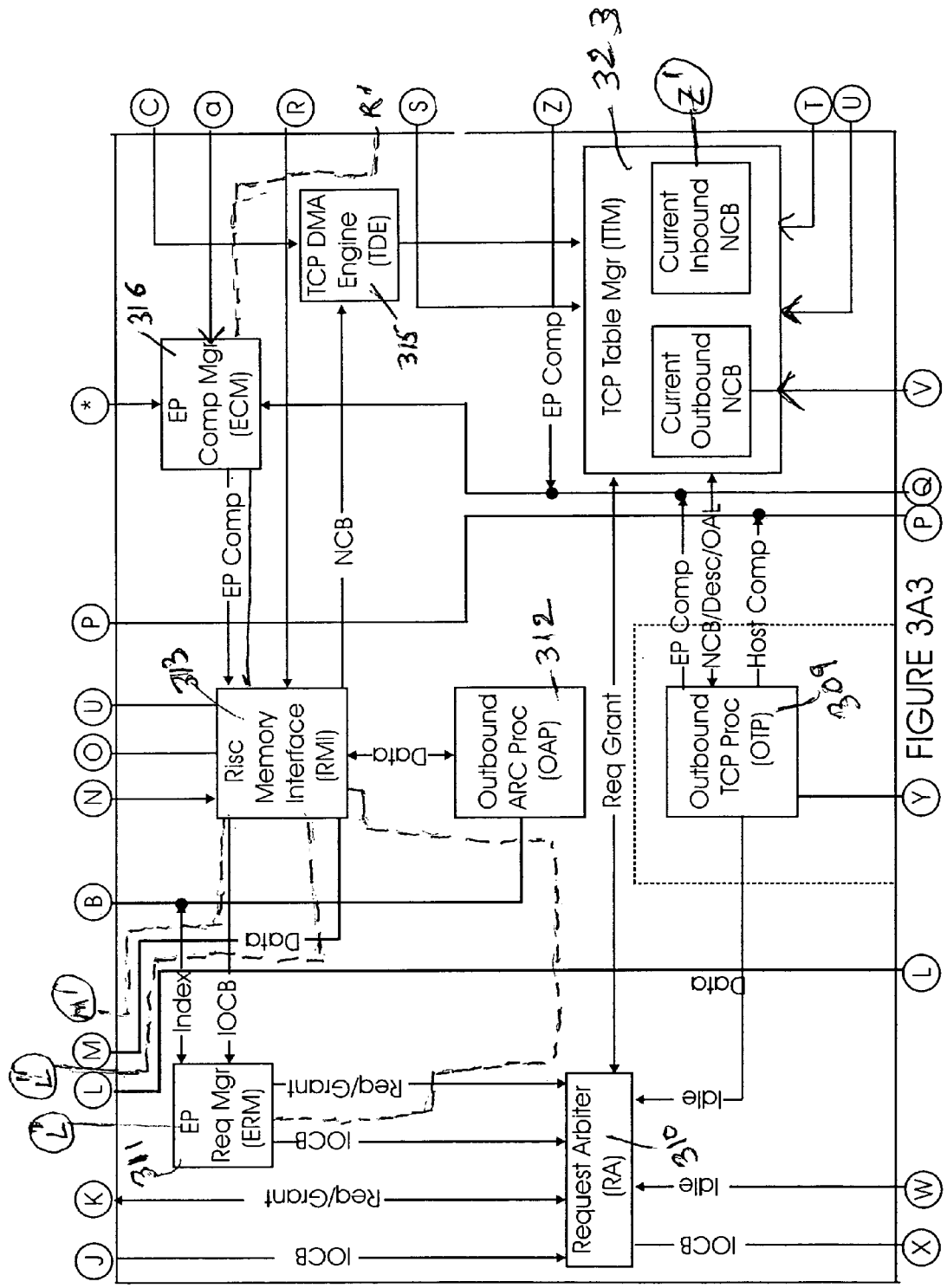
FIGURE 3A3

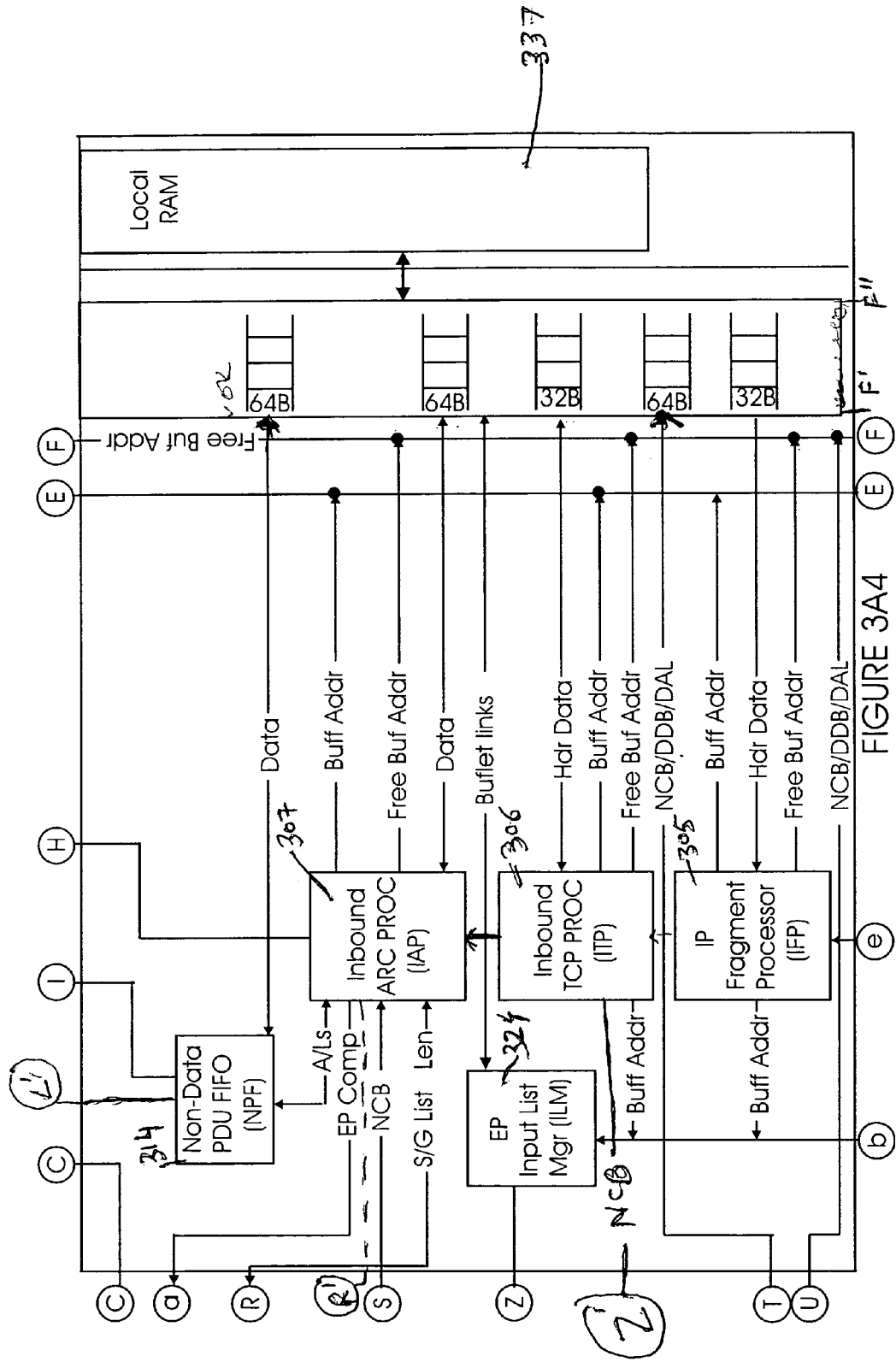
FIGURE 3A4

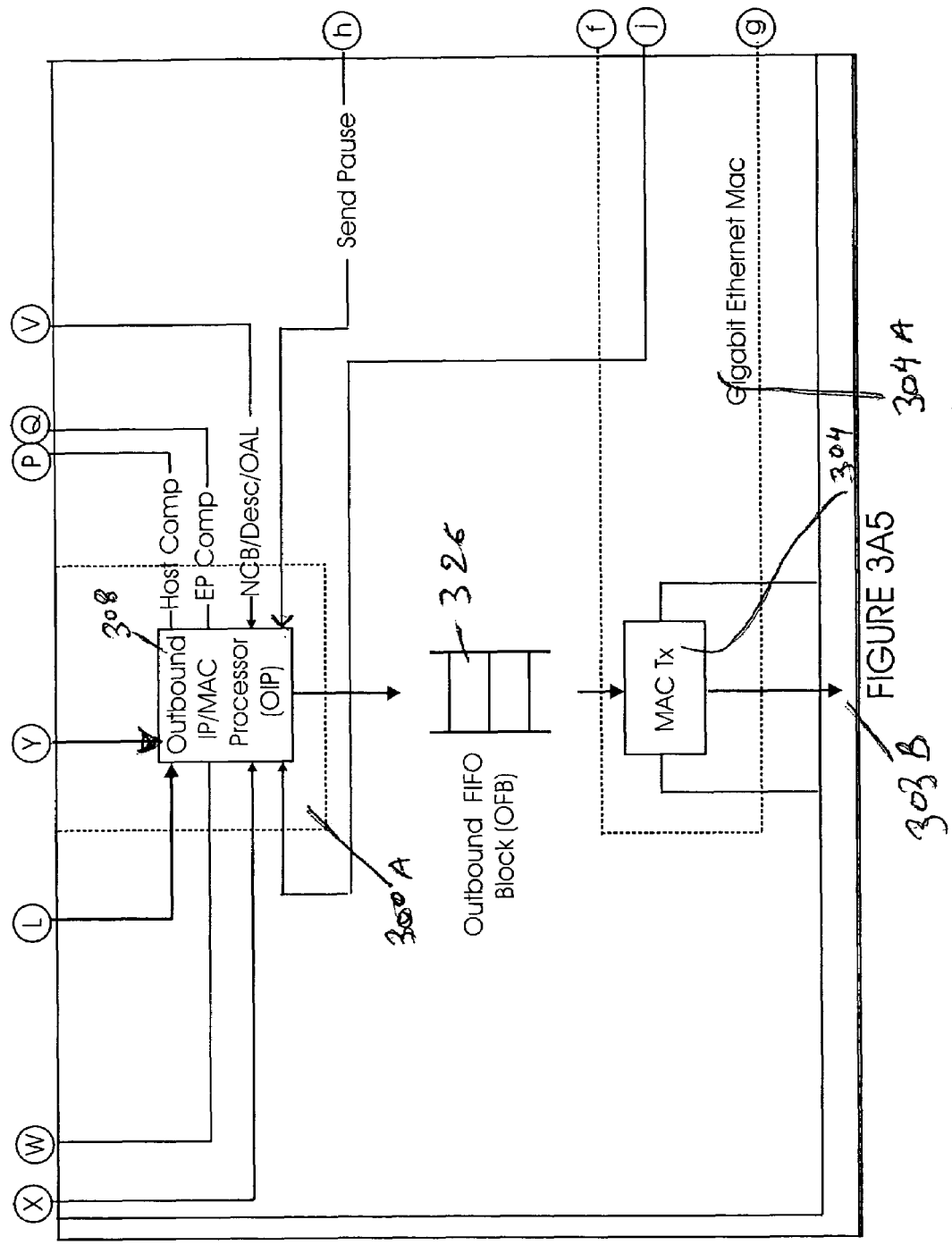

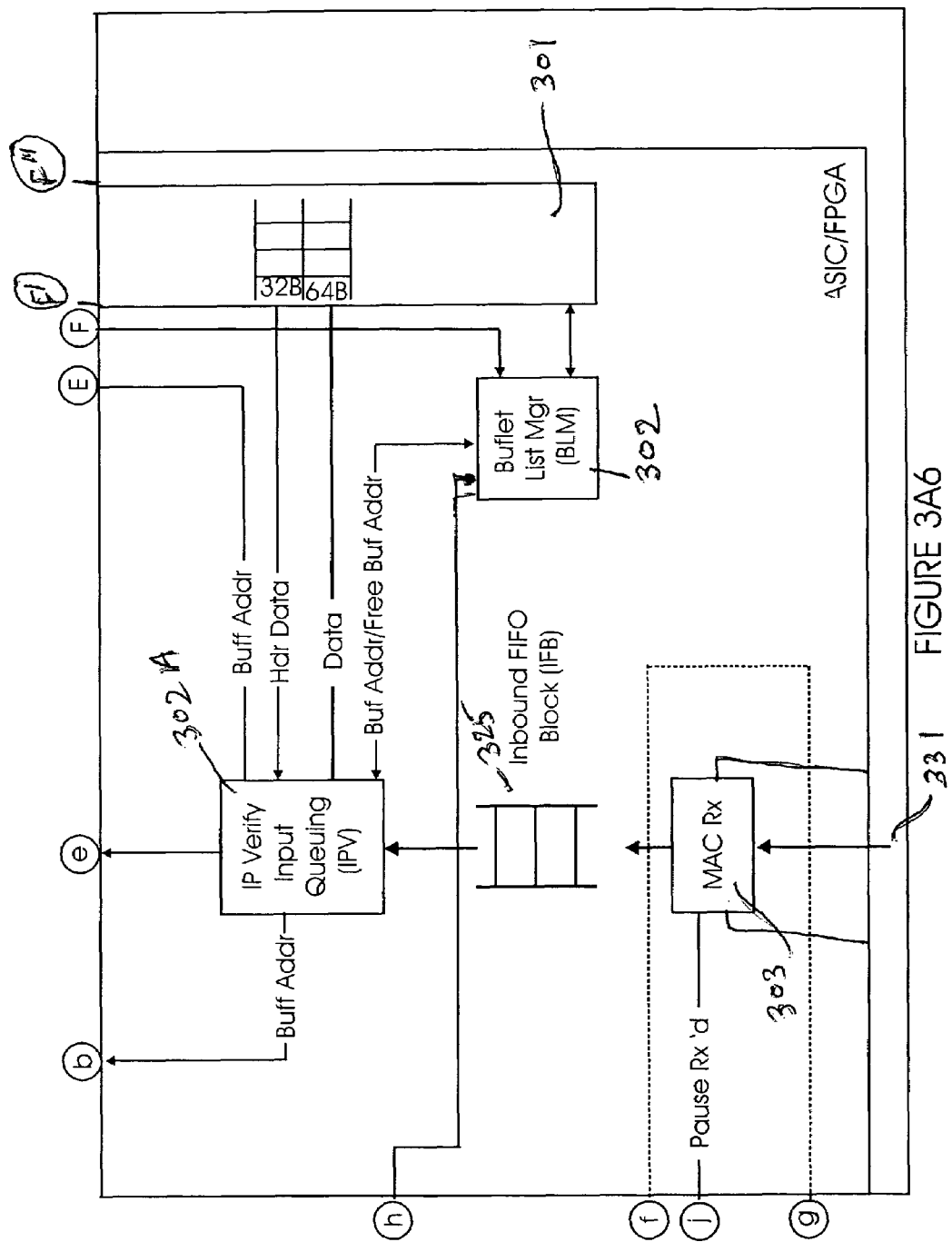
FIGURE 3A6

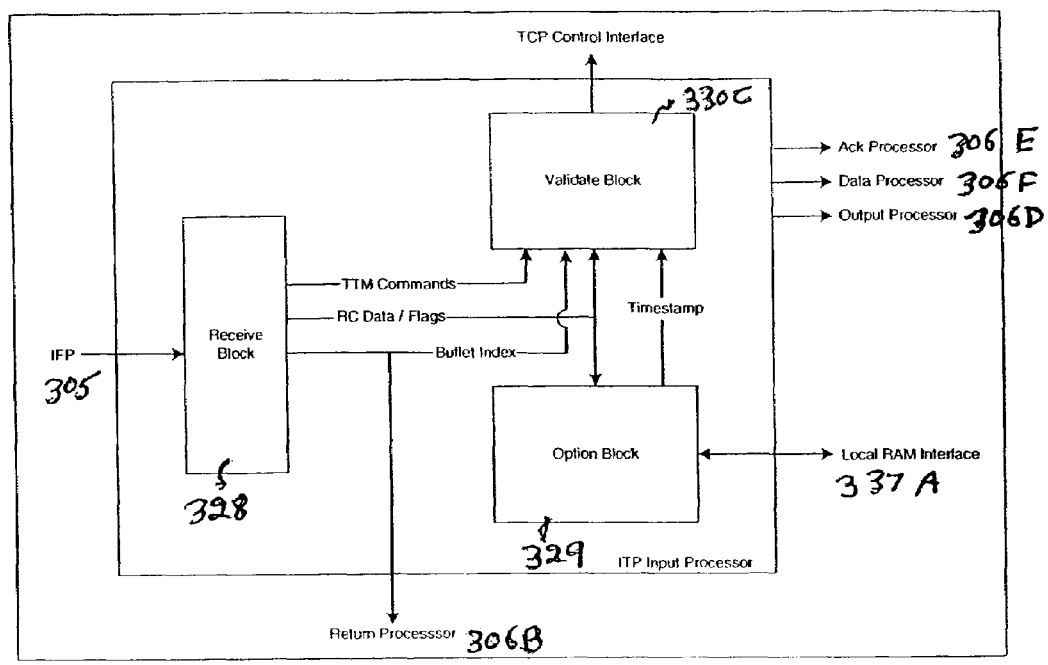
Figure 3C – ITP Input Processor

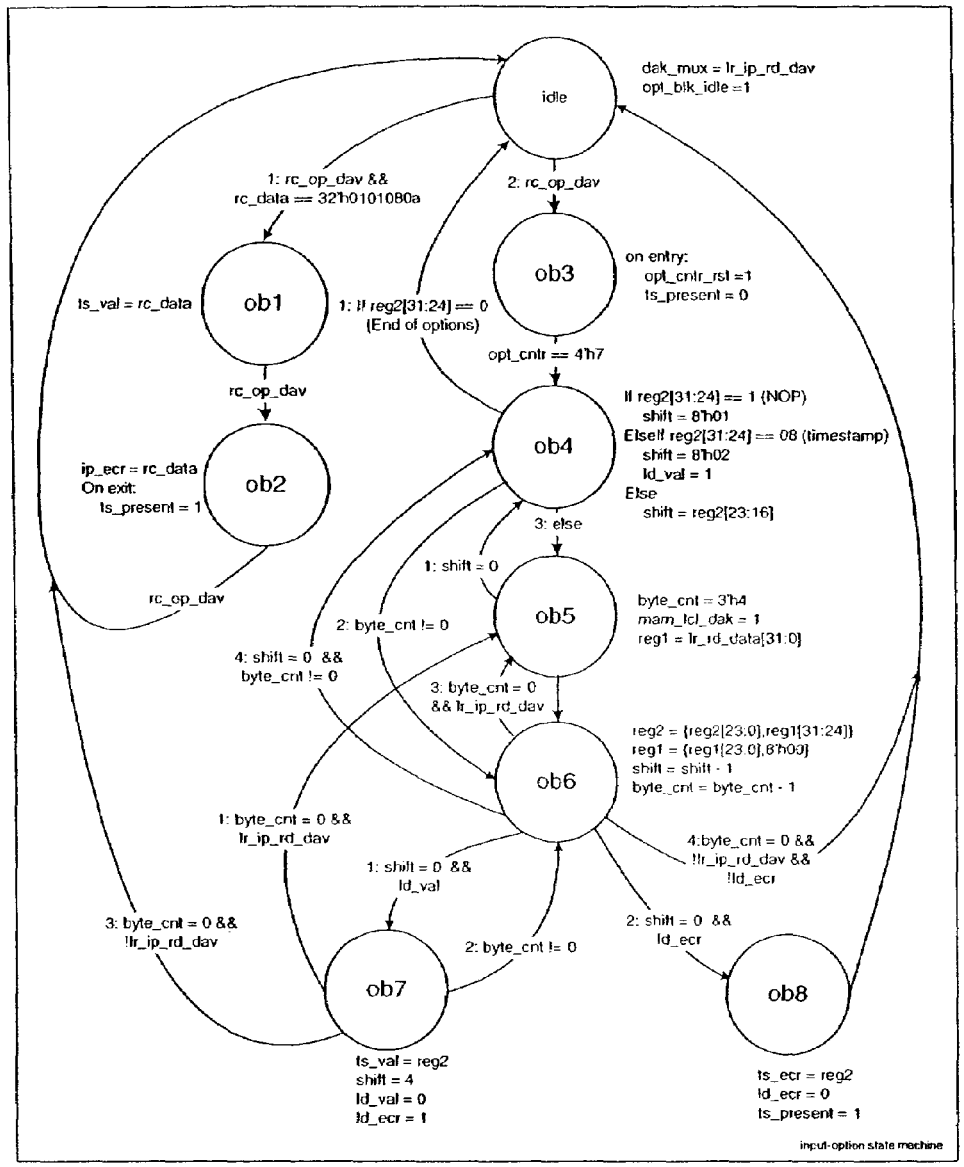
Figure 3C1 Input Processor Option Block State Machine

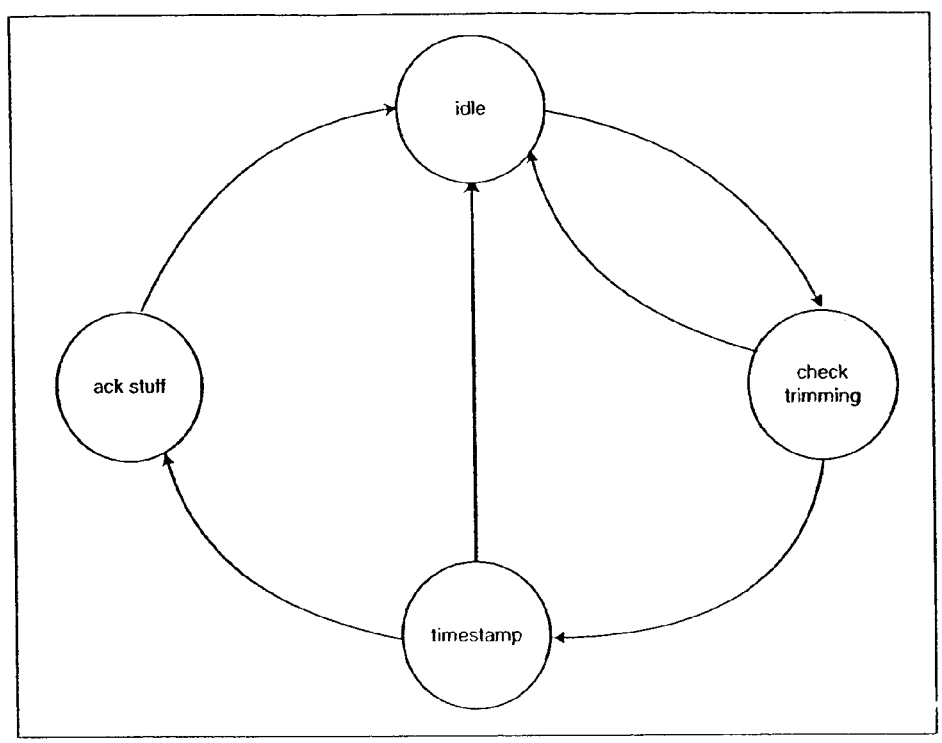
Figure 3C2: Validation State Machine

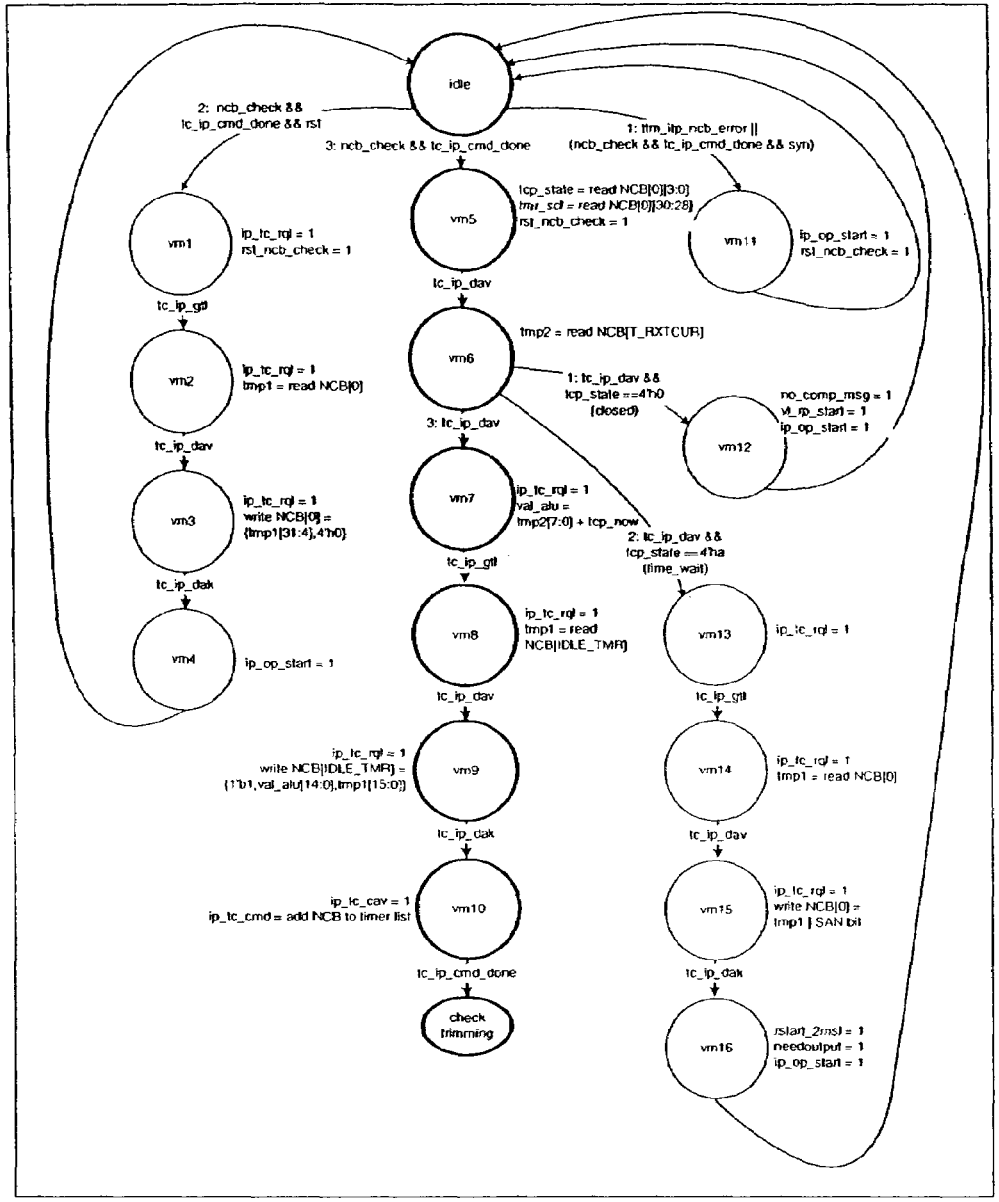
Figure 3C3: Validation State Machine for Reset, SYN or Invalid State

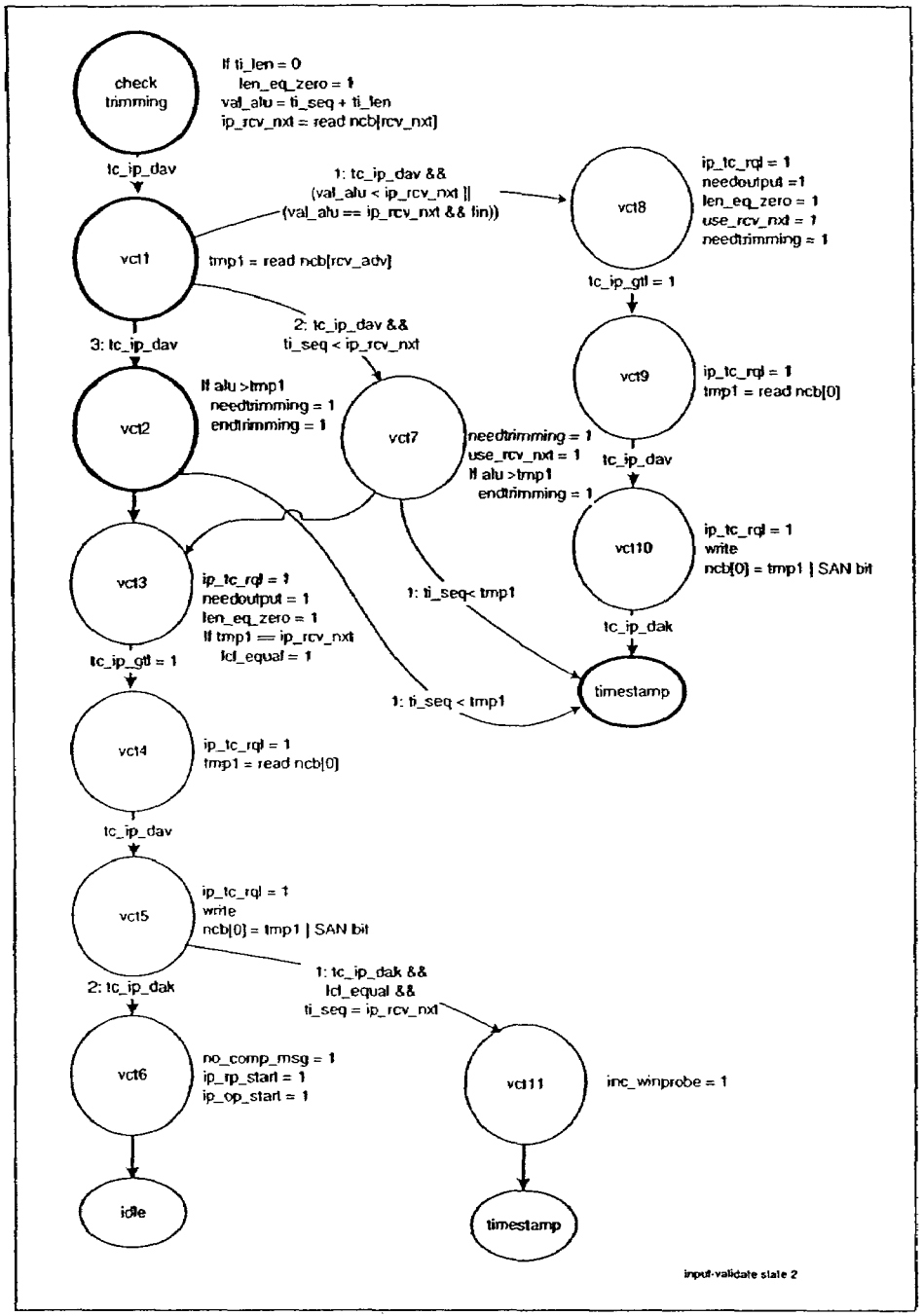
Figure 3C4: Validation State Machine for Trimming

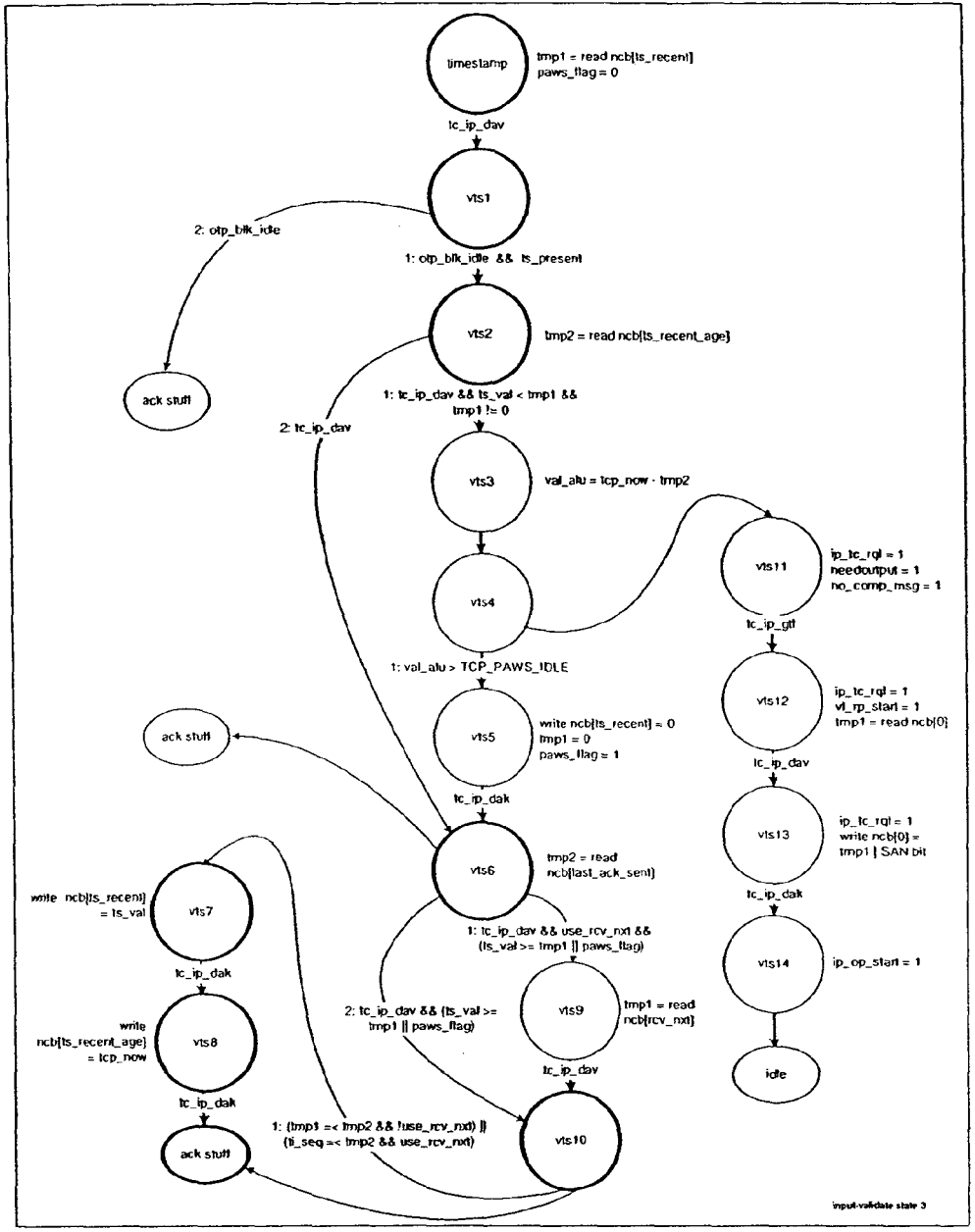
Figure 3C5: Validation State machine for Timestamp functionality

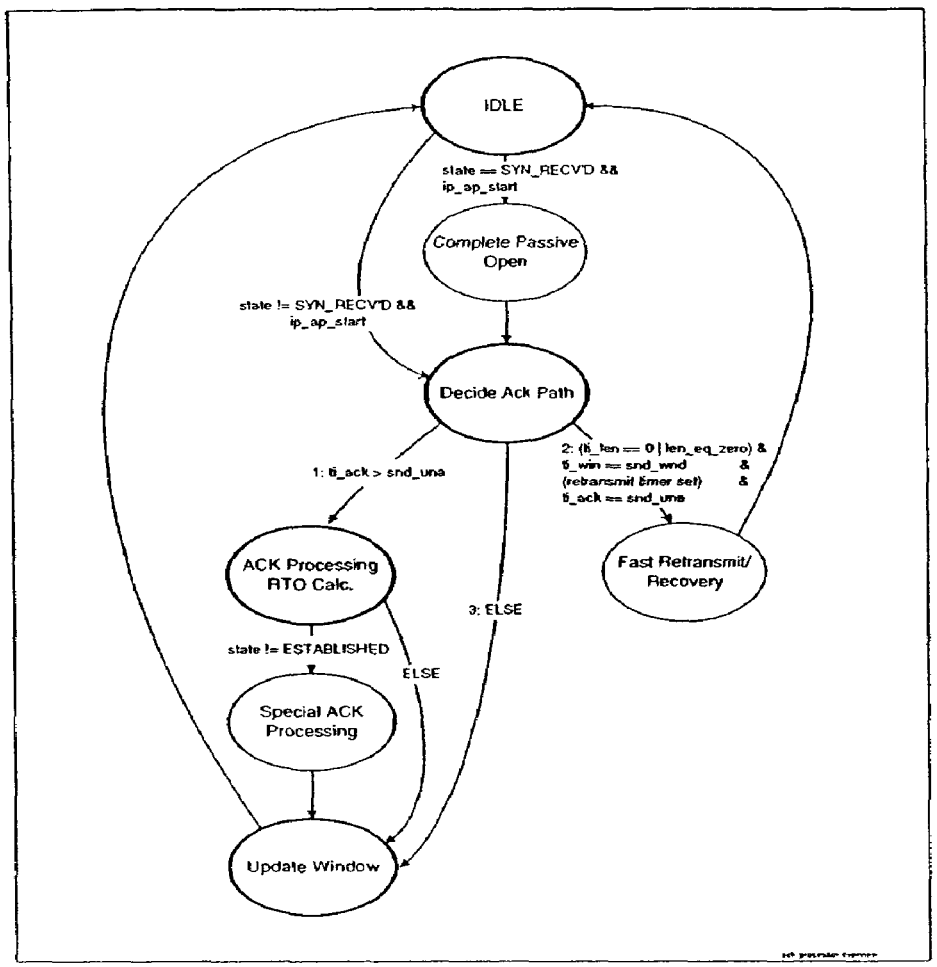
Figure3C6– ACK Processor

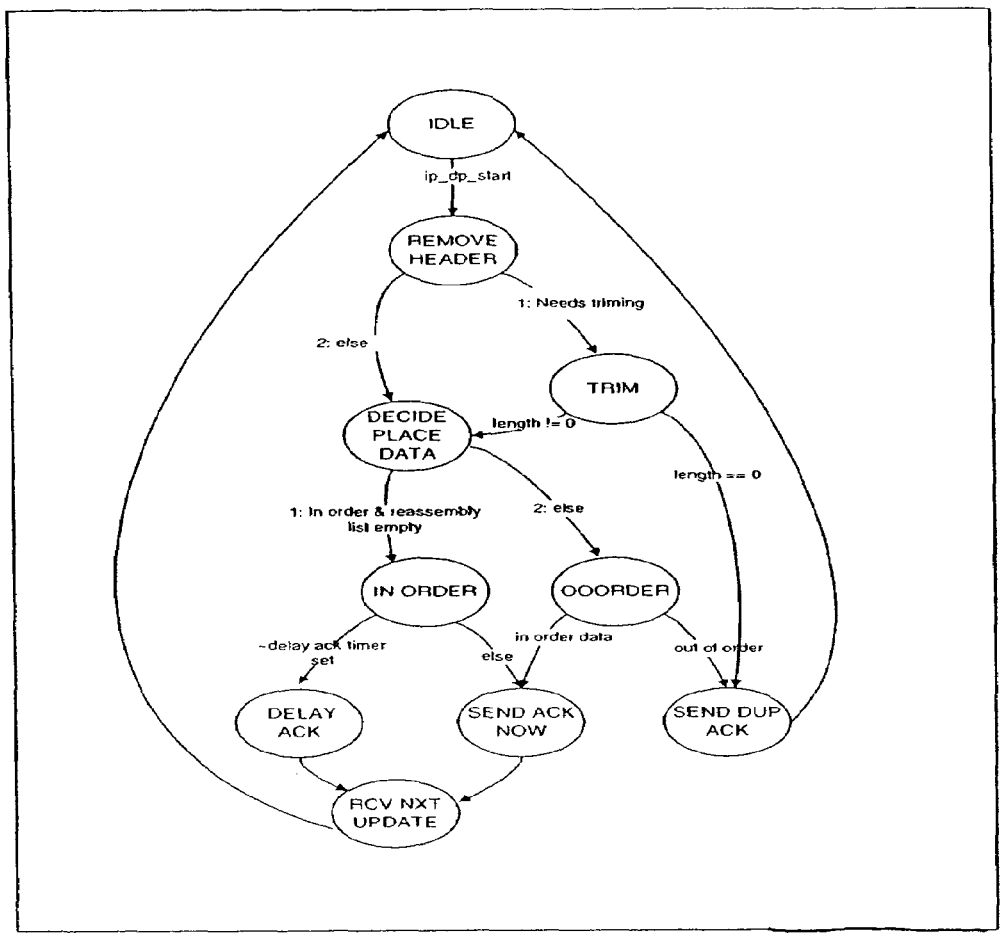
Figure 3C7 Data Processing State Machine

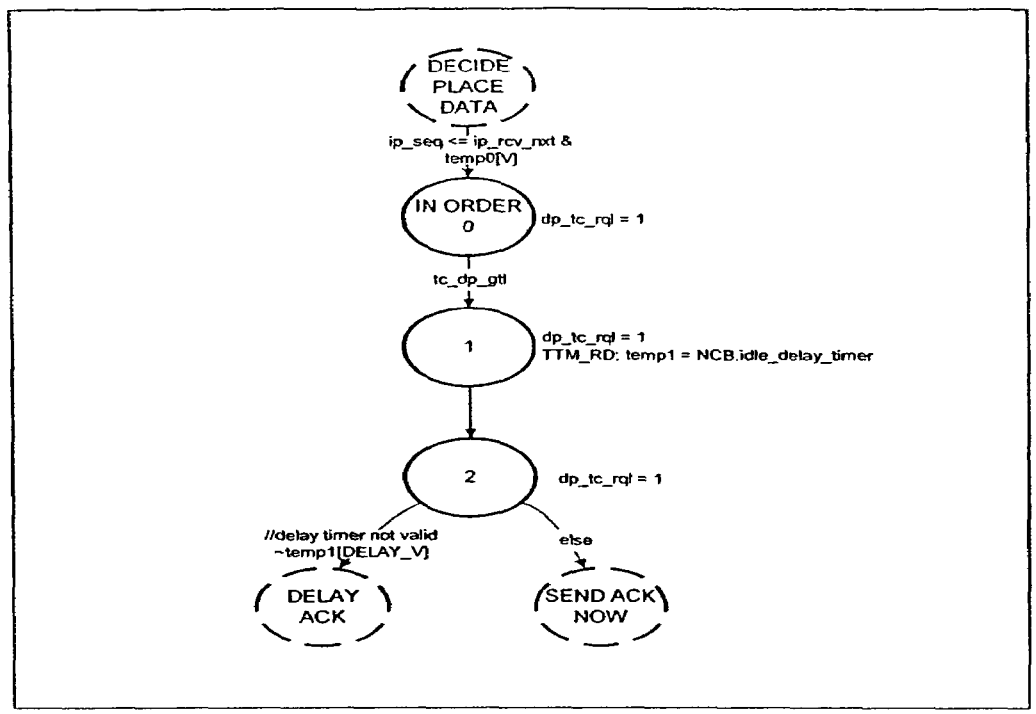
Figure 3C8 – Data Process Inorder

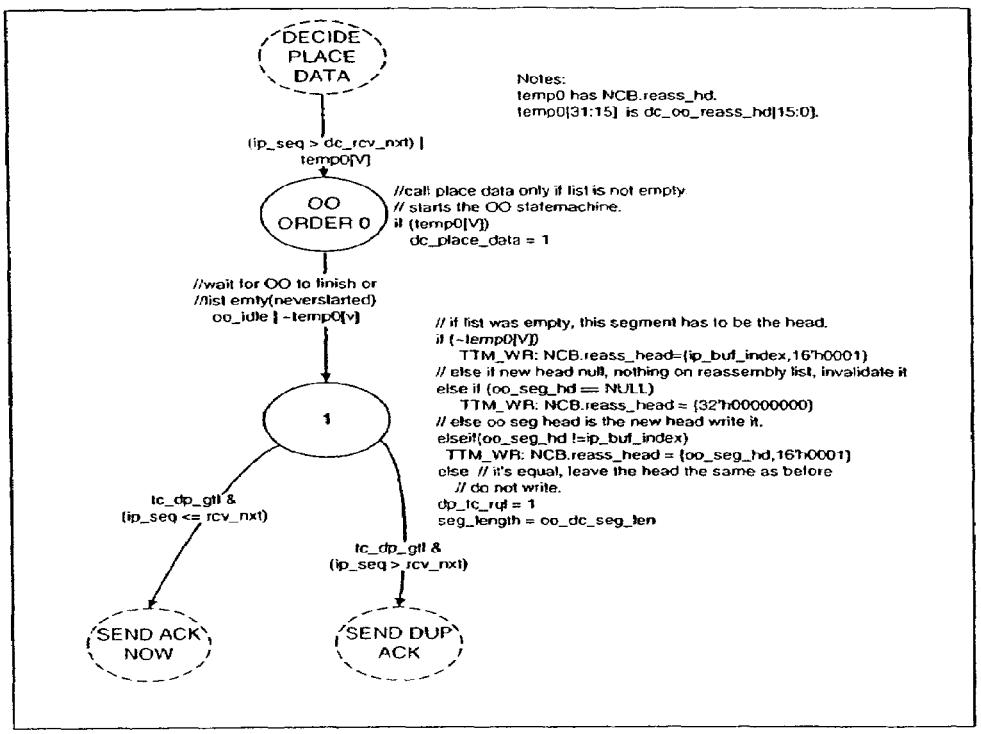
Figure 3C9 – Data Process Out of Order

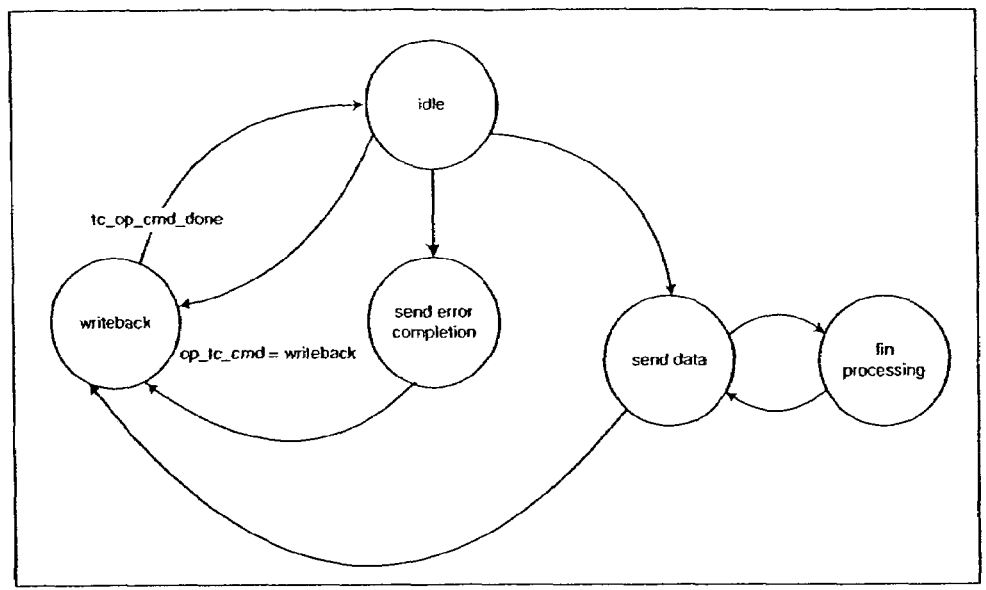
Figure 3C10 - ITP Output Processor (

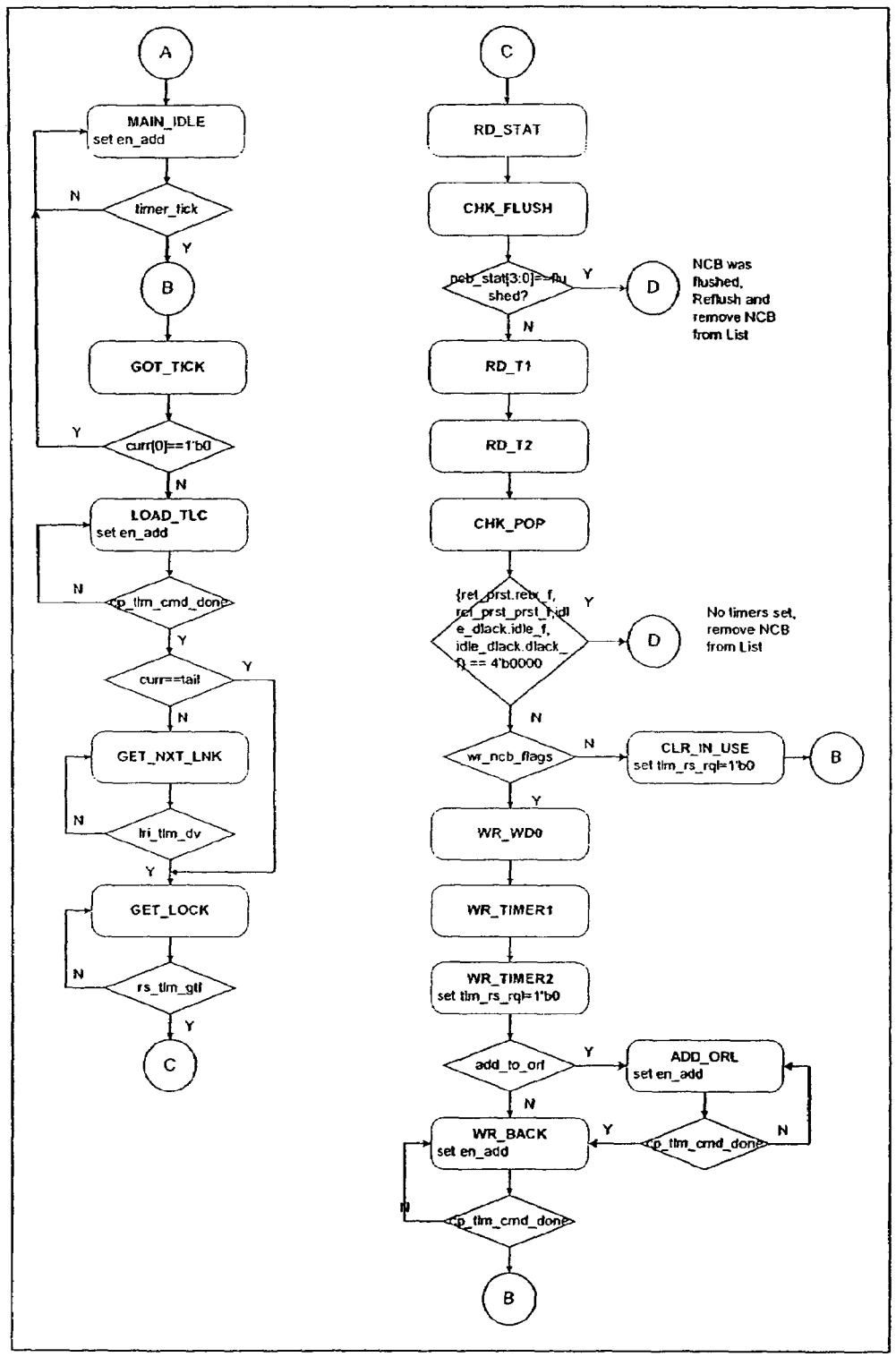
Figure 3D1 Timer List Manager State Machine

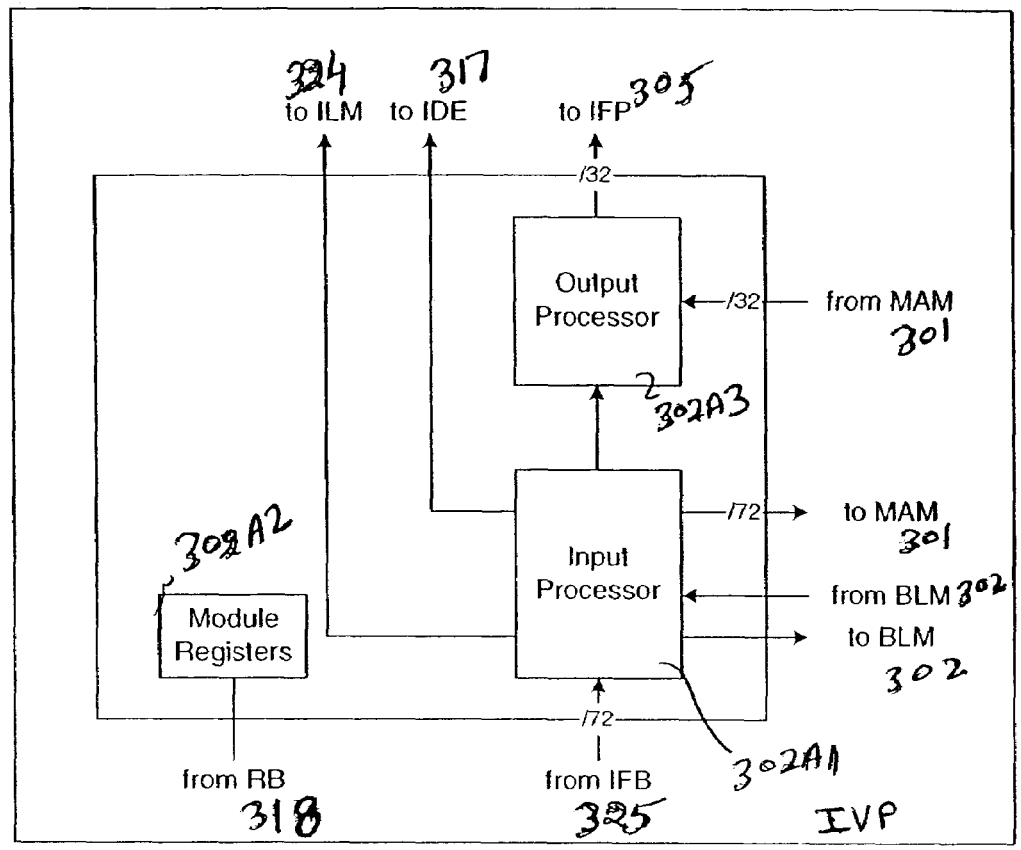
Figure 3J1

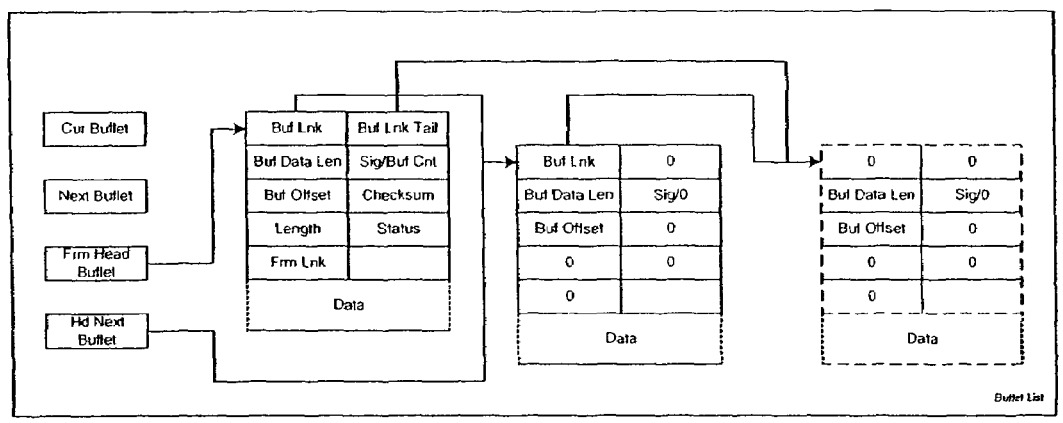
Figure 3J1 Buflet List Structure

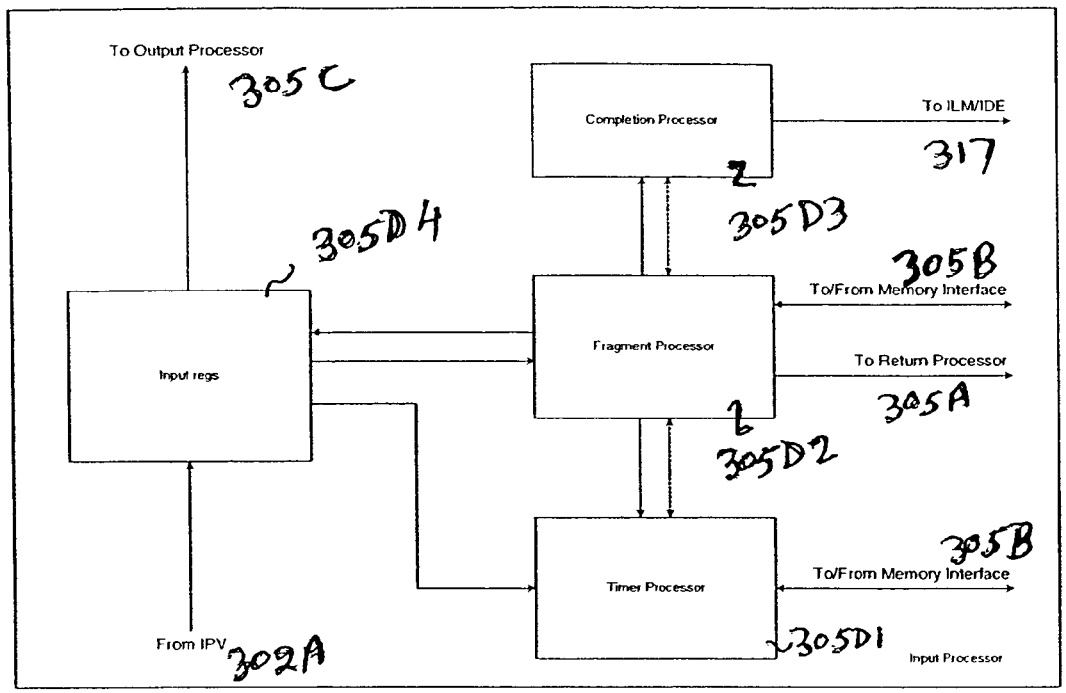
Figure 3L2

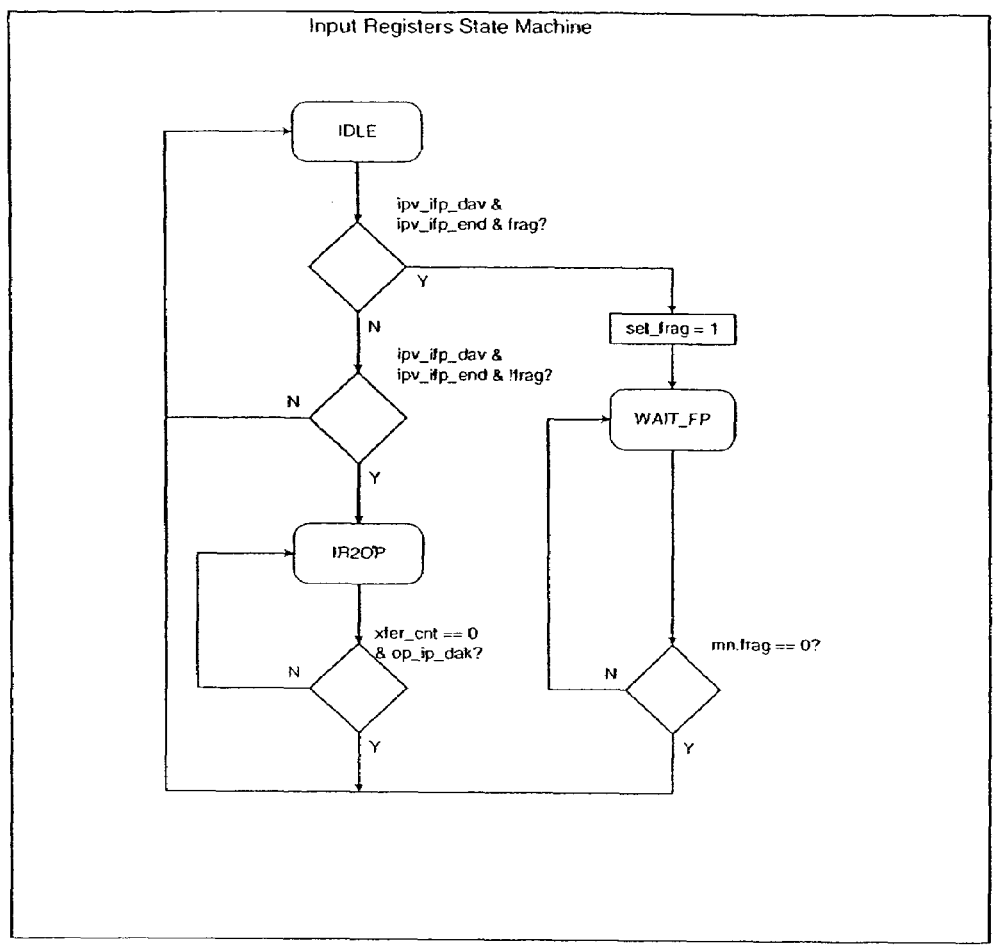
Figure 3L3

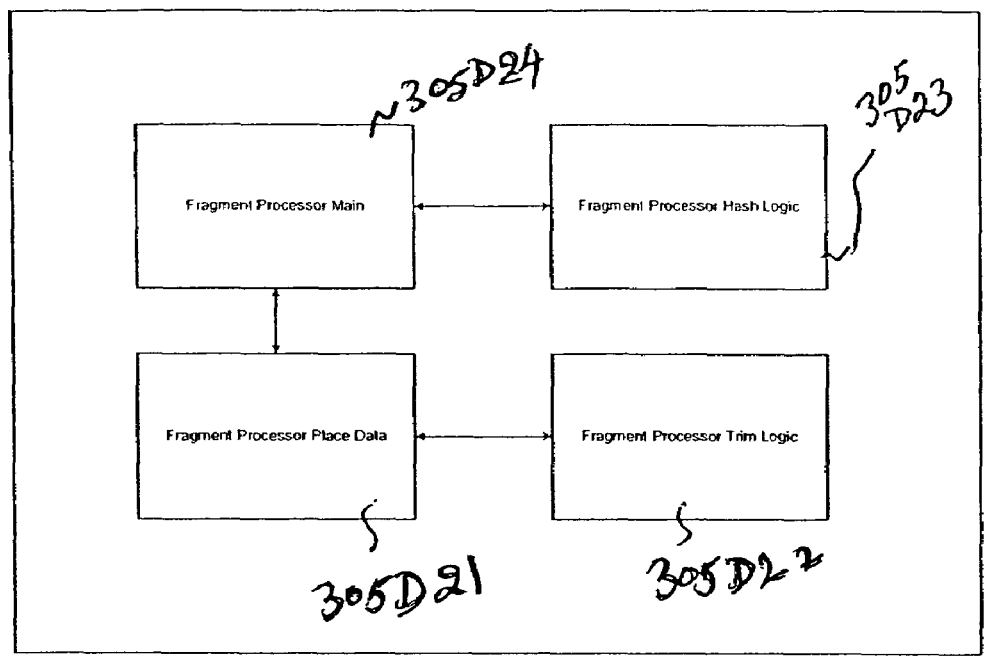
Figure 3L4

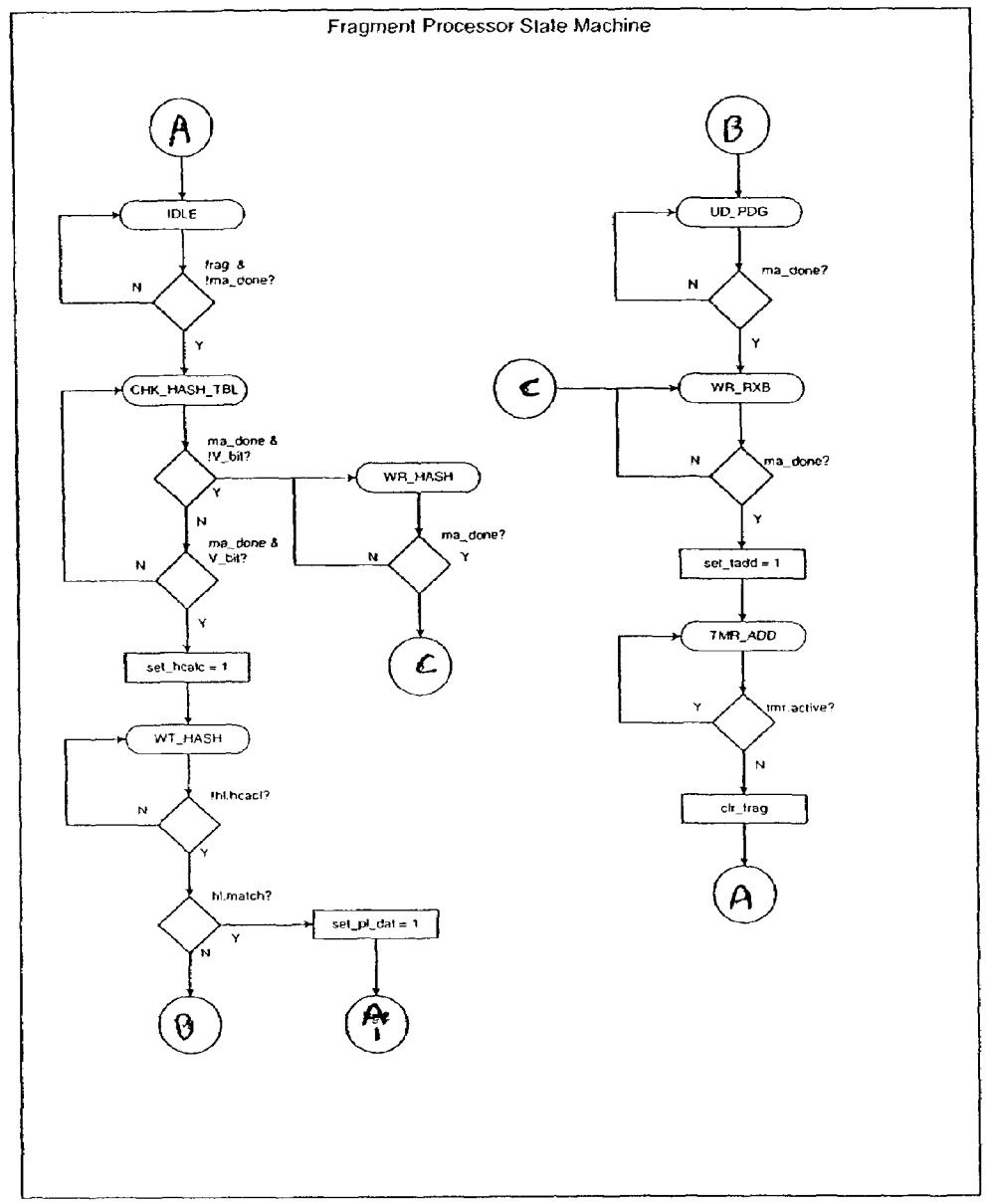
Figure 3L5A I

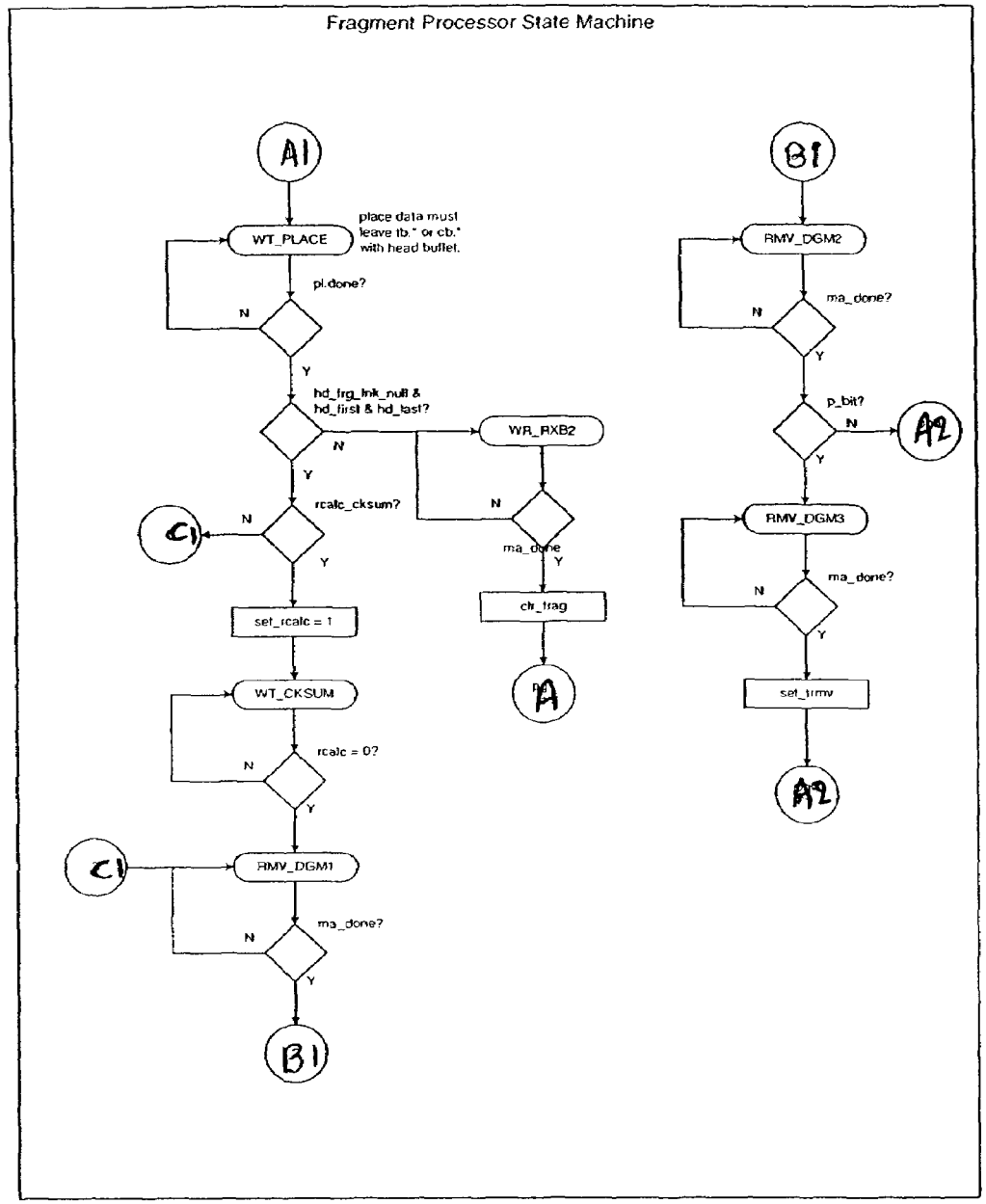
Figure 3L5B

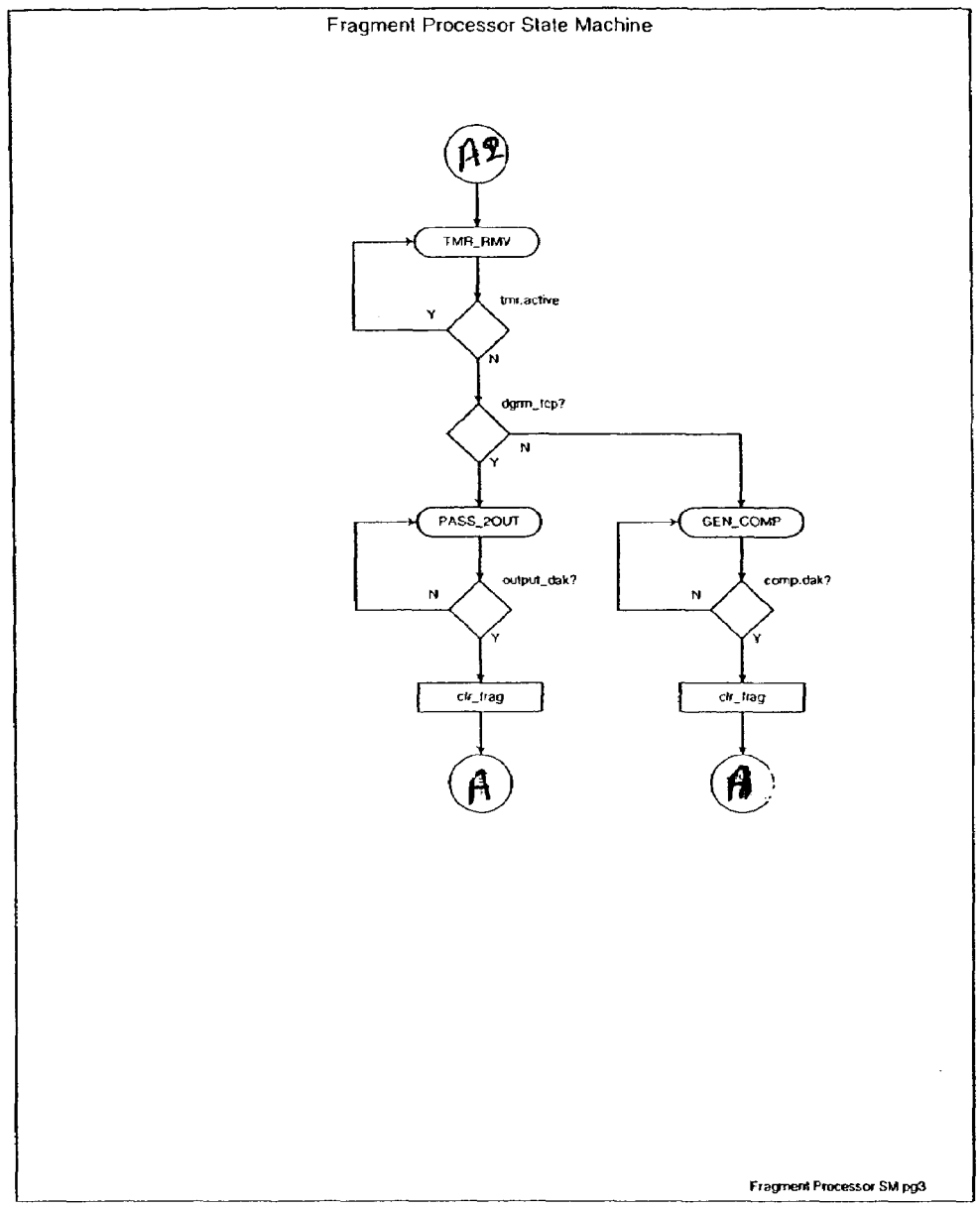
Figure 3L5C

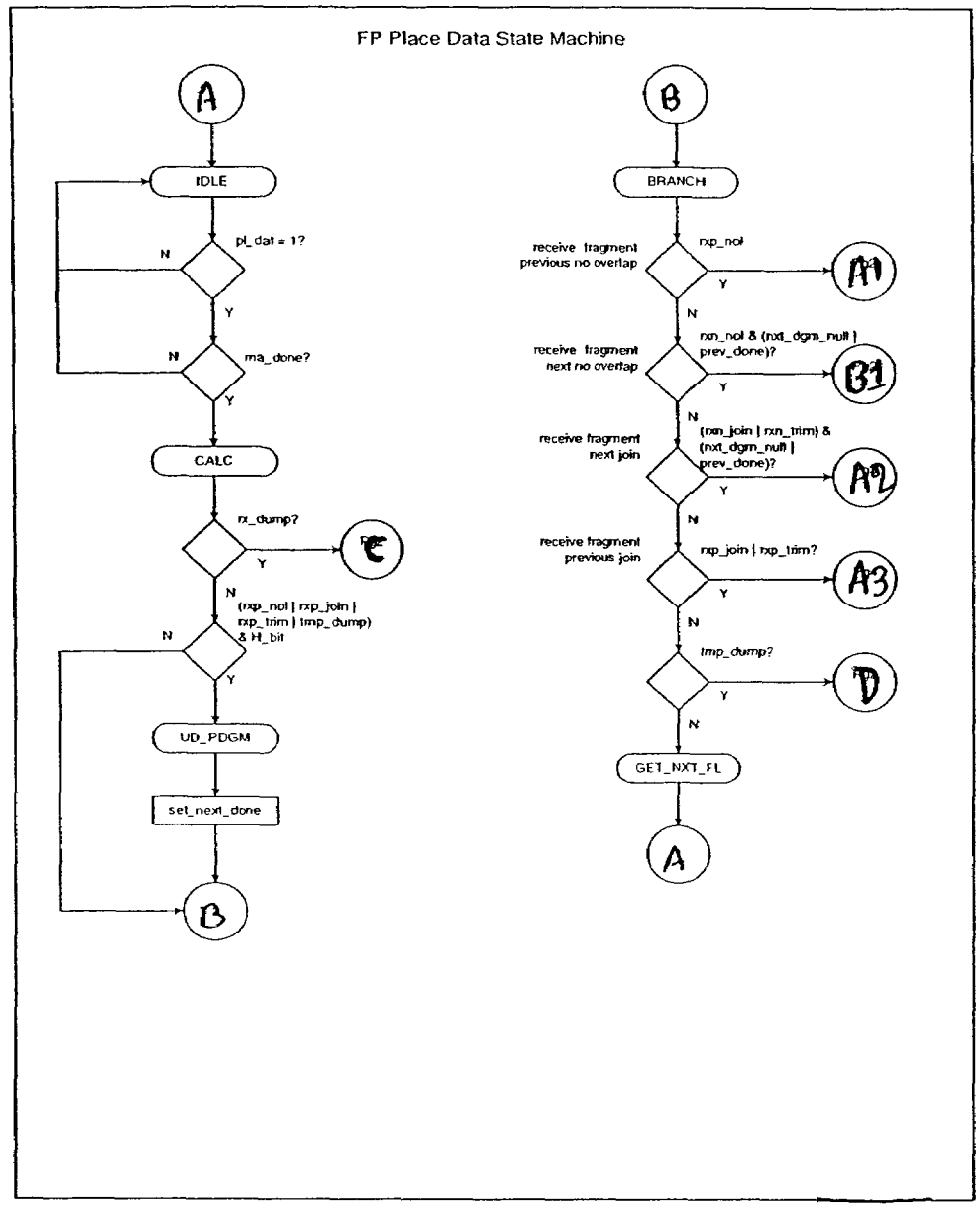
Figure 3L6A

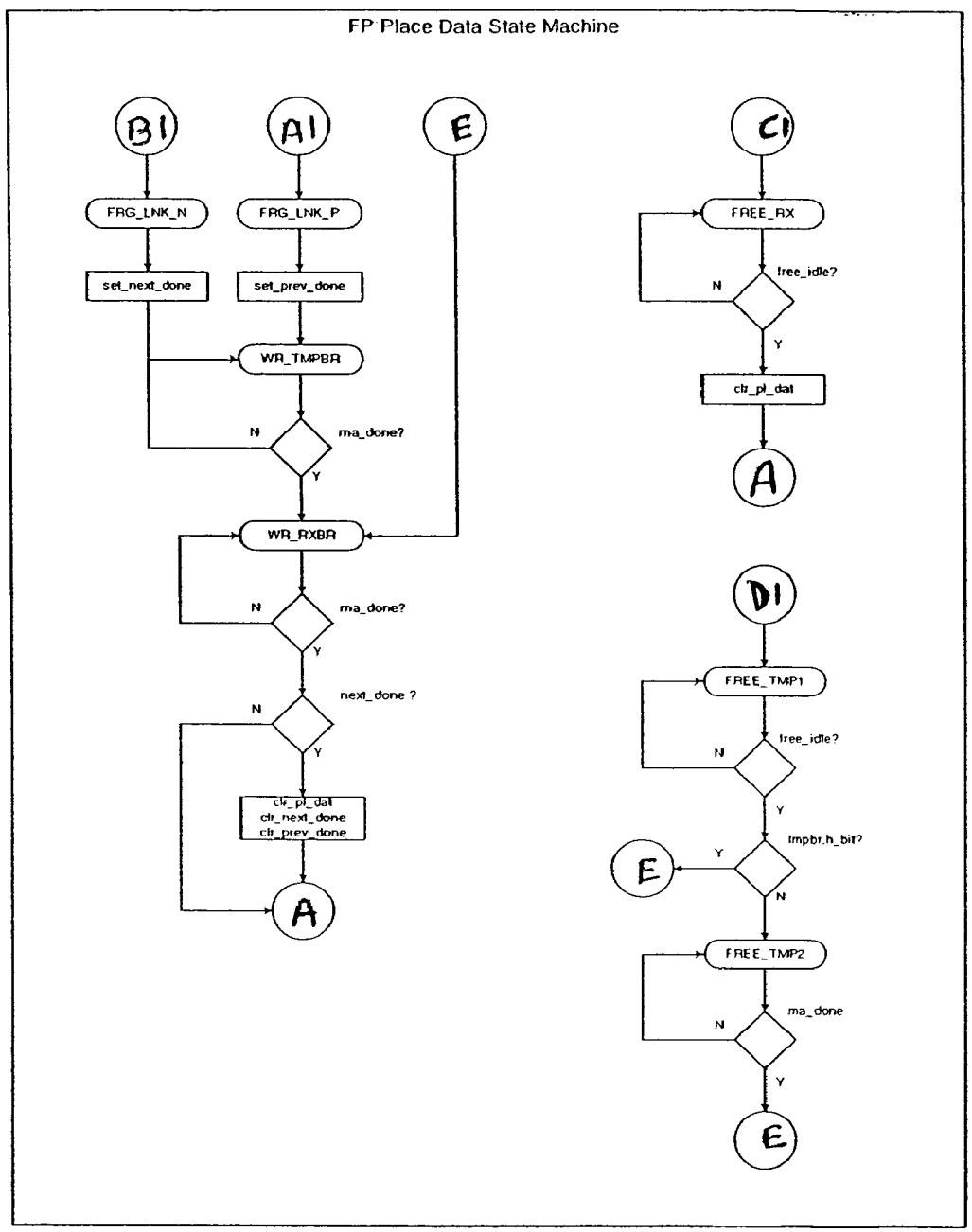
Figure 3L6 B

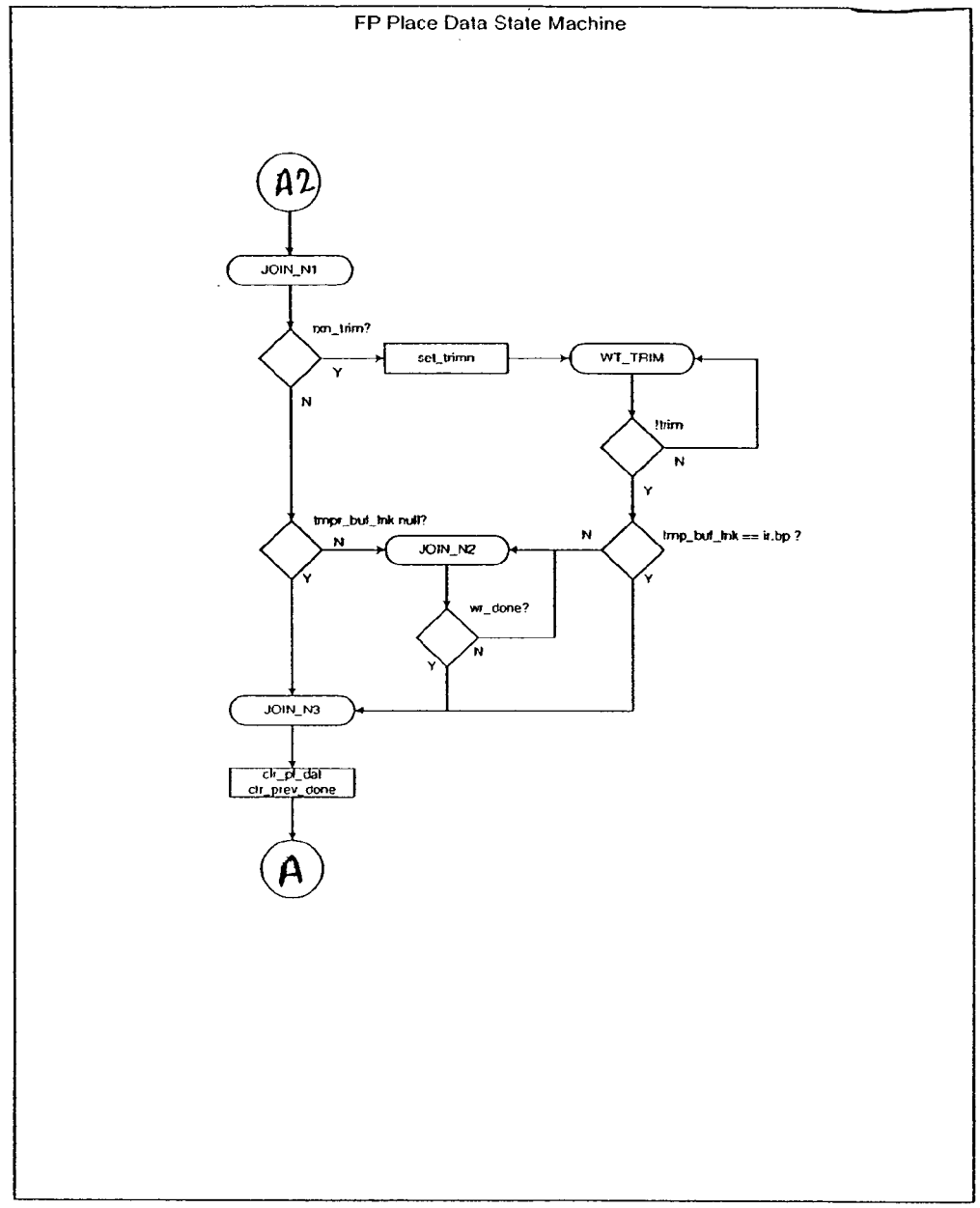
Figure 3L6C

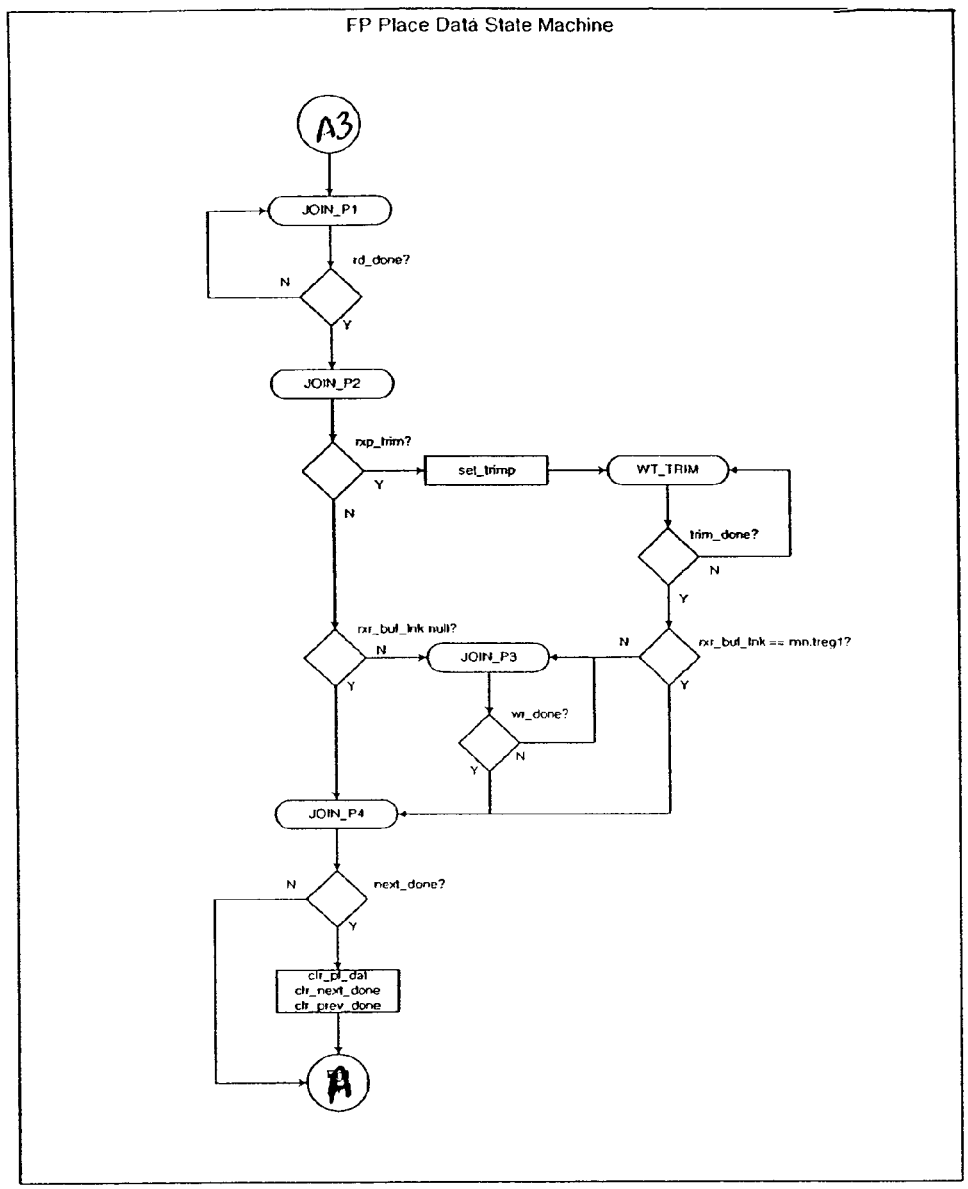
Figure 3L6D

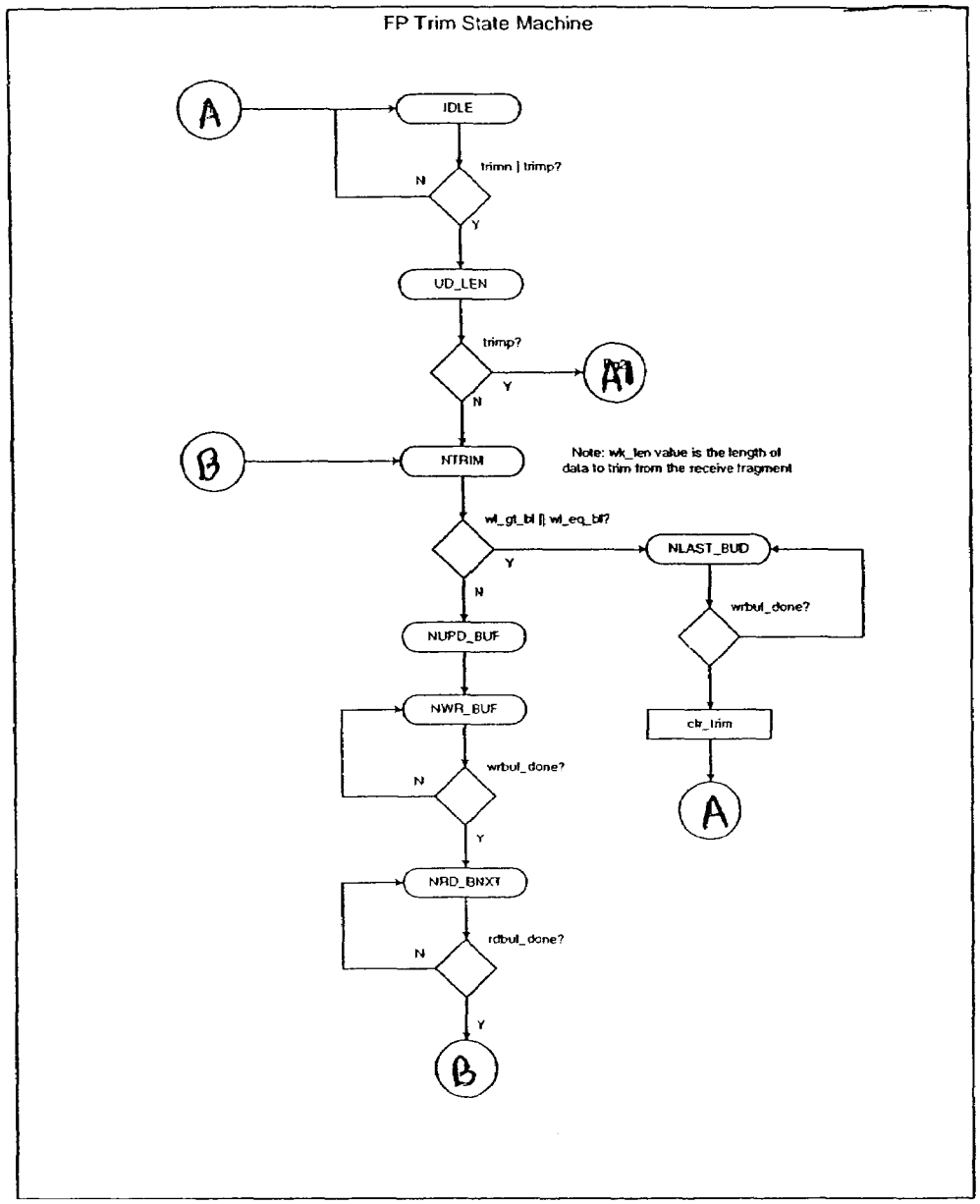
Figure 3L7A

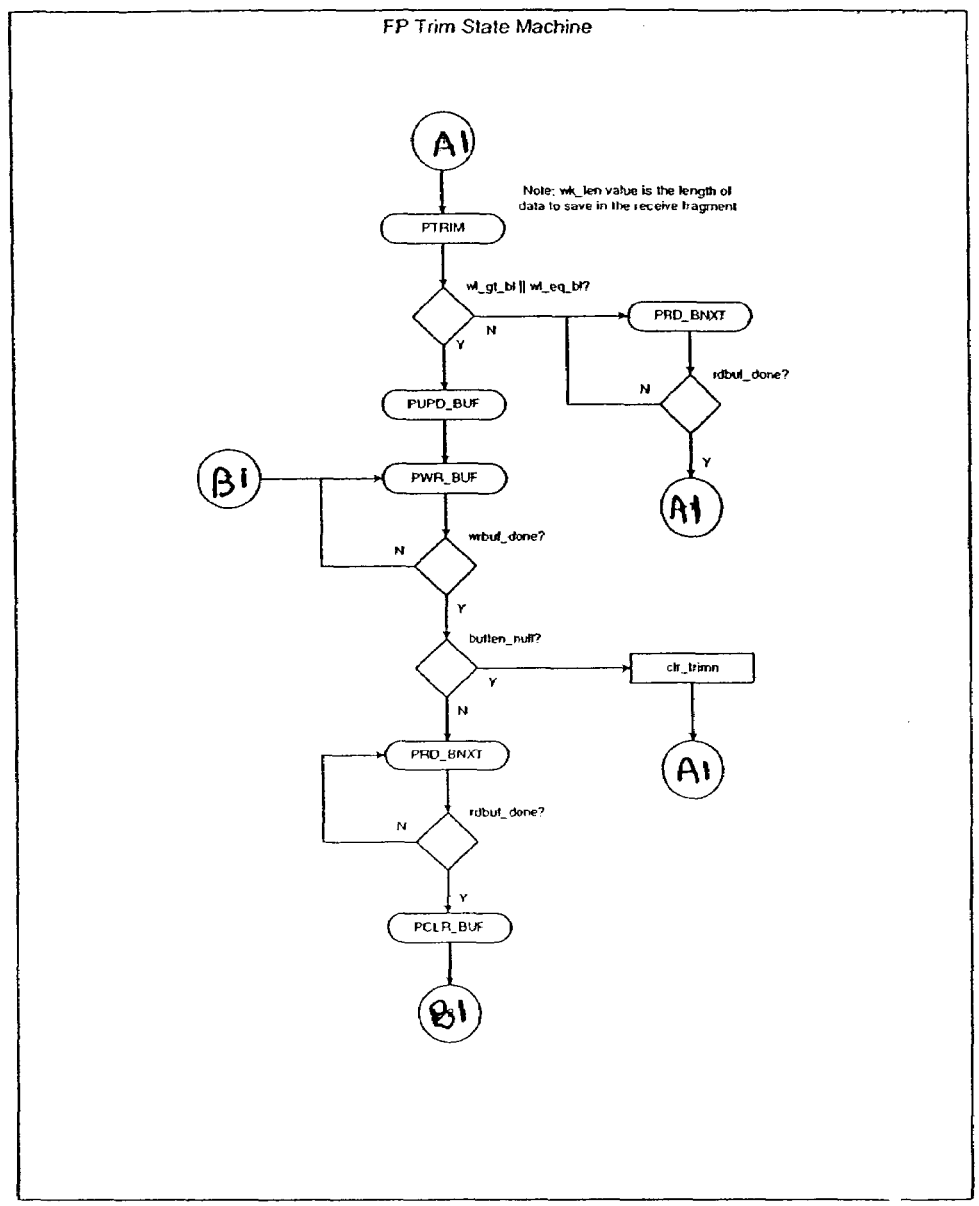
Figure 3L7B:

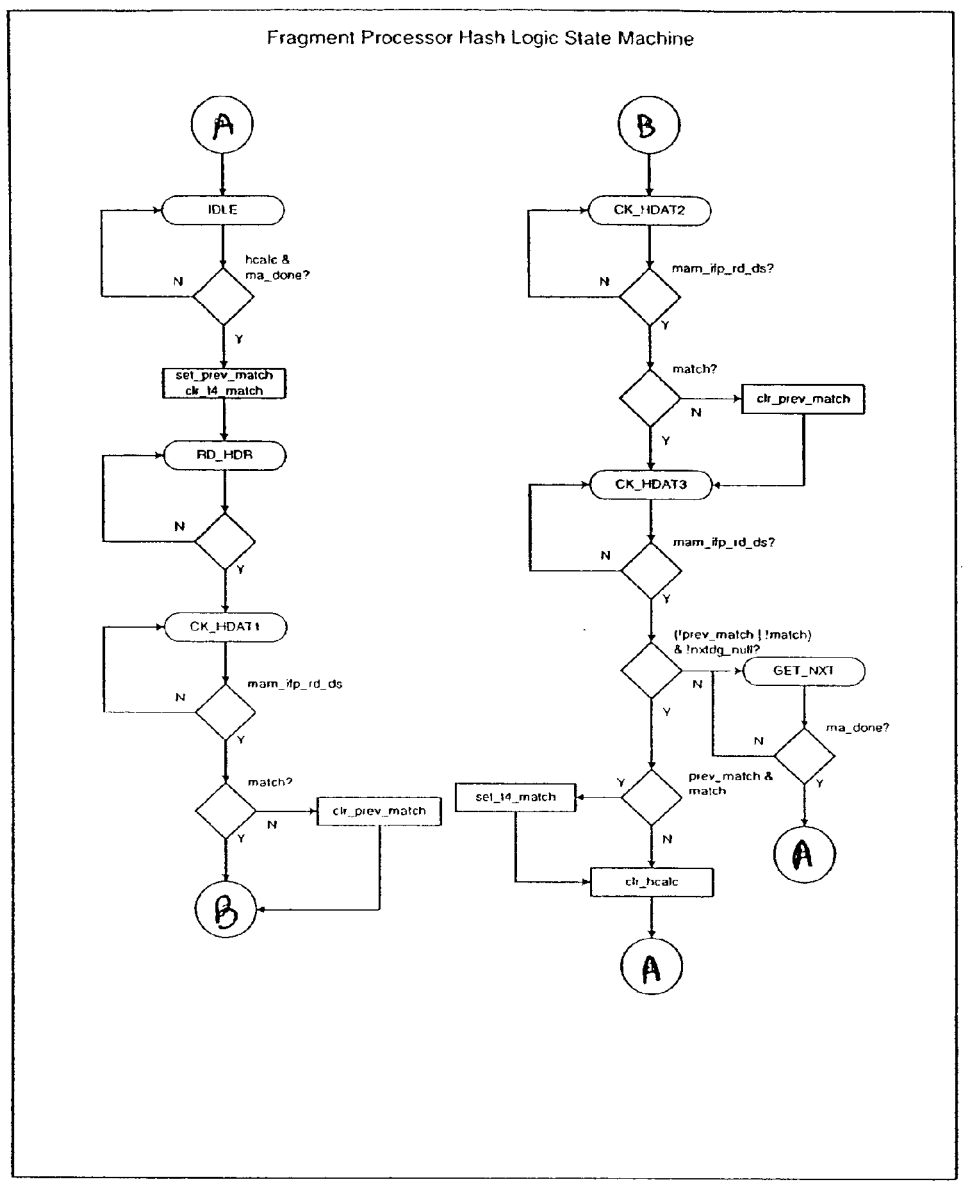
Figure 3L8J

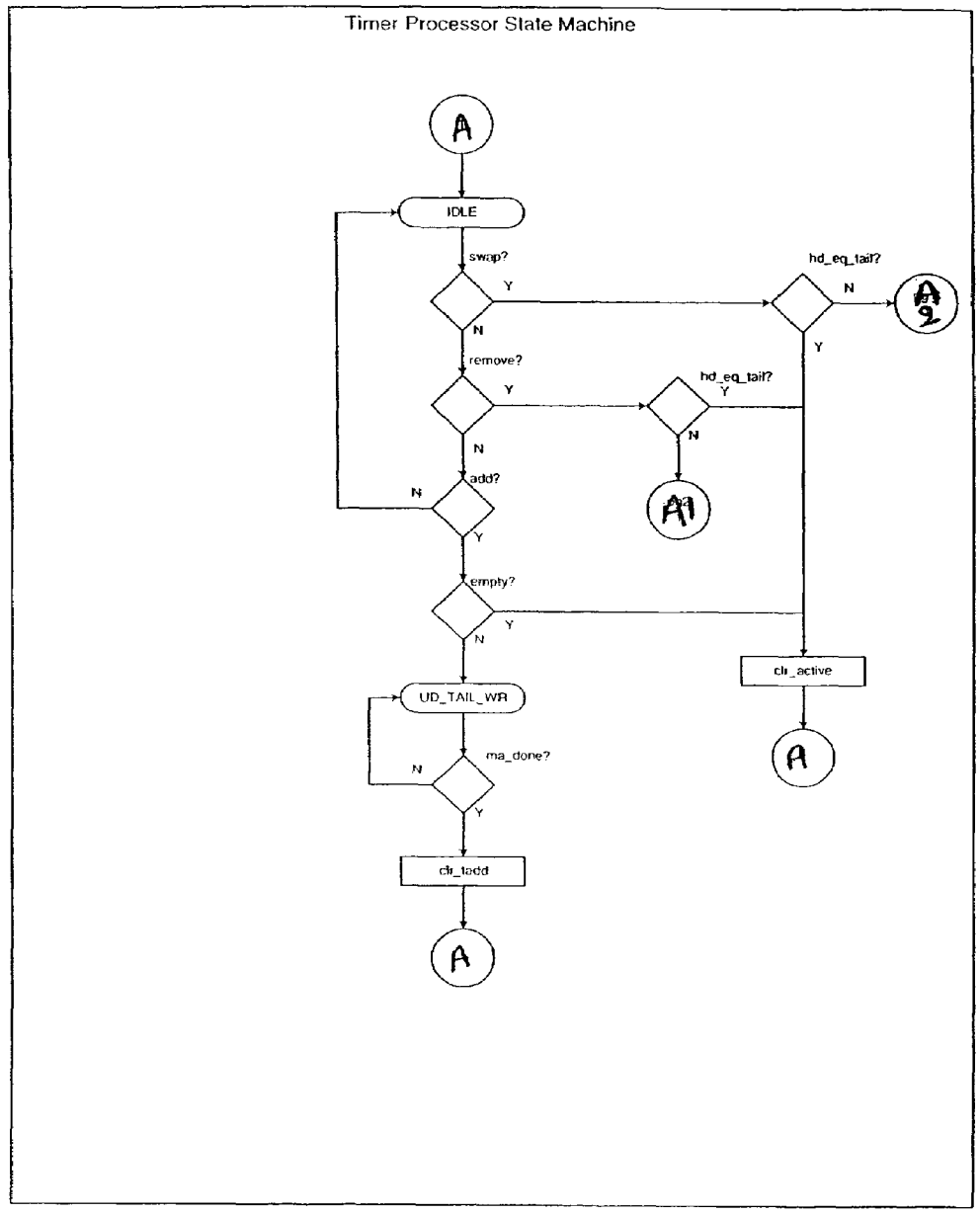
Figure 3L9A

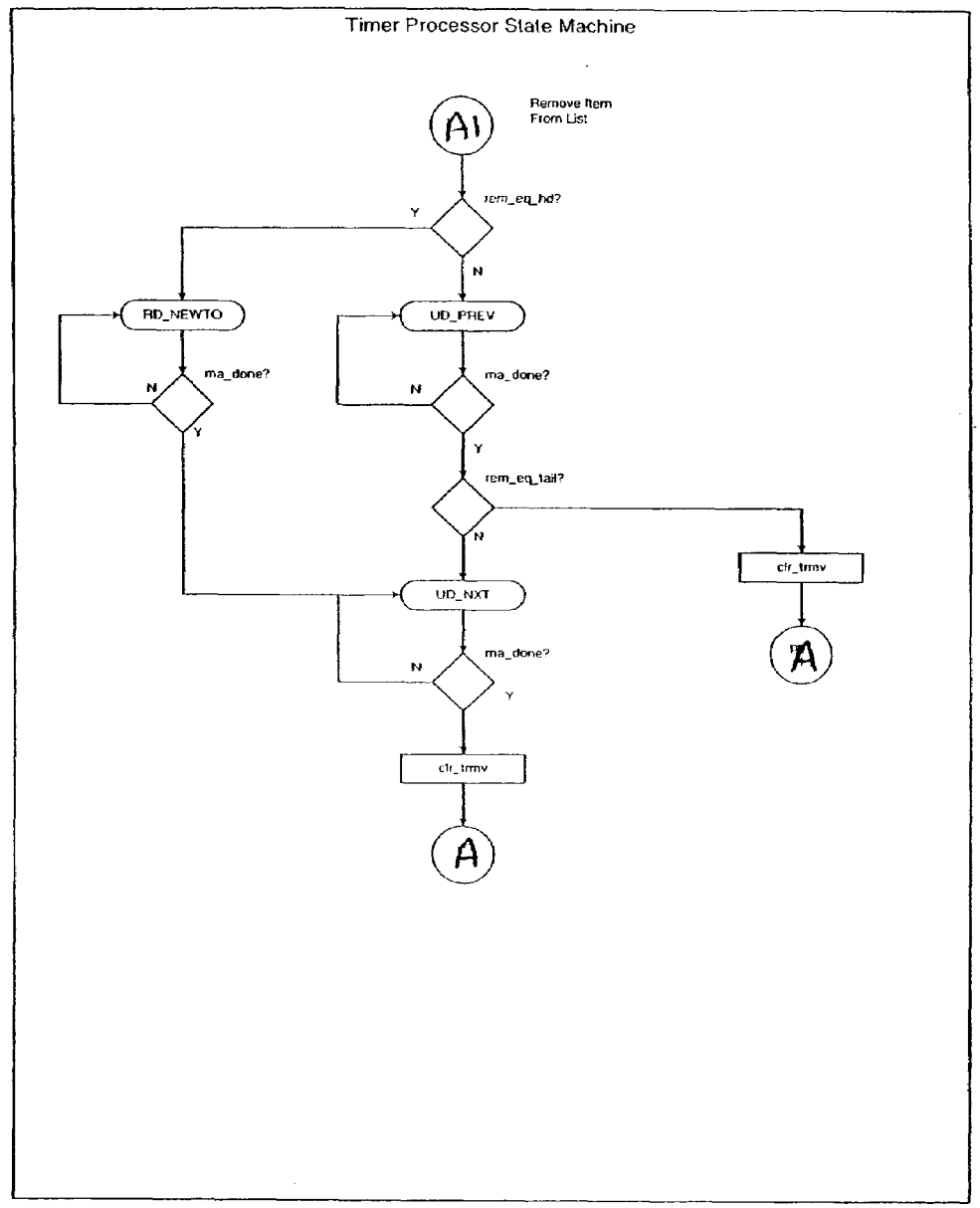
Figure 3L9B:

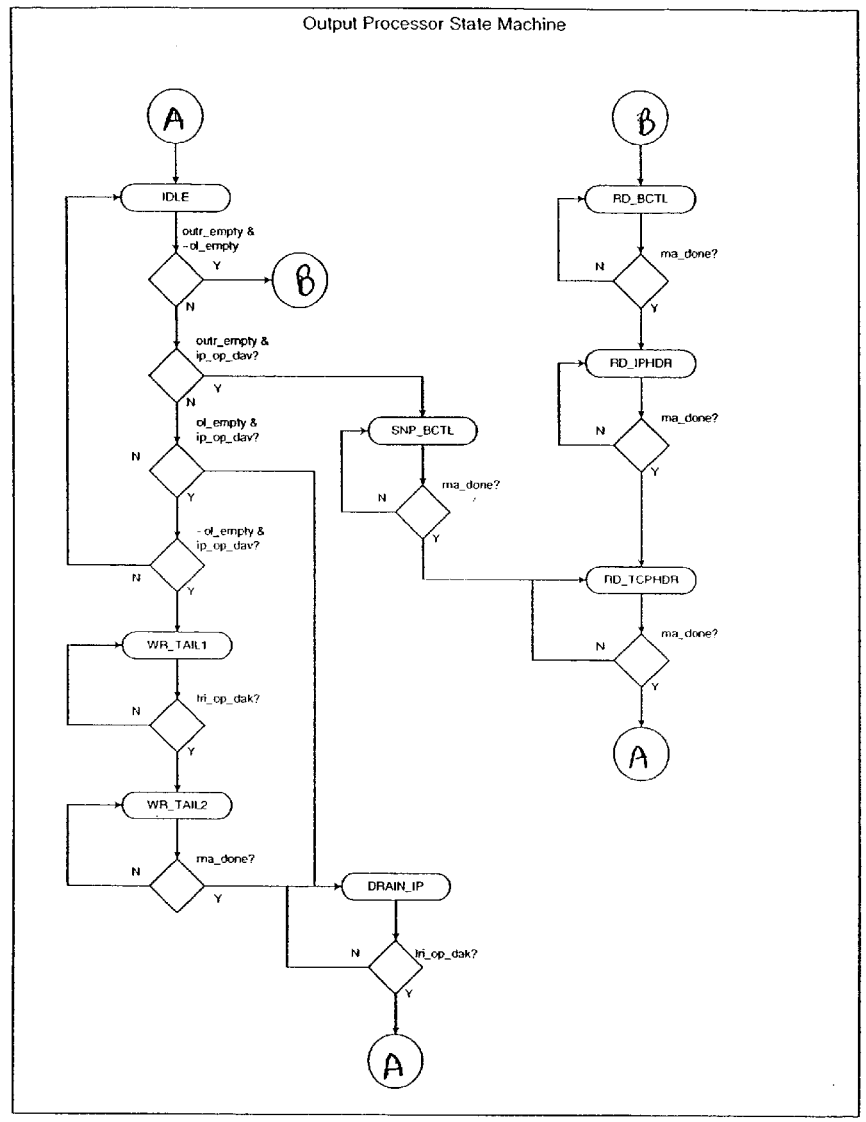
Figure 3L10 -

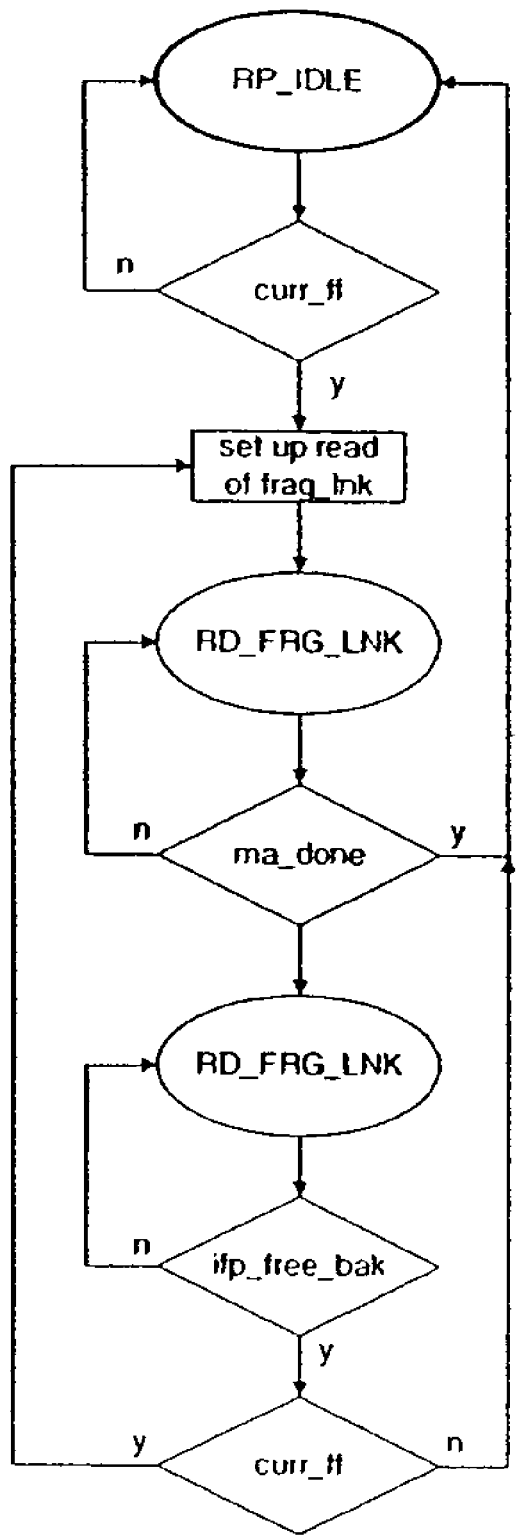
Figure 3L11 - Return Processor State Machine

METHOD AND SYSTEM FOR PROCESSING NETWORK DATA PACKETS

CROSS REFERENCE TO RELATED APPLICATIONS

This application claims priority to U.S. provisional patent application Ser. No. 60/397,419, filed on Jul. 19, 2002, the disclosure of which is incorporated herein by reference in its entirety.

This application is also related to the following patent applications, filed on even date herewith:

Application Ser. No. 10/620,076, entitled "METHOD AND SYSTEM FOR PROCESSING NETWORK DATA PACKETS"; and Application Ser. No. 10/619,719, entitled "METHOD AND SYSTEM FOR PROCESSING NETWORK DATA PACKETS". the disclosure of which are incorporated herein by reference in their entirety.

BACKGROUND

1. Field of the Invention

The present invention relates to computer networks, and more particularly, to processing network data packets using hardware components.

2. Background of the Invention

Computer networking is commonplace in today's world. Network computing allows users to share information regardless of where they are located. Network computing has also increased the use of mass storage devices that can store data. Such storage devices often have to interface with networks to exchange commands and/or read and write data. Storage controllers are used to facilitate interaction between storage systems and computing systems.

Traditionally, storage controllers (e.g., disk array controllers, tape library controllers) have supported the SCSI-3 protocol and have been attached to computers by a Small Computer System Interface (SCSI) parallel bus or Fibre Channel.

Internet SCSI (iSCSI) standard as defined by the Internet Engineering Task Force (IETF) maps the standard SCSI protocol on top of the TCP/IP protocol.

Networks are generally defined as having layers of protocol. The iSCSI and TCP/IP protocol suite consist of 4 protocol layers; the application layer (of which iSCSI is one application), the transport layer (TCP), the network layer (IP) and the link layer (i.e. Ethernet). A complete description of the TCP/IP protocol suite is provided in "TCP/IP" Illustrated, Vol. 1 by W. Richard Stevens and Volume 2 by Gary R. Wright and W. Richard Stevens published by Addison Wesley Professional Computing Series.

TCP Overview

TCP is a network protocol that provides connection-oriented, reliable, byte stream service. This means that two nodes must establish a logical connection before sending data and that TCP maintain state information regarding the data transfer. Reliable means that data is guaranteed to be delivered in the same order that it was sent. A byte stream service means that TCP views data to be sent as a continuous data stream that is sent in any way it sees fit and delivers it to the remote node as a byte stream. There is no concept of a data frame boundary in a TCP data stream. Applications, such as iSCSI, must provide their own mechanisms for framing data, if it is needed.

Sequence Numbering in TCP Data Transfer

Each byte of data sent using a TCP connection is tagged with a sequence number. Each TCP segment header contains the sequence number of the first byte of data in the segment. This sequence number is incremented for each byte of data sent so that when the next segment is to be sent, the sequence number is again for the first byte of data for that segment. The sequence numbering is used to determine when data is lost during delivery and needs to be retransmitted.

A data packet receiver keeps track of the sequence numbers and knows the next sequence number when a new segment arrives. If the sequence number in the segment is not the expected one, the receiver knows that the segment has arrived out of order. This could be because the network reordered the segments or a segment was lost. Typically, TCP handles both of these cases.

TCP initially assumes that data is arriving out of order for a short number of segments or time. If the out of order segment does not arrive after three segments, the segment is considered lost and is retransmitted.

TCP Data Segments

All TCP data segments are protected by a checksum. The checksum algorithm includes 16 bit ones complement addition of the entire TCP segment. On transmission, the "ones" complement of the calculation is stored in the segment. On reception, the checksum calculation includes the transmitted complemented checksum so that the result of the receiver's checksum is all 1's.

FIG. 1A shows a sample TCP packet. The packet includes a TCP checksum with a TCP header and data. It also includes a pseudo header in the calculation. The pseudo header is built by the packet receiver specifically for the checksum calculation. The purpose of including the pseudo header is to verify that a TCP segment has arrived at the correct IP destination and was passed to the correct layer. The pseudo header is derived from information in the IP header. This includes the source and destination IP addresses and the protocol field. The pseudo header also includes the length of the TCP segment itself. The TCP header does not have a length field in it. TCP length is calculated from the total IP length minus the length of the IP header.

Delayed ACK Packets

Typically, when a TCP segment is received on a node, an acknowledgement ("ACK") packet is returned to acknowledge reception of the packet. To help reduce the number of segments on a network, TCP may delay the delivery of an ACK packet. The ACK packet is held for a set time period to see if another ACK packet is to be sent or if the ACK can be coupled to a data segment that is being sent back. The delay in sending ACK packets occurs when data is being received in order, and skipped, if a segment is out of order.

Internet Protocol ("IP") Overview

The IP protocol provides a datagram service whose function is to enable routing of data through various network subnets. Each of these subnets could be a different physical link such as Ethernet, ATM, etc. IP is also responsible for fragmentation of the transmit data to match a local link's MTU. IP can fragment data at the source node or at any intervening router between the source and destination node. The destination IP reassembles fragments into the original datagram sent.

Most conventional solutions for controlling communications between storage controllers and networks are via software often based on Open Systems Interconnection (OSI) model. The iSCSI protocol with the TCP/IP protocol stack running in software on a computer requires a large amount of computing power, especially at current 1 giga bits per second (1 Gbps) and future 10 Gbps network rates.

Mixed software and hardware solutions have been also been proposed. One such solution is provided in U.S. Pat. No.

6,226,680 (Boucher et al.). In Boucher et. al., a network interface card uses a "fast path microprocessor or the host stack". This decision is based on a summary of packet headers. A host software stack processes some packets and others are processed by a "fast path microprocessor".

The system and process illustrated in Boucher et. al. still requires processing by a software stack and hence is not suitable to the present high bandwidth requirements.

Therefore, what is needed is a process and system that can process network packets in storage controllers efficiently and quickly to meet the present and future high bandwidth requirements.

SUMMARY OF THE INVENTION

In one aspect of the present invention, a system for transmitting and receiving TCP/IP data packets using a hardware engine is provided. The system includes an inbound MAC Receive state machine for processing MAC frames received from a network; an inbound IP verifier state machine for verifying IP packet headers; an inbound IP fragment processing state machine for processing and reassembling IP fragments; and an inbound TCP state machine for processing TCP segments received from an IP layer.

The system also includes an outbound MAC Transmit state machine that sends MAC frames to a network; an outbound IP state machine that processes IP data to be passed to a MAC layer for transmission; and an outbound TCP state machine that processes TCP data to be passed to the IP layer for transmission.

The outbound IP state machine builds IP header data and passes the header data to the outbound MAC Transmit state machine and the outbound TCP state machine builds TCP header data and passes the header data to the outbound IP state machine. The inbound IP verifier state machine passes non-IP data packets to a host and also verifies IP packet header information and if the header information is valid, and then temporarily stores the packet in an external memory.

The inbound IP fragment processing state machine provides a timer, to time each datagram reassembly with a programmable timer value.

The inbound TCP state machine maintains a segment re-assembly list for each network connection that is linked to a network control block and is used to re-order out of order TCP data segments.

In yet another aspect, a system for processing network data packets using a hardware engine is provided. The system includes a verification module that verifies incoming data packets; a first in-bound TCP processor for processing TCP segments received from a network; a fragment processor that receives data packet fragments and reassembles them into complete datagrams for delivery; and a second in-bound processor for processing incoming TCP segments destined for iSCSI.

In another aspect of the present invention, a system for processing incoming TCP data packets, is provided. The system includes, an input processing module that determines if a TCP connection is established and checks for TCP flags to determine if a TCP datapacket should be processed; an acknowledgement processor module that handles any acknowledgement information included in the TCP packet; and a Data processor module that handles any data included in the TCP data packet.

In yet another aspect of the present invention, a network control block (NCB) used in a system for processing network data packets using a hardware engine is provided. The NCB includes plural status flags, control flags, destination address, header fields and/or TCP connection information, wherein NCBs are used to provide plural parameters to plural modules in the system and are maintained in a local memory and/or host memory.

In yet another aspect, a system for processing network data packets using a hardware engine is provided. The system includes, a TCP Table manager for managing a TCP connection's state information by providing a pool of buffers used for various data structures and providing plural registers and timer functions to various system sub-modules. The TCP Table manager maintains a free list of data structures that are used for storage of TCP connection state and for torage of TCP transfer requests.

The TCP Table Manager includes a command processor that arbitrates between plural command sources and translates a received command to an output action(s) to other TCP Table Manager components.

In yet another aspect of the present invention, a system for processing network data packets using a hardware engine is provided. The system includes an outbound TCP processor that takes requests from a host to transmit TCP data, transmits the TCP data following TCP rules and signals to a host when the transmission is complete and has arrived on the remote node; and transmits TCP acknowledgements in response to TCP data received.

The system also includes a request manager that downloads an input/output control block ("IOCB") and determines what action is required with respect to the downloaded IOCB.

In yet another aspect of the present invention a system for processing network data packets using a hardware engine is provided. The system includes an inbound IP fragment processor that receives IP datagram fragments and manages the reassembly of any number of in-process datagrams, wherein re-assembled datagrams are passed to a TCP processor or to a host for non-TCP packets.

The IP fragment processor includes an input processor for parsing data packet header information, assembling datagrams, and interfacing with an output processor and a return processor.

In yet another aspect of the present invention, a method for processing IP datagrams using an outbound processing state machine in an outbound processor, wherein the IP datagrams are generated by a host system is provided. The method includes creating an IOCB with plural host memory addresses that define host data to be sent and a host memory address of a network control block ("NCB") used to build network protocol headers, wherein the host sends the IOCB to the outbound processor.

The outbound processor reads the NCB from host memory and creates an IP and MAC level protocol header(s) for a data packet(s) used to send the IP data. If a datagram fits into an IP packet, the outbound processor builds headers to send the datagram and then uses the plural host memory addresses defining the host data to read the data from the host, places the data into the packet and sends the packet.

If a datagram is greater than a certain size, the outbound processor generates packets with fragments of the datagram using the NCB information to build headers and then uses the plural host memory addresses defining the host data to read the data from the host, places the fragments of the datagram into each packet and sends the packets.

In yet another aspect, a method for processing TCP data packets generated by a host system using an outbound processing state machine in an outbound processor, is provided. The process includes, creating an IOCB with plural host memory addresses that define the host data to be sent and a memory address of a NCB used to build network protocol headers, wherein the host sends the IOCB to the outbound processor; verifying if a TCP window is open; building TCP/IP/MAC headers; and sending the data packet(s).

In yet another aspect, a method for processing a TCP data transmit request after a TCP window is closed and then reopened by the reception of an ACK packet using an outbound processor is provided. The process includes, reading a network control block (NCB) into a local memory; reading a delayed request (IOCB) linked to the NCB; verifying if a TCP window is open; building TCP/IP/MAC headers; and sending the data packet(s).

In yet another aspect of the present invention, a method for processing fragmented IP datagrams received from a network is provided. The method includes, receiving the IP fragments into buffers in a local memory; linking the IP fragment to a reassembly list for a particular IP datagram; and when all fragments are present, sending the complete datagram to TCP or a host for additional processing.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIGS. 3A-1 shows an example of an IOCB, according to one aspect of the present invention;

FIG. 3A1-1-3A6 (jointly referred to as FIG. 3A) is a block diagram of a system, according to one aspect of the present invention;

FIG. 3C shows a block diagram of an input processor used by the ITP processor shown in FIG. 3B;

FIG. 3C1 shows an option block state machine diagram used by the input processor of FIG. 3C;

FIG. 3C2 is a validation state machine diagram used by the ITP, according to one aspect of the present invention;

FIG. 3C3 is a validation state machine diagram for Reset, SYN or invalid state according to one aspect of the present invention;

FIG. 3C4 shows a state machine diagram for trimming, as used by the ITP, according to one aspect of the present invention;

FIG. 3C5 shows a validation state machine for time stamp functionality, according to one aspect of the present invention;

FIG. 3C6 shows an acknowledgement processor used by the ITP, according to one aspect of the present invention;

FIG. 3C7 shows a data processing state machine diagram as used by the ITP, according to one aspect of the present invention;

FIG. 3C8 shows an in order data processing state machine diagram as used by the ITP, according to one aspect of the present invention;

FIG. 3C9 shows an out of order data processing state machine diagram as used by the ITP, according to one aspect of the present invention;

FIG. 3C10 is a block diagram of an ITP output processor state machine as used by the ITP, according to one aspect of the present invention;

FIG. 3D1 is a block diagram of a timer list state machine, according to one aspect of the present invention;

FIG. 3I is a block diagram of an outbound TCP processor ("OTP"), according to one aspect of the present invention;

FIG. 3J is a block diagram of an input verification processor ("IVP or IPV"), according to one aspect of the present invention;

FIG. 3J1 shows a buflet list, according to one aspect of the present invention;

FIG. 3L1 shows a link list data flow diagram for IP reassembly as performed by IFP, according to one aspect of the present invention;

FIG. 3L2 shows an input processor block diagram as used by the IFP, according to one aspect of the present invention;

FIG. 3L3 shows a state machine flow diagram for input registers used by the IFP, according to one aspect of the present invention;

FIG. 3L4 is a block diagram of the fragment processor used by the IFP, according to one aspect of the present invention;

FIGS. 3L5A-3L5C show a state machine diagram for the fragment processor of FIG. 3L4, according to one aspect of the present invention;

FIGS. 3L6A-3L6D show a flow diagram for an IFP place data state machine, according to one aspect of the present invention;

FIGS. 3L7A-3L7B show a flow diagram for an IFP trim state machine, according to one aspect of the present invention;

FIG. 3L8 shows a flow diagram for an IFP hash logic state machine, according to one aspect of the present invention;

FIGS. 3L9A-3L9B show a flow diagram for a time processor state machine used by the IFP, according to one aspect of the present invention;

FIG. 3L10 is a flow diagram for an output processor in the IFP, according to one aspect of the present invention;

FIG. 3L11 shows a return processor state machine diagram, according to one aspect of the present invention;

DETAILED DESCRIPTION OF THE PREFERRED EMBODIMENTS

Figure 2A:
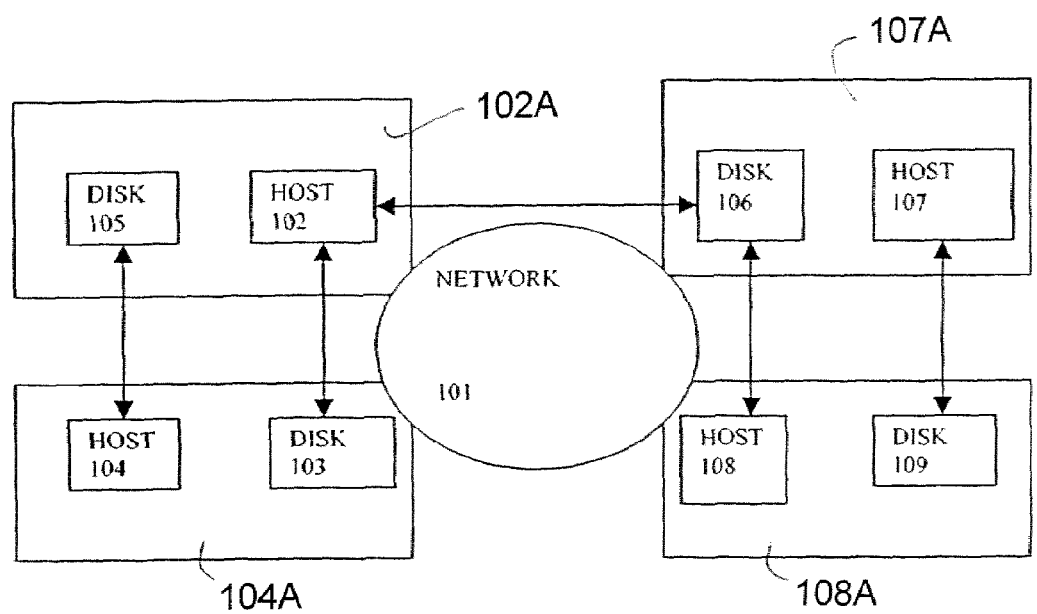
FIG. 2A is a block diagram showing a typical storage area network.

FIG. 2A shows a typical storage area network 100 with host systems 102, 104, 107 and 108 coupled to various disks 103, 105, 106 and 109 (in network systems 102A, 104A, 107A and 108A) via IP network 101. The description of various adaptive aspects of the present invention below, are based on host 104, however, that is merely to illustrate one aspect of the present invention. Host system 104 (or others) are not described in detail, but it includes a central processing unit (CPU), a system memory (typically, random access memory "RAM"), read only memory (ROM) coupled to a system bus and a DMA controller unit.

In one aspect of the present invention, a single chip system 300 of FIG. 3A is provided that allows connection of a SCSI based mass storage device system directly to a gigabit Ethernet LAN. The system (chip) according to the present invention can be used for both initiator and target applications (i.e. can be used on a host bus adapter or on a redundant array of inexpensive disks ("RAID") controller). The chip provides hardware assistance to improve the speed of iSCSI read and write transactions as well as a full hardware implementation of a TCP/IP protocol stack to assure full gigabit operation. The chip also includes an embedded gigabit Ethernet MAC, to connect a PCI based host to a LAN.

The present invention provides a hardware implementation of a full network protocol stack. Application Programming Interfaces (APIs) to this protocol stack are made available to allow host software to take advantage of the hardware acceleration for straight network applications.

Figure 2B:
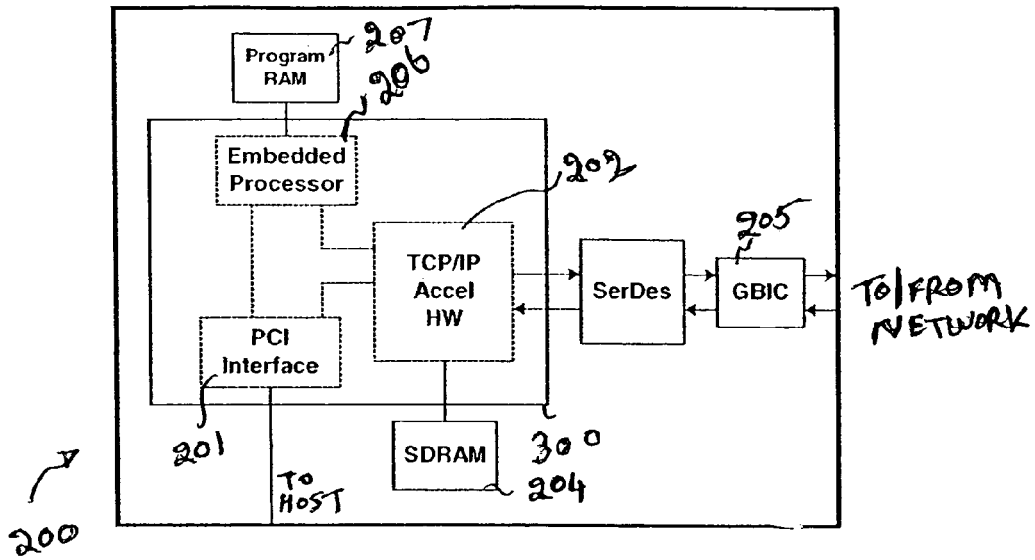
FIGS. 2B-2C show block diagrams of the system according to the present invention in an FPGA and ASIC implementation.

The present invention may be used on a PCI development board with a Field Programmable gate Array ("FPGA"). The chip may also be integrated into an Application Specific Integrated Circuit ("ASIC") with an embedded serialize/de-serializer ("SERDES" 203. FIG. 2B) and internal programmable RAM 207 and SDRAM 204.

FIG. 2B shows a top-level block diagram of system 200 using system 300 as described below in detail on an FPGA board. FIG. 2B shows system 300 that includes an embedded processor 206 (which may include more than one processor) and a TCP/IP accelerator 202 that implements the TCP/IP protocol in hardware. GBIC 205 couples system 300 to a network.

Figure 2C:
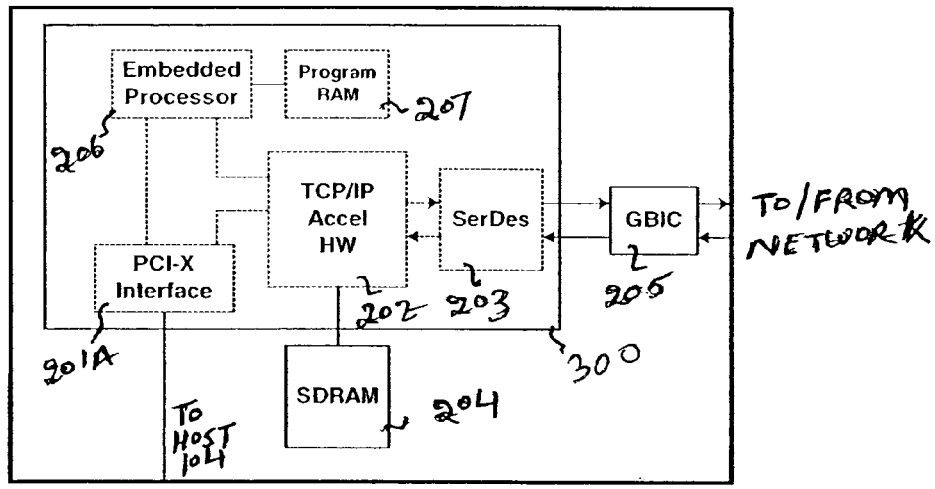

FIG. 2C shows an ASIC implementation 200A using system 300, which will now be described in detail.

FIG. 3A shows a block diagram of system 300 according to one aspect of the present invention, with various components described below. Outbound Processor ("OAP") 312, RISC Memory Interface (RMI) 313, Inbound Processor ("IAP") 307 and the Non-Data PDU FIFO block ("NPF") 314 implement the Upper Layer Protocol Processing (ULPP) Subsystem. The ULPP Subsystem, along with downloadable firmware, provides a mechanism for processing various protocols that can run on top of the TCP/IP protocol. iSCSI is one example of an upper level protocol that could be run by ULPP Subsystem.

MAC Transmit module 304, Outbound IP/MAC Processor module ("OIP") 308 and the Outbound TCP processor ("OTP") 309 implement the Outbound TCP/IP Hardware Stack, which processes all outbound networking requests from Host 104 and the ULPP subsystem (not shown).

MAC Receive module 303, Inbound FIFO Block (IFB) 325, the IP Verify/Input Queuing module ("IPV") 302A, IP fragment Processor ("IFP") 305 and the Inbound TCP Processor ("ITP") 306 implement the Inbound TCP/IP Hardware Stack, which processes all inbound networking packets destined for Host 104 or the ULPP Subsystem.

Memory Access Manager ("MAM") 301, Buflet List Manager 302 and Local RAM 337 implement the Local Memory Subsystem, which is used to store received network frames while they are processed, TCP connection state information and various other state information used by the TCP and IP protocol standard.

PCI/PCI-X Interface 341 (same as 201 and 201A. FIG. 2B) and direct memory access ("DMA") Arbiter (DA) 342 implement a DMA subsystem that is used to transfer data between system 300 and host 104. Network Request Manager ("NRM") 333 and the Network Completion Manager ("NCM") 336 implement a subsystem for transferring messages between the TCP/IP hardware engines and host 104 via 341 and 342. SCSI Request Manager ("SRM") 334 and SCSI Completion Manager ("SCM") 335 perform the same function for the ULPP subsystem. Outbound DMA Engine ("ODE") 338 and Inbound DMA Engine ("IDE") 317 are used to transfer network data between Host 104 and System 300. This data can consist of TCP, IP or MAC level packet data. The remaining modules of system 300 provide other support functions for the subsystems described below.

The following provides a description of various FIG. 3A components:

PCI Interface 341 (PCI I/F):

PCI Interface 341 performs the following functions:

a Implements a state machine to read PCI (described in the PCI standard, incorporated herein by reference in its entirety) configuration from serial non-volatile random access memory ("NVRAM") 339. PCI Interface 341 also provides access to the NVRAM for the Host 104 and OAP 312 via the Register Block 320.

b Provides an interface to directly access Flash BIOS read only memory (ROM) 340. PCI Interface 341 also provides an indirect access to flash for both Host 104 and OAP 312 via Register Block 320.

c Implements PCI Master function for System 300. This allows System 300 to become the bus master on a PCI bus and DMA data to/from Host 104 memory.

d Implements PCI Slave function for System 300. This allows Host 104 to access the various registers on System 300.

e For DMA writes to Host 104 memory, PCI I/F 341 accepts data streams and route bytes to the appropriate byte lanes on PCI. This includes unpacking the data when addresses are misaligned.

f For DMA reads from Host 104 memory, PCI I/F 341 byte packs data onto output data bus. This occurs when the DMA address is mis-aligned. PCI I/F 341 signals back to System 300 how many bytes are transferred on each access across PCT. This is used to update a transfer length counter in DA 342.

g Automatically reconnects to the PCI bus (not shown) when disconnected during a DMA and continues the data transfer.

h Internally tracks the progress of DMA. This includes the address and length of data transferred. This allows the core to restart a DMA that is disconnected without assistance from chip logic.

DMA Arbiter (DA 342):

DA 342 takes all connected block requests for DMA, prioritizes and executes each request. DA 342 provides synchronization across clock domains from the variable PCI clock (0-133 MHz) to an internal system clock. DA 342 provides a generic Host 104 register access port to Register Block 320 to hide the actual host bus.

Most functional components that interact with DA 342 request a fixed length of data. DA 342 knows the lengths for these components and requests the appropriate size of DMA transfer without the need for the block to provide the length.

DA 342 converts the "little endian" format of the PCI bus to the "big endian" format used by System 300. This requires DA 342 to do word swaps for components that perform control structure movements. For components that perform packet data movement, DA 342 does an 8 byte swap (i.e. from the least significant byte ("LSB") to most significant byte ("MSB") and MSB to LSB).

For outbound DMA engine (ODE) 338, DA 342 accepts a control bit that indicates control structure access versus data access. On control structure access, it also performs word swaps.

For IDE 317, ODE 338 and SDE 319, DA 342 implements large memory based FIFOs to provide for long bursts on PCI-X 341.

For remaining components, DA 342 has a small (16-64 bytes) FIFO for each client to allow the client to queue up its entire transfer before the PCI DMA is requested to PCI Interface 341.

Register Block 320

Register Block 320 performs the following functions:

Implements Configuration, Control, Status and Port Serial identification ("ID") registers; provides interfaces for other components that have Host 104 accessible registers and generates timer tick for TTM 323. Register Block 320 also provides interface to external Flash BIOS ROM 340 via register access and multiplexes signals from PCI I/F 341 to access BIOS ROM 340 via this external interface; and provides interface to external Serial NVRAM 339 via register access and multiplexes signals from PCI I/F 341 to access NVRAM 339 via this external interface.

Network Request Queue Manager (NRM 333):

NRM 333 maintains a queue that Host 104 can place requests for data transmission and passes these requests to Network Pipeline 300A when it is ready. NRM 333 manages Host 104 memory resident circular queue with Host 104 as the producer and System 300 as the consumer.

NRM 333 maintains a pair of pointers (the producer and consumer pointers) that track the requests in the circular queue. Host 104 updates the producer pointer when it places new requests in the queue and System 300 updates the consumer pointer when it takes the request from the queue.

NRM 333 also maintains a copy of the consumer pointer in Host 104 memory location to keep Host 104 from having to read from System 300 to find out if a queue entry has been used. This allows Host 104 to use a fast memory fetch to see the pointer instead of a slow I/O fetch to read the register.

NRM 333 also provides a special operating mode for OTP 309 to allow it to read down a request, except the last word. The last word is read if resources are found to allow the request to be processed. If the resources are not there, OTP 309 aborts the request and later asks the same request to be passed down when the resource is available.

Network Completion Queue Manager (NCM 336)

NCM 336 maintains a message queue between System 300 and Host 104. It takes completion messages from any of the attached components, prioritizes them and then passes a completion message to Host 104 memory queue.

NCM 336 manages a Host 104 memory resident circular queue with System 300 as the producer and Host 104 as the consumer. NCM 336 maintains a pair of pointers (producer and consumer pointers), which track messages in the circular queue. System 300 updates the producer pointer when it places new messages in the queue and Host 104 updates the consumer pointer when it takes the message from the queue.

NCM 336 also maintains a copy of the producer pointer in a Host 104 memory location to keep Host 104 from having to read System 300 to find out if a queue entry has been filled. This allows Host 104 to use a fast memory fetch to see the pointer instead of a slow I/O fetch to read the register.

NCM 336 generates a signal to cause DA 342 and PCI Interface 341 to generate an interrupt when the completion message is in Host 104 memory. NCM 336 implements interrupt avoidance rules to prevent unnecessary interrupts from being generated.

Request Arbiter (RA 310)

Request Arbiter 310 takes requests from TTM 323, ERM 311 and NRM 333, arbitrates between them and grants them access to the Network Pipeline 300A.

RA 310 also provides three programmable priority schemes; round robin, network highest or OAP 312 highest and grants access when Network Pipeline 300A is idle as indicated by various idle signals.

Outbound DMA Engine (ODE 338):

ODE 338 takes DMA requests from OTP 309 and OIP 308, multiplexes them into a single DMA request and then passes the individual requests to Memory Access Manager (MAM 301), DA 342, or to RISC Memory Interface (RMI 313). ODE 338 also accepts a signal from components that indicate whether the DMA requested is for data or control structures and passes it to DA 342 to program the proper type of "little to big endian format conversion"; and truncates 64 bit address to a 32 bit address for access to MAM 301 and RMI 313. ODE 338 also word-packs 32-bit data from MAM 301 or RMI 313 into 64-bit data.

Outbound TCP Processor (OTP 309): OTP 309 provides the following functions:

Handshakes outbound data transfer requests, also known as I/O Control Blocks (IOCBs) from RA 310. These requests can originate from Host 104 or OAP 312.

Obtains connection state information, Network Control Block (NCB) from Host 104 memory, RISC memory or Local RAM 337 via TCP Table Manager (TTM 323) block.

Sends as much data as allowed by TCP windowing protocol and congestion avoidance algorithms. This involves fetching address lists from Host 104 or RMI 313 and then fetching the actual data from Host 104 memory, RMI 313 or Local RAM 337.

The process of sending data includes signaling OIP 308 to build the IP and MAC layer headers, building the TCP header and then passing the header and data to OIP 308 to be sent onto the Ethernet link. It also includes saving new connection state in NCB and write the NCB to Local RAM 337 for later use when ACKs are returned from remote node via TTM 323 interface. As ACKs return, OTP 309 sends more data if needed or else finish processing request and passes a completion message to Host 104 signaling that the request is done.

OTP 309 supports all currently defined congestion control techniques including; Slow start, congestion avoidance, fast retransmit and fast recovery. (Per the RFC2581 standard, incorporated herein by reference in its entirety).

Outbound IP Processor (OIP 308):

OIP 308 processes both MAC and IP transfer requests (IOCBs) and transmits the associated data. It also acts as a pass through for TCP data from OTP 309. OIP 308 performs the following: For MAC layer transfers, System 300 passes an entire frame from Host 104 memory to the link. The hardware assumes that Host 104 has completely formatted the frame, with the possible exception of inserting the source address.

The term MAC throughout the specification means Media Access Control, as used with respect to MAC address and MAC layer. Media Access Control address, is a hardware address that uniquely identifies each node of a network. In IEEE 802 networks, the Data Link Control (DLC) layer of the OSI Reference Model is divided into two sublayers: the Logical Link Control (LLC) layer and the Media Access Control (MAC) layer. The MAC layer interfaces directly with the network media. The MAC sublayer uses MAC protocols to ensure that signals sent from different stations across the same channel (link) don't collide.

Media Access Control Layer is one of two sublayers that make up the Data Link Layer of the OSI model. The MAC layer is responsible for moving data packets to and from one Network Interface Card (NIC) to another across a shared channel.

OSI is an ISO standard for worldwide communications that defines a networking framework for implementing protocols in seven layers. Control is passed from one layer to the next, starting at the application layer in one station, proceeding to the bottom layer, over the channel to the next station and back up the hierarchy.

For MAC frames less than 64 bytes, OIP 308 pads them to be 64 bytes. For IP layer transfers, System 300 builds the IP header from information contained in an NCB, whose address is passed down in the IOCB. OIP 308 then DMAs the data for the IP packet from Host 104, RMI 313 or Local RAM 337 using ODE 338. OIP 308 also fragments IP packets that are larger than programmed maximum transmission unit ("MTU") size of the Ethernet link. This requires generation of new IP and MAC headers for each fragment of the IP datagram.

OIP 308 generates MAC and IP headers for pass through data sent by OTP 309; generates IP, TCP and/or UDP checksums and inserts them into the data stream; stops transmitting packets (at the next possible packet boundary) when the MAC signals that a Pause frame has been received. OIP 308 sends Pause packets after the next packet when Buflet List Manager (BLM 302) indicates it is too low on memory to receive new frames and sends the "resume frame" when BLM 302 indicates it is time to send.

IP requests coming from Host 104 are in two forms, fully formed datagrams to be passed without modification or IP data to have a header attached to it. For fully formed datagrams, System 300 adds a MAC header and passes it to Outbound FIFO Block OFB 326. For IP data requests, OIP 308 builds complete IP header from entries in the NCB. OIP 308 may fragment the resulting datagram and add a MAC header. This means that all relevant IP fields in the NCB are filled before the send request is made.

Outbound FIFO Block (OFB 326):

The function of OFB 326 is to store outbound frames and then burst them to the Ethernet Network. OFB 326 is sized to handle jumbo packets and stores/forwards frames so that no underruns occur due to a slow back plane. OFB 326 also implements shadow pointers for TCP and IP checksum insertions and records memory locations for words with the TCP and/or IP checksum location tags.

Ethernet MAC 304A:

Ethernet MAC 304A (or MAC 304A) supports a full duplex operation and supports a connection to an external Serializer/Deserializer (SerDes) via a Ten Bit Interface (TBI). Ethernet MAC 304A handshakes received frame data for inbound FIFO (IFB) 325 and verifies CRC. It then provides a signal to inbound FIFO (IFB) 325 to flush a current frame if a received frame is too short, too long, invalid EOP, invalid transmission character, or bad cyclic redundancy check ("CRC").

Ethernet MAC 304A can source a status word to Inbound FIFO (IFB) 325 as the last word of each frame, which specifies frame length, broadcast, multicast, unicast and length of the MAC header and pad 2 bytes before MAC header to the packets intended for inbound FIFO (IFB) 325 to align the IP header on a 64 bit boundary. Ethernet MAC 304A also adjusts MAC header length and total length in status word to account for this.

Ethernet MAC 304A generates CRC for transmit frames, supports reception of Ethernet and IEEE 802.3 frames, and supports VLAN/Priority for which a receiver removes VLAN tags, if present, to keep subsequent protocol headers aligned. The VLAN tag is passed up as part of the status word. Ethernet MAC 304A recognizes a pause packet and provides a pause signal to OIP 308; and supports 1-4 MAC unicast addresses (reception). Ethernet MAC 304A also provides receive error counters, including CRC error, invalid transmission characters, loss of signal/loss of sync greater than a certain value, for example 10 ms, frame too short, or frame too long. It also provides counters for: transmitted frame count, transmitted byte count, received frame count, and received byte count.

Ethernet MAC 304A also generates and checks parity, accepts all packets to multicast addresses, supports auto-negotiation as defined in IEEE802.3 Section 37, and inserts source MAC address in transmitted frame 303B.

Inbound FIFO Block (IFB 325):

IFB 325 buffers incoming Ethernet frames while MAC 304A (at MAC Rx 303, the receive segment of MAC 304A) validates them. IFB 325 allows for crossing from the 62.5 MHz receive clock domain of MAC 304A to the 62.5 MHz system clock domain of System 300. IFB 325 also provides storage for a jumbo frame, a shadow pointer to allow a status word to be written at the head of the frame and the frame to be flushed or dumped.

Buflet Free List Manager (BLM 302):

BLM 302 manages a list of empty buffers (also called buflets) used to receive frame data. BLM 302 delivers empty buflets to IPV 302A and accepts empty buflets from any of the inbound components that processes incoming data. BLM 302 initializes Local RAM 337 to create the original list of free buflets; provides for a programmable buflet length; and sends a signal to OIP 308 to send a Pause packet if free buflet list gets below programmable threshold and removes the signal when the list grows back above threshold.

BLM 302 also implements a state machine that operates in the background and runs a linked list, counts the number of buflets and then compares a current count. If a comparison error occurs, BLM 302 sets a status bit and sends a signal to MAM 301 to stop memory access; and sends the threshold window of buflets available (2'b11=almost full, 2'b00=almost empty) to ITP 306. This is used to adjust the window on active connections.

IP Verifier (IPV 302A):

IPV 302A moves received frames from IFB 325 to buflets in Local RAM 337. IPV 302A performs header checking for IP packets and a first pass calculation of the TCP/UDP checksum, if present. IPV 302A also passes packets to Host 104 via IDE 317, to OAP 312 via input list manager (ILM) 324 or to IFP 305, when needed. IPV 302A also adjusts pointers and lengths in the buflet header to move past MAC and possibly IP headers to assist later modules to find their headers; and calculates TCP/UDP checksum as data is moved to RAM 337. This creates the pseudo header from the data, which is a part of the TCP checksum.

If a received MAC frame is not for IP, the address of the first buflet of the frame is passed to IDE 317 and sent to Host 104 for disposition. If MAC type field=IP, IPV302A adjusts the buffer offset field in the buflet to skip over the MAC header. IPV 302A also adjusts the length in the status word to conform to the length of the IP data payload.

If a packet is for IP, IPV 302A verifies the header. Packet verification includes: header length check (>=20), header checksum check, IP version supported, and data length versus actual packet length check. IP packets that don't pass verification are discarded and their buflets returned to BLM 302. If a packet header is verified and IP address is not proper, address of the first buflet of the frame is passed to IDE 317 and sent to Host 104 for disposition.

If packet header is verified, and IP address is proper, address of the first buflet of the frame is added to an output list maintained by IPV 302A for the IP Fragment Processor 305. Details of IPV302A functionality are provided below.

IP Fragment Processor (IFP 305):

IFP 305 receives IP fragments, reassembles them into a complete datagram and then delivers the datagram to Host 104 or ITP 306, which ever is appropriate. IPV 302A also handles overlapping fragments and trims the fragments. Temporary storage of datagram fragments is via a linked list, referenced by a hash table, maintained in Local RAM 337. Each datagram is identified by a 4-tuple {IPID, IPSRC, IPDST, IPP}. This identifier is hashed to a 16 bit value. A programmable number of bits are used to index into a hash table to search for a linked list of fragments.

IFP 305 also provides a timer to time each datagram reassembly with a default timeout value. The timeout value is programmable. A time ordered list of datagrams is maintained by using a timeout linked list. The oldest entry in the list is at the head of the list. If a timeout occurs, the entire datagram is removed from the reassembly list and its buffers returned to the free list.

If a packet is received that has an error that requires an ICMP message to be returned, a completion message is sent to Host 104 with enough information to allow it to build the return error message.

If overlapping fragments arrive, a flag is set in the status word to indicate TCP checksum needs to be rerun on completed datagram and data is re-read. Note that a counter is incremented each time this occurs.

Details of IFP 305 functionality are provided below.

Inbound TCP Processor (ITP 306):

ITP 306 processes incoming TCP segments, re-orders out of order segments and then passes TCP data to Host 104 or OAP 312 for delivery to an application. If the TCP data is for an iSCSI connection, the data is passed to IAP 307 instead.

ITP 306 also retrieves NCBs, via TTM 323, using source and destination IP addresses and the source and destination TCP port numbers. ITP 306 updates connection state information (NCB) based upon what was received in the segment.

ITP 306 also maintains a segment reassembly list for each connection. This list is linked from the NCB. It supports passing out of order segments to IAP 307 to allow out of order data placement at the iSCSI level. A configuration bit controls this option.

TCP data passed to Host 104 has the TCP header stripped. "FIN" segments as well as segments for unknown connections are passed to Host 104 with their headers. Details of ITP 306 are discussed below.

Details of ITP 306 are discussed below.

Inbound DMA Engine (IDE 317):

IDE 317 moves data from Local RAM 337 buflets to Host 104 memory. This is done at the request of various inbound processing modules (IPV 302A, IFP 305, ITP 306 and IAP 307). If IDE 317 gets behind in the actual processing of the requests, it maintains an input list of requests to be processed. IDE 317 takes data from Local RAM 337 and DMAs it into Host 104 memory using large data buffers from RBM 318. It creates a list of these buffers in a small buffer from RBM 318 and passes a pointer to this list and two status words to NCM 336 to create a completion entry. If RBM 318 detects a low condition on either of its queues, IDE 317 generates a Buffer Alert completion message indicating a low queue condition. When the DMA is completed, IDE 317 returns the buflet chain to BLM 302.

Rx Buffer Queue Manager (RBM 318): RBM 318 manages two queues that pass pointers to empty Host 104 buffers, from Host 104 to System 300. These buffers are not associated with any particular protocol layer or application and are used to receive all data that is not associated with an iSCSI exchange. One queue maintains a pool of small (for example, 64-512 bytes) buffers and the other queue maintains a pool of large (for example, 512-64K) buffers.

RBM 318 manages Host 104 memory resident circular queues with Host 104 as the producer and System 300 as the consumer. It maintains a pair of pointers, producer and consumer pointers, which tracks requests in each circular queue. Host 104 updates the producer pointer when it places new entries of empty buffers in the queue and System 300 updates the consumer pointer when it takes the entries from the queue. RBM 318 also maintains a small FIFO of buffer addresses (large and small) to provide buffers to IDE 317 in a timely manner and signals IDE 317 when the last entry on either queue is taken. This is used to send a message to Host 104 that inbound stream is flow controlled, potentially losing Ethernet packets.

TCP Table Manager (TTM 323)

TTM 323 manages TCP connection state tables for ITP 306, OTP 309 and IAP 307. This includes locating, loading from Local RAM 337 or Host 104 memory, writing back to Local RAM 337 and maintaining coherency of the NCBs. TTM 323 provides working NCB register sets for ITP 306, OTP 309 and IAP 307; provides Read/Write access to the working register sets for OTP 309, OIP 308, ITP 306 and IAP 307. This allows simultaneous access to ITP 306, IAP 307 and outbound as well as internal access to the registers.

TTM 323 also provides Fetch/Update/Flush functions for working register sets from Host 104 memory, RISC memory or to/from Local RAM 337; signals an error to ITP 306/IAP 307 if a requested inbound NCB is not found in Local RAM 337; signals an overload condition to OTP 309 if Local RAM 337 memory resources are not available; maintains timer functions for all TCP connections; and coordinates inbound and outbound channel's access to the network data structures.

TTM 323 maintains a free list of 64 byte data structures, Delayed Request Blocks (DRB), which are used to place outbound IOCBs that are waiting to be processed. DRBs are also used to place Outbound Address Lists associated with the IOCB, into Local RAM 337. When an OAL is placed into Local RAM 337, it is referred to as a Delayed Address List (DAL).

TTM 323 also maintains a free list of data structures to contain NCBs for connections that are being processed by the hardware; and maintains an outbound request list. This is a linked list of NCBs processed by OTP 309. ITP 306 and the timer list manager add NCBs to the list.

Details of TTM 323 are also provided below.

TTM DMA Engine (TDE 315): TTM DMA Engine 315 DMAs NCBs from Host 104 memory or RMI 313 to TTM 323.

Memory Access Manager (MAM 301):

MAM 301 provides a generic and simple interface for many of System 300's components to Local RAM 337. MAM 301 manages various requests for Local RAM 337 access, and coordinates them to provide the maximum bandwidth access to Local RAM 337.

MAM 301 passes parity to IPV 302A, writes and generates parity on all other module writes; checks parity on all module reads and passes parity to IDE 317, SDE 319, PMD 321 and ODE 338 reads.

MAM 301 provides a transaction buffer for each interface to help accumulate data for bursting and can freeze all memory access, via a control register bit to allow Host 104 to view Local Memory 337. Access to local RAM 337 is frozen if a fatal chip error is detected.

MAM 301 performs read-modify-write operation for write access that are less than 64 bits.

SCSI Request Manager (SRM 334): SRM 334 manages the message queue for passing iSCSI requests (IOCBs) from Host 104 to OAP 312. SRM 334 also implements the SCSI request queues as circular queue in Host 104 memory with Host 104 as the producer and System 300 as the consumer. SRM 334 accepts a pointer from SCM 335, which points to an empty buffer in RISC Memory; reads down the IOCB from Host 104 request queue and passes it to the buffer provided by SCM 335. SRM 334 maintains a copy of the consumer index in Host 104 memory and interrupts OAP 312 to indicate that a request is pending in RMI 313. It also provides a register for OAP 312 to read the address of the buffer where the next request has been placed. SRM 334 also maintains a list of buffers waiting to be processed by OAP 312, if OAP 312 lags in processing.

SCSI Completion Manager (SCM 335): SCM 335 transmits messages from OAP 312 to Host 104. These messages report the status of previous I/O requests or the occurrence of an unexpected event. SCM 335 implements the SCSI completion queue as circular queue in Host 104 memory with Host 104 as the consumer and System 300 as the producer. It accepts a pointer from OAP 312, which points to a buffer in RMI 313; reads completion messages from RMI 313 and passes it to a completion queue entry in Host 104 memory; and maintains a copy of the producer index in Host 104 memory.

SCM 335 interrupts Host 104 to indicate that a completion is pending on the queue, using normal interrupt avoidance techniques; adds RMI 313 buffer back to the free list when a completion message is sent to Host 104; and accepts a linked list of completion buffers from OAP 312, if SCM 335 gets behind OAP 312.

RISC Memory Interface (RMI 313):

RMI 313 acts as an arbiter for various devices that want to access RISC RAM. RMI 313 includes a sequencer state machine to control access to an external Synchronous SRAM.

RMI 313 maintains a pipeline of requests for memory to keep SSRAM interface as busy as possible; and provides an instruction prefetch mechanism to try and stay ahead of OAP 312 instruction fetches.

Outbound ARC Processor (OAP 312):

OAP 312 processes SCSI requests from Host 104, converts them into the associated iSCSI PDUs and sends them via the hardware TCP stack. OAP 312 also processes incoming iSCSI PDUs and performs the required operations. When a particular SCSI/iSCSI operation is complete, OAP 312 sends a completion message to Host 104.

PCI to RISC DMA Engine (PRD 322):

PRD 322 assists OAP 312 in moving data between Host 104 memory and RMI 313.

PCI to MAM DMA Engine (PMD 321):

PMD 321 assists OAP 312 in moving data between Host 104 memory and Local RAM 337. Data can be moved in either direction.

a. Embedded Processor Completion Queue Manager (ECM 316):

ECM 316 maintains a message queue between Network pipeline 300A and OAP 312. It takes completion requests from any of the attached components, prioritizes them and then passes completion messages to OAP 312.

ECM 316 also implements a circular queue with System 300 as the producer and OAP 312 as the consumer. The queue is maintained in RMI 313.

ECM 316 generates an interrupt to OAP 312, when completion is DMAed into RMI 313.

EP Request Manager (ERM 311):

ERM 311 manages a queue of transmit requests from OAP 312 and passes them to Network Pipeline 300A to be processed. This functionality is almost identical to that of NRM 333.

ERM 311 also manages a RISC memory resident circular queue, with Host 104 as the producer and System 300 as the consumer. It maintains a pair of pointers, the producer and consumer pointers, that track the requests in the circular queue. Host 104 updates the producer pointer when it places new requests in the queue and System 300 updates the consumer pointer when it takes the request from the queue.

ERM 311 provides a special operating mode for OTP 309 to allow it to read down a request, except the last word. The last word is read if resources are found to allow the request to be processed. If the resources are not there, OTP 309 aborts the request and later asks for the same request when the resource is available.

EP Input List Manager (ILM 324):

ILM 324 takes buflet indexes of network packets that are destined to OAP 312 and generates completion messages to be passed to ECM 316 for delivery to OAP 312. ILM 324 also maintains a list of packets that are waiting to have completions generated, if ILM 324 gets backed up.

Inbound ARC Processor (IAP 307):

As described below in detail, IAP 307 processes incoming TCP segments destined for iSCSI or other designated protocols. IAP 307 has access to Local RAM 337 to interrogate received packets and has access to TTM 323 to fetch, update and writeback NCBs associated with the received TCP segments.

IAP 307 can also access SDE 319 to allow IAP 307 to move data from Local RAM 337 to Host 104 memory.

IAP 307 shares access to OAP 312's program RAM. With this, OAP 312 and IAP 307 can communicate regularly where to put the received data.

IAP 307 also has an interface to NPF 314, which allows it to pass packets from Local RAM 337 to RISC memory and has an interface with ITP 306, from which it gets the info on the next segment to process.

It is noteworthy that IAP 307 is not limited to any particular processor.

a. Non-Data PDU FIFO Block (NPF 314):

NPF 314 moves iSCSI protocol data units ("PDUs") from Local RAM 337 into RISC RAM (not shown). For each PDU moved, an interrupt may be generated to OAP 312. IAP 307 programs NPF 314 data movements. NPF 314 offloads OAP 312 from having to fetch the PDU from Local RAM 337 and wait for its arrival. It also checks the iSCSI digest for the data portion of the PDU and flags the PDU as good or bad. CRC checking is enabled by IAP 307.

NPF 314 also accepts pointers for empty RISC memory buffers and maintains a free list of buffers to place PDU data into. NPF 314 provides a register interface for OAP 312 to give free buffers to NPF 314; and accepts one or two words of data to be attached to PDU data in RISC memory for each A/L.

NPF 314 accepts address and length of PDU to read from Local RAM 337; and moves PDU data from Local RAM 337 to free buffers. PDUs can be larger than the size of an individual buffer, therefore NPF 314 can link a number of buffers together to fit the entire PDU. When all data for an A/L is moved to RMI 313, NPF 314 signals IAP 307 that it is done, so that IAP 307 can free the buffer.

NPF 314 provides a register interface for OAP 312 to read the buffer pointers from NPF 314. NPF 314 maintains a two way linked list of PDUs ready to be read by OAP 312, if it lags.

SCSI DMA Engine (SDE 319):

SDE 319 provides IAP 307 with a DMA channel from Local RAM 337 to Host 104 memory. SDE 319 includes a byte packer function that takes unaligned or less than 8 byte buffers and packs them into 8 byte words before passing them to DA 342 to be sent to Host 104. SDE 319 also provides a data path with byte parity. This channel moves user data.

SDE 319 packs and aligns data from Local RAM 337 to be passed to Host 104 via DA 342; signals IAP 307 after each buflet's worth of data has been transferred; and calculates the iSCSI CRC across all words transferred.

IOCBs

An Input/Output Control Block ("IOCB") is a single entry in one of the request queues, discussed above. The first word of an IOCB is the control word. The control word contains a Command operation code (Opcode) and other control bits that describe how a requested operation is to be processed. The second word is a transaction identifier (ID). The transaction ID is given by host 104 and is passed back in any completion message generated for the IOCB. Host 104 can use the ID to determine which IOCB has completed and to release any resources used for the operation.

In general, each IOCB has three buffer descriptors, which identify data buffers or point to another list of descriptors. The remainder of the IOCB contains command specific information.

System 300 reads the IOCB from host memory (not shown) to execute a requested operation. Once the contents of the IOCB is read, the IOCB entry is returned to host 104 to be reused, even though the requested operation may not be complete. IP and MAC data transmissions are executed immediately, since they do not require any response from the remote node. These operations are handled in order, since the IOCB processing is handled in order.

TCP is handled differently. OTP 309 executes one IOCB until it finishes sending all the data and waits for acknowledgement ("ACK") packets, or if the credit window closes so that no more data can be sent. In these cases, OTP 309 writes a copy of the IOCB to local RAM 337 while it waits for an inbound action that allows the IOCB processing to continue. After the IOCB is saved, OTP 309 attempts to get another IOCB to work on. As all the data for a certain IOCB is sent and the ACK packets are received, OTP 309 generates a completion message. Operations for a particular TCP connection completes in the order in which they are received from the host. This is done to guarantee in order delivery of data to a remote port.

iSCSI PDU transmissions use TCP, and are therefore handled in the same way that TCP is handled. iSCSI exchanges use multiple iSCSI PDUs that are sent and received using TCP. Again, each one of these messages is handled in the same way as TCP packets.

Network Control Blocks (NCB)

NCBs are data structures that are used to provide plural network specific parameters to various modules shown in FIG. 3A. System 300 uses NCBs to build MAC, IP and TCP protocol headers. NCBs are maintained in host memory and in local RAM 337. NCBs include information regarding various status flags, control flags, destination MAC address, source and destination IP address, IP header fields, a pointer to IP options, source and destination TCP ports, host address of the NCB, TCP connection information and various local RAM 337 linked list fields.

NCBs are created in Host 104 memory for TCP and IP operations. NCBs created for iSCSI and TCP operations exist as long as the TCP connection is up. NCBs created for IP operations can be deleted as soon as the IP transmission takes place. When an NCB is created for a TCP operation (and an iSCSI operation, which uses TCP) it is read into System 300 when the TCP connection is established. System 300 maintains a local copy of the NCB for as long as the connection stays up. This allows System 300 to quickly process TCP transfers without needing to access Host 104 memory for each one.

One field in the NCB, the TCP Timer Scale Factor will now be described in more detail. Each TCP timer in System 300 is referenced to a local timer and is defined as a certain number of local timer ticks. The scale factor ("SF") is used to adjust the time interval between timer ticks, on a per connection basis. This is done to allow for faster timeouts on connections that are on a very small network versus connections being run across a very large network. The scale factor is defined as a 3 bit field in the NCB and is an exponential multiplier. The timer tick interval is increased by a factor of $2^{SF}$. The scale factor is used to increase or decrease the timer tick from that defined in the current BSD 4.4 release. A scale factor of 2 uses the same timer defined in the BSD implementation. Scale factors 1 and 0 divide the timers by 2 and 4 respectively. Scale factors of 3 or greater increase the timers by a power of two for each increment above 2.

Network Data Descriptor Processing

Figure 1A:
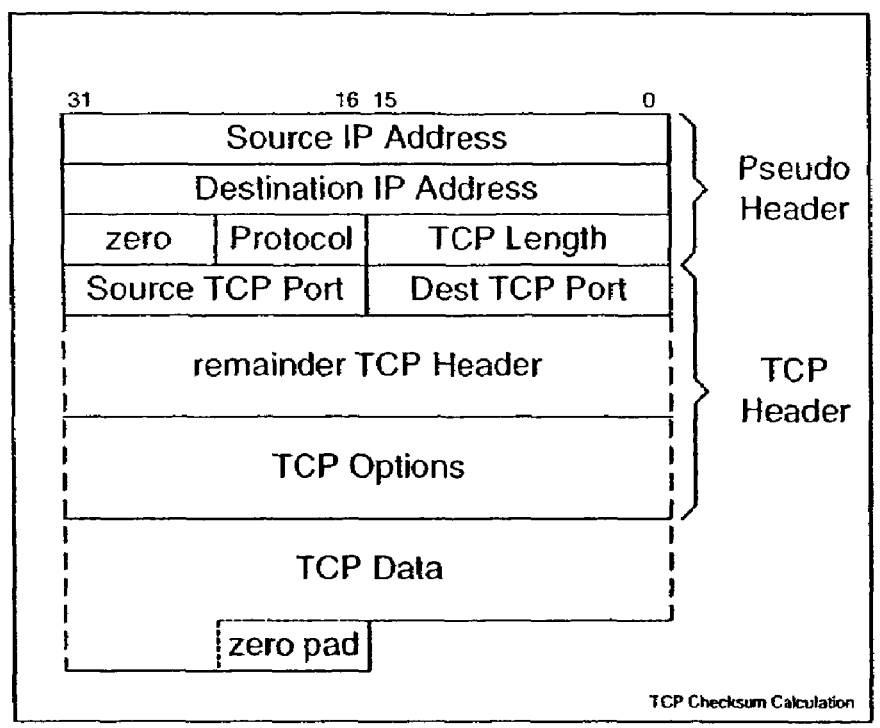
FIG. 1A shows an example of a TCP packet.

An example of a network IOCB is provided in FIG. 3A1. Transmission of network data starts with host 104 creating a network IOCB in the network request queue. NRM 333 reads down the IOCB into its internal buffer and then asserts a request available signal to RA 310 for Network Pipeline 300A. When the pipeline is ready, RA 310 returns a Request Grant signal to NRM 333. NRM 333 then asserts a data available signal to Network Pipeline 300A and puts the first word of the IOCB on the data bus. Each network processor interrogates the data bus to see if it is the intended destination for the request. The destination processor handshakes the IOCB from NRM 333. As the destination processor starts to handshake the descriptor, it also deasserts its idle signal to RA 310. This holds off a new request from being started until the current one is done. When all the processors in Network Pipeline 300A are done, they assert an idle signal, which in turn enables RA 310 to accept another request. Note that the protocol processors only look at the lower bits of the opcode. A value of 01b is a MAC command, 10b is an IP command and 00b and 11b are a TCP commands.

Passing Inbound Data to Host

When any of the inbound processors (for example, ITP 306) want to send data to Host 104, they assert a data available signal to IDE 317. When IDE 317 is ready, it asserts its "acknowledge" and handshake a status word and the address of a list of buflets that contain the data to be passed to Host 104. IDE 317 places the list of buflets on an Output List maintained in Local RAM 337.

When IDE 317 is ready to handle the data, it signals to DMA (i.e to provide "direct memory access") the frame data to Host 104 memory into one or more large Rx buffers. When IDE 317 is done with the buflets, it passes the linked list of buflets back to BLM 302 to be added to the free list. IDE 317 then places the addresses of the large buffers in a small buffer and make a request to NCM 336 to send a completion to Host 104.

When NCM 336 is ready, it acknowledges the request and handshakes the completion data to an internal buffer. IDE 317 handshakes the completion words to NCM 336, which includes the status word and the address of the small buffer that has the list of addresses of the large buffers that contain the frame data. NCM 336 then updates its producer pointer and generate an interrupt, if necessary.

Sending Outbound Completion to Host 104:

Once an outbound processor (for example OTP 309) completes sending requested data, it requests NCM 336 to send a completion message. When NCM 336 is ready to take the completion, it handshakes the completion data into an internal buffer. The processor sends data, with the last word having an end bit set to indicate that there is no more data. NCM 336 DMAs the completion data into the next available completion entry in Host 104 memory, update its producer pointer and generate an interrupt, if necessary. This completes the outbound data transmission.

Local Memory Access:

Local memory 337 may be accessed by plural functional components of System 300 using MAM 301. Each block that can access memory has a read and write bus to MAM 301 as well as a set of handshake signals. MAM 301 can also buffer data for each attached functional block to allow for a reasonable sized burst into memory.

Read Access:

A read access to Local RAM 337 starts with a block writing the start address of the transfer and in cases where the length is not predefined, a length is also written. MAM 301 then reads data into its internal buffer and asserts a data available signal to the block. The block then reads the data using a two wire handshake until all data has been transferred. The two-wire handshake allows MAM 301 and the destination block to flow control the data stream, if necessary. This can occur when MAM 301 is going to fetch more data after the initial burst was read. MAM 301 continues sourcing data until the given length of data has been transferred.

Write Access:

MAM 301 handles write accesses to Local RAM 337 by buffering a certain amount of data and then sending it to RAM 337. A write access starts with a block writing the start address of the transfer and in cases where the length is not predefined, a length is also written. MAM 301 then handshakes a buffer full of data and then writes it to memory. MAM 301 uses a two-wire handshake with all components connected to it to allow for full flow control on any interface if it gets busy with another one. Data continues to be handshaked until the given length is reached.

MAC Frame Transmission

The following subsection discusses transmission of Host 104 originated MAC frames using OIP 308:

Normal Data Frame Transmission:

To send a MAC frame, host 104 sends a descriptor to OIP 308. Thereafter, OIP 308 programs ODE 338 to move Ethernet frames from host memory to outbound FIFO OFB 326. The entire frame is placed into outbound FIFO OFB 326 before the frame is sent. Once a frame is sent, OIP 308 sends a completion message to host 104 through NCM 336. OIP 308 does not process data, but copies it into the outbound FIFO and then sends it. This means that Host 104 must create a complete Ethernet frame (or IEEE802.3 frame, if desired).

Pause Frame Transmission

BLM 302 maintains a count of the number of buflets in its free pool (not shown). If that number drops below a certain threshold, BLM 302 asserts a signal to the MAC transmitter to pause transmission until more buffer space is freed. On the rising edge of the pause signal, OIP 308 creates and sends a Pause frame with the time to pause set to maximum. On the falling edge of the pause signal, OIP 308 sends another Pause frame with the time to pause set to zero. Note that if a request comes from Request Arbiter 310 while processing a Pause transmit, the request is ignored until the Pause frame has been transmitted.

IP Datagram Transmission:

This sub-section discusses transmission of Host 104 originated IP datagram using OIP 308. Host 104 can send two types of IP datagrams, locally generated or one that is being routed through Host 104 with an IP header included in data buffers.

Locally Generated IP Datagrams:

To send an IP datagram, Host 104 sends an IOCB to OIP 308, which includes host memory address of a NCB, with the necessary information to build the network headers. OIP 308 writes the host address of the NCB to TTM 323 register, as described below, and then makes a request to TTM 323 to fetch the NCB from host memory. When the NCB is read, TTM 323 signals OIP 308 that NCB is present. Thereafter, OIP 308 is ready to start sending the data.

Single Packet Datagram:

If the total datagram length fits into one IP packet, OIP 308 builds both the MAC and IP headers in outbound FIFO OFB 326. Destination MAC address is copied from the NCB and source MAC address is copied from the Ethernet MAC Address register. For an IP Header, the IP Version field is set to either 4 or 6, depending on the "IPv6" bit in the NCB. IP header length field is calculated by adding 5 to the IP Option Length field from the NCB. IP Type of Service is copied from the NCB. IP packet length field is calculated from data length field in the descriptor plus the size of the IP header, w/ options. IP Identifier field is taken from a register maintained on System 300 that is incremented for each datagram. IP fragment flags and offset are all set to zero. IP Time to Live is copied from the NCB. IP Protocol field is copied from the NCB. IP Checksum is initially written as zero and is later rewritten after all the data has been moved and the checksum calculated.

IP Source Address is copied from the port's IP Address register. IP Destination Address is copied from the NCB. If the IP Options bit is set, OIP 308 programs ODE 338 to move the fully formed IP options data from Host 104 memory down to the outbound FIFO. After all the other header fields are filled in, OIP 308 sends the calculated checksum with a tag that tells the MAC to write it into the IP checksum field. Note that the IP checksum is always at a fixed offset from the beginning of the Ethernet frame. Once all the data is down in the FIFO, OIP 308 sends a completion message to Host 104 as described.

Fragmented Datagram:

If the total datagram length is greater than a certain size, e.g., 1500 bytes, then OIP 308 proceeds to generate IP packets with fragments of the datagram. The process for sending fragment packets is the same as that used for a single packet datagram with the following exceptions:

The IP Packet Length field for all the packets, except the last one, is the same, e.g., 1500 bytes. The last length is the remainder. The IP fragment flags and offset are set to indicate which fragment is being sent. IP Options are handled differently and only some IP options are copied into each fragment.

Forwarded IP Datagrams:

Forwarded IP datagrams have a single restriction imposed by system 300. This datagram does not require fragmentation. The process to send a forwarded frame is the same as that for locally generated IP traffic with one exception that Host 104 sets the Header ('H') bit in the descriptor. This tells system 300 not to generate the IP header. It also tells the hardware not to do fragment processing.

TCP Data Transmission

This subsection discusses how an IOCB is read from Host 104, and transmitted using OTP 309. It assumes that a TCP connection has already been established.

Figure 4A:
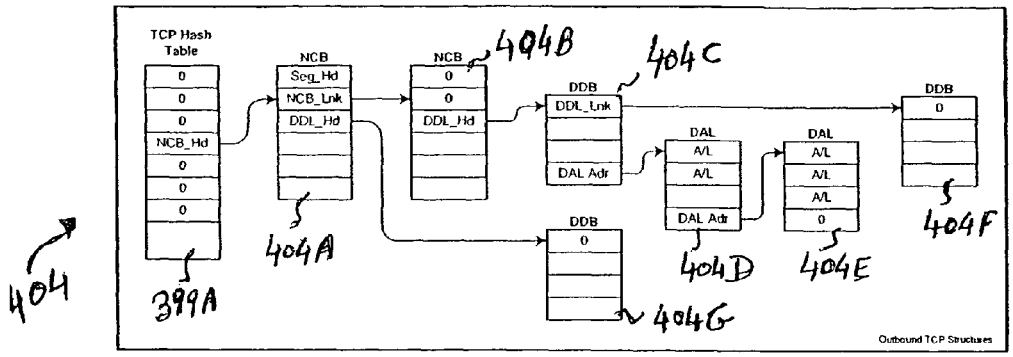
FIG. 4A shows how an initial network IOCB is read from a host and processed to transmit TCP data, according to one aspect of the present invention.

Network IOCB Processing:

FIG. 4A shows how an initial network IOCB is read from host 104, and processed to transmit TCP data (404A-404G). TCP data transmission also goes through a "Delayed Request" process (described later) to process ACK packets received for the data sent. OTP 309 reads a network IOCB and gets the NCB from local RAM 337. The NCB is moved to TTM 323. The network IOCB is linked to the NCB as a Delayed Request Block (DRB). OTP 309 verifies if a TCP window is open to send at least one segment. If not, an idle signal is sent to RA 310. If the TCP window is open, the first DRB linked to the NCB is fetched and OIP 308 is signaled to build MAC and IP headers in outbound FIFO 326.

After OIP 308 is done, OTP 309 builds its header in outbound FIFO OFB 326. Each field of the TCP header is filled in as follows: Source and Destination TCP ports are copied from the NCB. TCP sequence and acknowledgement numbers are copied from the NCB. TCP header length is calculated. TCP flags are copied from the NCB. Hardware sets the ACK flag regardless of the state of the flag in the NCB. TCP Window Size is copied from the current value in the NCB. TCP checksum is initially set to zero and then adjusted OTP 309 processes NCB and adds a timestamp, if the connection is configured. OTP 309 sends TCP data from host memory to outbound FIFO OFB 326 via ODE 338. As the TCP header and data are passed to OIP 308, OIP 308 calculates the TCP checksum. If a retransmission timer is not already running on this connection, OTP 309 links the NCB on the timer queue for the retransmission timer. After the last word of data is passed to OIP 308, OIP 308 sends the calculated TCP checksum with a tag that tells OFB 326 to write it into the TCP checksum field, and the frame is sent. If all the data for the IOCB has been sent, OTP 309 writes the sequence number of the last byte of data for the IOCB in the DRB. OTP 309 also sets the Last Sequence number valid flag. Thereafter, OTP 309 updates all NCB entries and does a "write-back" of the NCB to local RAM 337.

Delayed Request Processing:

The Delayed request process occurs when an IOCB has been placed on the Output Request List because a TCP connection with a closed window received an ACK packet or a timer expired that requires OTP 309 processing. The following describes the delayed request processing:

TTM 323 signals RA 310 that it has an NCB that needs processing. RA 310 signals back to TTM 323 that it has won arbitration. TTM 323 reads the NCB from Local RAM 337 and asserts a request to OTP 309. OTP 309 checks action flags in NCB. OTP 309 updates the "Snd_Una" NCB fields (except sequence number, which ITP 306 updates) to account for the amount of data acknowledged. OTP 309 reads the first delayed request from local RAM 337.

OTP 309 checks if the data transfer requested in the delayed request is done. If so, OTP 309 generates an outbound TCP completion message and removes the DRB from the list. If there are other DRBs on the list, OTP 309 repeats the check for a complete DRB until all are done or one is encountered that still has data to send.

If a DRB that need to send data is left, the processing continues, or else an Idle message is sent to RA 310; and the process ends.

Thereafter, the process checks if TCP window is open to send at least one segment. If not, idle signal is sent to RA 310; and the process ends.

OTP 309 reads the delayed request from local RAM 337 that is pointed to by the Snd_Max Descriptor Address field in the NCB. OTP 309 signals OIP 308 to build MAC and IP headers in outbound FIFO OFB 326. When OIP 308 is done, OTP 309 build's the header in the outbound FIFO OFB 326.

OTP 309 processes and adds a timestamp option, if connection is configured. OTP 309 sends TCP data from host memory to outbound FIFO OFB 326. As TCP header and data are passed to OIP 308, OTP 309 calculates the TCP checksum. If a retransmission timer is not already running, OTP 309 links the NCB on the timer queue for retransmission timer.

After the last word of data is passed down to OIP 308, it sends the calculated TCP checksum with a tag that informs MAC 304 to write the tag into the TCP checksum field and thereafter the frame is sent.

If all the data for a request is sent, OTP 309 updates the DRB with the Last Sequence number (also referred to as "Seq #") valid flag set, indicating that all data for this IOCB has been sent and what the last sequence number was. OTP 309 checks if there is more data to be sent. If there is, the delayed request process starts over, or else an idle signal is sent to RA 310 and the process ends.

Unassisted TCP Segment Transmission:

Unassisted TCP transmissions are used for sending "SYN" and "FIN" TCP segments. An unassisted transmission means that the hardware does not wait for an ACK packet to return before sending a completion to the host. For the SYN segment, a NCB may not be created until the SYN is sent.

To send an unassisted segment, host 104 creates the same data structure as defined for data transmission, but also sets additional flags. The first is the "complete immediately" flag that informs system 300 not to wait for the ACK packet but to immediately generate completion when a segment has been sent. The other flag is the "host NCB address flag", which indicates that the NCB address in the IOCB is a host address and not a local RAM 337 address.

Hardware processing of the request proceeds as described in the TCP data transmission section with the exceptions that as soon as the segment has been transmitted, OTP 309 generates a completion and does not store the IOCB or NCB in local RAM 337.

Retransmissions:

Retransmissions are initiated by setting the retransmission (RET) flag in an NCB. The RET flag is set if:

Three duplicate ACK packets are received in a row or the retransmit timer expired.

A retransmission packet is processed the same way as the Delayed Request processing discussed above with one exception, that the data to transmit is taken from the place pointed to by the "Snd_Una" pointer instead of the "Snd_Max" pointer.

Normal ACK Tx Processing

This section discusses transmission of ACK packets without accompanying data. This occurs when the Send Ack Now (SAN) flag is set in a NCB and data is not ready for transmission. If data is also ready for transmission, the ACK packet follows the data transfer. This is covered in the previous discussion of delayed request processing.

The SAN flag is set if:

The delayed ACK timer expired and an ACK packet is to be sent;

A data segment was received while a delayed ACK timer was running and now two segments are immediately acknowledged; or The receive TCP window opens to warrant sending a window update ACK packet.

The following process is used to send an ACK only packet:

TTM 323 signals RA 310 that it has an NCB that needs processing. RA 310 signals back to TTM 323 if it wins arbitration. TTM 323 reads the NCB from memory 337 and asserts a request to OTP 309.

OTP 309 checks action flags in the NCB. In this case, the SAN flag is set without the Window Update (WU) flag being set. OTP 309 signals OIP 308 to build MAC and IP headers in outbound FIFO OFB 326 as described above. When OIP 308 is done, OTP 309 builds its header in outbound FIFO OFB 326. The header indicates that only an ACK packet is being sent.

OTP 309 processes and adds a timestamp option, if connection is configured. As the TCP header is passed to OIP 308, OIP 308 calculates the TCP checksum. After the last word of data is passed down to OIP 308, OIP 308 sends the calculated TCP checksum with a tag that tells MAC 304 to write it into the TCP checksum field and send the frame. OTP 309 then sends an idle signal to RA 310; and the process ends.

Duplicate ACK Processing

This section discusses transmission of a duplicate ACK packet. This occurs when the "Send Duplicate ACK (SDA)" flag is set in a NCB. If data is also ready to transmit, the ACK packet transmission takes precedence over the data transfer.

The SDA flag is set because an out of order segment was received. The following process is used to send an immediate duplicate ACK packet:

TTM 323 signals RA 310 that it has an NCB that needs processing. RA 310 signals back to TTM 323 that it has won arbitration. TTM 323 reads the NCB from memory 337 and asserts a request to OTP 309.

OTP 309 checks for the SDA flag in NCB. OTP 309 signals OIP 308 to build MAC and IP headers in outbound FIFO OFB 326. When OIP 308 is done, OTP 309 builds its header in outbound FIFO OFB 326. This header indicates that only an ACK packet is being sent.

OTP 309 processes and adds a timestamp option, if connection is configured. As the TCP header is passed to OIP 308, OIP 308 calculates the TCP checksum.

After the last word of data is passed down to OIP 308, OIP 308 sends the calculated TCP checksum with a tag that tells the MAC to write it into the TCP checksum field. This causes the frame to be sent. OTP 309 sends an idle signal to RA 310 and the process ends.

TCP Table Manager Request Processing

Persist Timer Processing

The "Persist Timer" process starts when OTP 309 sends data for a connection and the window closes before all the data is sent. OTP 309 makes a request to TTM 323 that a NCB is added to the timer list with the persist timer running.

The process stops if an ACK packet arrives that opens the window or the timer expires, which results in a window probe being sent. If an ACK packet arrives and opens the window, ITP 306 checks the NCB to see if it is on a persist timer. If it is, ITP 306 requests the entry be removed from the timer list. ITP 306 also sets the Window Update bit in the NCB and requests TTM 323 to add the NCB to the outbound request list. TTM 323 then makes a request to OTP 309 to look at the window and send data.

If the persist timer expires, TTM 323 sets the send window probe (SWP) bit in the NCB and place the NCB on the outbound request list. OTP 309 then sends one byte of data as a window probe and then restart the persist timer again. The following is the process used to send a window probe segment:

TTM 323 signals RA 310 that it has an NCB that needs processing. RA 310 signals back to TTM 323 that if it wins arbitration. TTM 323 reads the NCB from memory 337 and asserts a request to OTP 309. OTP 309 checks action flags in the NCB. In this case, the "SWP" flag is set. OTP 309 reads the delayed descriptor from local RAM 337 that is pointed to by the Snd_Max Descriptor Address field in the NCB.

OTP 309 signals OIP 308 to build MAC and IP headers in outbound FIFO OFB 326. When OIP 308 is done, OTP 309 builds its header in outbound FIFO OFB 326. Source and Destination TCP ports are copied from the NCB.

OTP 309 processes and adds a timestamp option, if connection is configured. OTP 309 sends one byte of TCP data from host memory to outbound FIFO OFB 326. As TCP headers and data are passed to OTP 309, it calculates TCP checksum as well as counting the IP datagram length. After the last word of data is passed down to OIP 308, OIP 308 sends the calculated TCP checksum with a tag that tells MAC 304 to write it into the TCP checksum field and sends the frame. OTP 309 then sends an idle signal to RA 310, and the process ends.

Retransmit Timer Processing:

The retransmit timer process has two steps, start and stop. To start the timer, OTP 309 sends a segment and then requests TTM 323 to add the NCB to the timer list. Retransmit timer processing stops when an ACK packet for a sequence number that is being timed returns via ITP 306. When the ACK packet is received, ITP 306 looks at the NCB to see which sequence number is being timed and if the ACK packet includes that number, ITP 306 requests TTM 323 to remove the NCB from the timer list. The next time OTP 309 sends a segment, it knows that the timer is not running and restarts it.

Retransmit timer processing also stops if the timer expires. When this occurs, TTM 323 places the NCB on the outbound request list with the Retransmit (RET) bit set. OTP 309 retransmits a segment starting at the snd_una location in the data stream. If retransmission occurs, OTP 309 requests that the sequence number is timed again, but the timer value is doubled. This cycle repeats plural times and if the sequence number is not acknowledged by then, the connection is dropped. Then OTP 309 generates a completion message that indicates that the connection should be reset due to retransmit timeout.

Delayed ACK Timer Processing:

The delayed ACK timer is started when a data segment is received by ITP 306 and the delayed ACK packet timer is not running. In this case, ITP 306 requests TTM 323 to place the NCB on the timer list. The Delayed ACK timer is stopped for plural reasons. For example, if another segment is received for a connection, ITP 306 requests that the NCB be removed from the timer list and put on the outbound request list with the SAN bit set. This causes an ACK packet to be sent that acknowledges the last two segments.

Another reason the timer processing stops is if OTP 309 needs to send a data segment for the connection. The data segment sent includes data and the ACK packet. In this case, OTP 309 requests that the NCB be removed from the timer list.

The timer processing also stops if the timer expires. When this occurs, TTM 323 places the NCB on the outbound request list with the SAN bit set and the ACK packet is sent.

t_Idle Timer Processing:

The t_idle timer is used in a TCP implementation to reset a congestion window on a connection that has been idle for a 'long' period, which may be one round trip delay. If no activity occurs on a connection for round trip time (RTT), the congestion window value is reset back to one segment and a "slow start" begins when transmissions are restarted.

The t_idle timer may also be used to test a connection that has been idle for certain period. The timeout period is referred to as the "Keepalive" time. In one aspect, a special Keepalive segment is sent on an idle connection to check if the timer has expired because a physical connection broke or the connection is merely idle. If the connection is just idle, it gets a response. If the connection is broken, no response or error is returned and the node can terminate the TCP connection.

MAC Frame Reception:

As frame packets (331) arrive from an Ethernet network, they are placed into inbound FIFO 325, while the MAC receiver (Rx, also referred to as MAC 303) 303 verifies the CRC. When the entire frame is in FIFO (IFB) 325 and if the CRC is valid, MAC 303 adds a "status word" to the beginning of the frame. The last word of data and the status word is written into FIFO (IFB) 325 with an "END" bit set. This status includes a frame length field, a header length field and status bits that indicate what type of address was matched to receive the frame. FIFO (IFB) 325 then signals IPV 302A that the frame is available. IPV 302A reads the frame out of FIFO (IFB) 325 and places it into Local RAM 337 using buflets acquired from BLM 302. IPV 302A links together as many buflets as necessary to contain the entire frame. IPV 302A notes that the frame type field indicates that the frame is not destined for IP and send the frame to host 104 via IDE 317.

Pause Frame Reception:

MAC 303 supports standard flow control using a Pause frame. A Pause frame is recognized and the timer value associated with the frame is extracted. A timer is started based on the timer value. Also, a signal is sent to the MAC transmitter to stop transmission, at the next frame boundary, until the timer expires, or another Pause frame is received that disables the pause function.

Reception of Frames for Multiple Addresses:

MAC 303 receives frames addressed to plural addresses that are programmed into MAC address registers and the addresses are enabled via control register bits. MAC receiver 303 receives the frames addressed to the Broadcast address as well as Multicast frames.

IP Datagram Reception:

When an IP frame arrives from an Ethernet network, it is placed into inbound FIFO (IFB) 325 while MAC receiver 303 verifies the CRC. When the entire frame is stored in FIFO (IFB) 325 and if the CRC is valid, MAC receiver 303 adds a status word to the frame. The last word of data and the status word is written into FIFO (IFB) 325 with an END bit set. This status includes a length field, a header length field and status bits that indicate what type of address was matched to receive the frame. FIFO (IFB) 325 then signals IPV 302A that the frame is available.

IPV 302A reads the frame out of FIFO (IFB) 325 and transfers it into Local RAM 337, using buflets acquired from Buflet List Manager 302. IPV 302A links together as many buflets as necessary to contain the entire frame. IPV 302A evaluates the frame type field, and if it indicates that the frame is destined for IP, then IPV 302A amends the first buflet data pointer to skip over the MAC header, based upon the MAC header length given in the status word. The IP header for the packet is placed into local RAM 337, and IPV 302A performs various validation checks, including IP header checksum and the comparison of the IP length against the actual received packet length.

If the packet fails validation, it is deleted and the buflets are returned to the free list. If the destination IP address is not for the specified node, IPV 302A sends the packet to host 104.

Routed packets are not reassembled on intermediate nodes, and sent directly to host 104. IPV 302A also evaluates the "More Fragments" IP flag and the IP fragment offset field to determine if the entire datagram is present in a packet. If it is and the datagram is not destined for TCP, IPV 302A passes the packet to host 104. If the datagram is for TCP, it is passed to IFP 305 and then passed to ITP 306.

If a frame is destined for IP, IPV 302A calculates a TCP checksum for the packet. If the packet is the first or the only packet of a datagram, IPV 302A calculates a TCP checksum for the packet, including the pseudo header, which is based on various IP header fields.

If the packet is a fragment that is not the first fragment of the datagram, IPV 302A skips over the IP header and calculates a partial checksum of the datagram's data payload. When IPV 302A finishes moving the entire packet into memory 337, it writes the calculated TCP checksum value and status word to the $1^{st}$ buflet.

If the packet has not been otherwise disposed of and if IFP 305 is idle, IPV 302A passes the address for the first buflet of the packet and a copy of the IP header to IFP 305. If IFP 305 is not idle, the new packet is placed on the IFP 305 input list, and when IFP 305 is idle, IPV 302A re-reads the IP header and sends it. IFP 305 processes the fragmented datagram as described below and shown as 403 in FIG. 4B.

Fragmented Datagram:

IFP 305 checks if an entry already exists in the re-assembly list. It does this by hashing the IP n-tuple {IPID, IPSRC, IPDST and IPP} and looking into a hash table 403A (FIG. 4B) for a filled entry. If no entry exists in the hash table (as indicated by the valid bit being clear), an entry is made and the address of the packet is written in the entry.

When the $1^{st}$ fragment of a datagram is added to the reassembly list, the Nxt_Dgm_Lnk and the Prv_Dgm_Lnk are set to zero. If an entry already exists, the entry can be pointing to one or more datagrams (403B, 403C and 403E) that matched the hash. IFP 305 compares the IPSRC, IPDST, IPID and IPP fields (FIG. 4B) of each datagram associated with the hash.

If the datagram is not already on the list, it is added to the end of the list associated with the hash. When the $1^{st}$ fragment of a datagram (403B) is added to the reassembly list, the Nxt_Dgm_Lnk and the Prv_Dgm_Lnk are set to the proper values.

If the datagram is found on the list, the buffer for this fragment is added to the list of fragments for the datagram.

If the received fragment is not in-order, it is inserted in the ordered fragment list using the "Frg_Lnk" field (403D). The fragment offset in the IP header determines the insertion position on the list. If the fragment is placed before the fragment that was the first on the list for this datagram, the "Nxt_Dgm_Lnk" and "Prv_Dgm_Lnk" are copied into the buflet (403F).

If the fragment is in-order with respect to another fragment then the buffers for the fragments is linked using the "Buf_Lnk" field (403H and 403G). TCP partial checksums are summed together and placed in the first buflet of the resulting list. When this linking takes place, the block also fixes the buflets if fragment overlap occurs. Further, if fragment overlap occurs, IFP 305 sets a 'C' bit for the datagram to force the TCP block to recalculate the TCP checksum, since the sum of the partial TCP checksums is invalid due to the overlap.

When a new datagram is added to the reassembly list, it is also added to the tail of the timeout list.

When the $0^{th}$ fragment (fragment offset=0) is placed on the fragment list, the $1^{st}$ fragment bit in the status word is set. When the last fragment (the more fragments header bit=0) is placed on the fragment list, the last fragment bit in the status word is set.

IFP 305 checks if the entire datagram is in memory 337. This is indicated by the fragment link valid bit being clear and if the first and last fragment bits are set in the status word. If a full datagram is present, IFP 305 removes the datagram from the reassembly list. This includes revising the timeout list.

If a datagram is not destined for TCP, the datagram is sent to host 104. If the datagram is destined for TCP, and ITP 306 is idle, the address of the buflet and the status word are passed to ITP 306. If ITP 306 is not idle, IFP 305 links the datagram onto the datagram wait list until ITP 306 can process it.

TCP Data Reception

Received TCP data from the network goes through the same processing described above for a MAC frame and IP datagram, except that the datagram is not passed to host 104. Instead, the datagram is processed by IFP 305 and then passed to ITP 306, if ITP 306 is not busy. If ITP 306 is busy, the datagram is linked to the Datagram Wait list until ITP 306 can process it. When the datagram is passed to ITP 306, the buffer address of the datagram, the status, the IP header and the TCP header are passed to ITP 306.

ITP 306 takes the segment and validates the TCP header. If it is valid, ITP 306 checks if the segment is a SYN or FIN segment. If it is, the segment is passed to the host. If it is not a SYN or FIN, ITP 306 fetches the proper NCB from local RAM 337. It does this by loading the necessary hash parameters into TTM 323 and then sending a command to TTM 323 to fetch the NCB using the loaded hash parameters. If the NCB is found, TTM 323 signals ITP 306 to continue processing. ITP 306 then checks whether the segment is in order or not.

If the NCB is not found, the segment is passed to the host for disposition.

iSCSI PDU Processing

If a received TCP segment is received on an iSCSI MAC address, the segment is passed directly to IAP 307. ITP 306 adds the segment to the NCB's reassembly list and then passes the $1^{st}$ buflet address of the segment to IAP 307 to be placed on its input list. ITP 306 does not perform in its normal reassembly, except normal ACK processing required for the received data, either in-order or out-of-order.

In Order Data Reception Processing:

If a received TCP segment is in order, ITP 306 checks the NCB to see if any other data has been previously received out of order. If not, ITP 306 passes the segment to IDE 317 to be sent to host 104. If data is out of order ("OOO") on the reassembly list, ITP 306 checks to see if the data on the reassembly list can also be passed to the host. ITP 306 appends any data that is in order with the received segment and then passes the resulting list of data to IDE 317 to be sent to host 104.

Out-of-Order Data Reception Processing:

If a received TCP segment is out of order, ITP 306 adds the segment to the reassembly list. The processing of the segment stops, until the missing "in order" segment arrives.

Normal ACK Reception Processing:

Normal ACK packet processing includes the processing of a segment that only includes an ACK packet as well as a segment that has an ACK packet attached to the received data.

Normal ACK processing proceeds just like data reception processing and in the case of attached ACK packet, the system performs the complete data processing as well as ACK packet processing. The difference in ACK packet processing is that ITP 306 evaluates the ACK sequence number and compares it to the snd_una value in the NCB. If the ACK sequence number is greater than the snd_una value, snd_una is updated to the new value, the window update flag is set in the NCB and ITP 306 requests TTM 323 to add the NCB to the Outbound Request List to be processed by OTP 309.

ITP 306 also updates the remote receiver credit information in the NCB. Once the NCB has been updated, ITP 306 discards the standalone ACK packet by returning the buflet to the free list. If the segment also contained data, it is processed as explained above.

Duplicate ACK Reception Processing:

Duplicate ACK packets are sent as an indication that data is arriving at the remote node out of order. The processing for a duplicate ACK packet is different than a normal ACK packet since it does not acknowledge any new data. The basic processing for the duplicate ACK packet is to count the packets. If three consecutive duplicate ACK packets are received, ITP 306 sets the retransmit bit and request that the NCB be placed on the Outbound Request List to retransmit the oldest segment. Once the ACK packets have been processed, the buflet containing the segment is freed.

The various modules of FIG. 3A will now be described.

Inbound TCP Processor ("ITP')

Figure 3B:
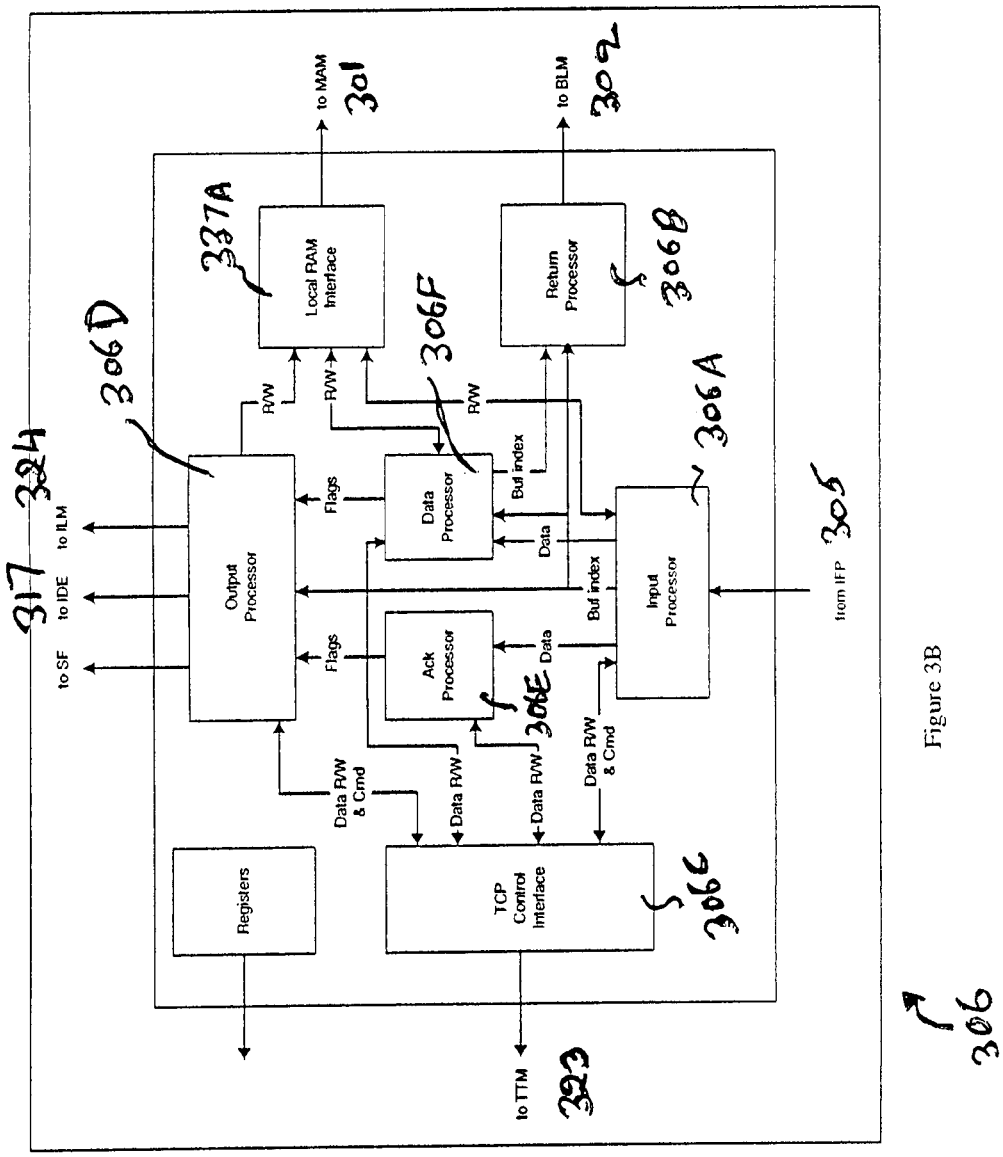
FIG. 3B shows a block diagram of input TCP processor ("ITP"), according to one aspect of the present invention.

FIG. 3B is a block diagram of ITP 306 which processes incoming TCP data packets 331, re-orders out of order data packets and then passes data to host system 104 for delivery to an application. If TCP data is for an iSCSI connection, the data is passed to IAP 307. IFP 305 initiates ITP 306, described below.

Input processor 306A performs the initial check for a TCP data packet checksum. If the checksum fails or the data packet is for broadcast or multicast, the data packet is dropped by return processor 306B. If the checksum passes, then input processor 306A sends a signal to TTM 323, which is described below, requesting a NCB. Input processor 306A sends the signal through TCP control interface 306C.

If an NCB is found, input processor 306A performs plural tests to determine if a particular packet should be processed further. ACK processor 306E and data processor 306F perform the tests. ACK processor 306E performs various acknowledgement related process steps, as described below. Data processor 306F processes data including portions in-sequence and out of sequence TCP code.

If incoming data 331 is to be dropped, the "buflet index" is sent to return processor 306B. Data from ACK processor 306E and data processor 306F is sent to an output processor 306D that transfers the data based on the destination.

FIG. 3C shows a block diagram of input processor 306A which includes a receive block 328 that receives data from IFP 305, stores the data that requires validation and forwards the rest of the data either to validation block 330C and then to TTM 323, or option block 329.

After the checksum is validated TTM 323 is requested to fetch a NCB from local memory 337. Simultaneously, option block 329 searches for a time stamp. If a timestamp regarding the data is not found in the data received from IFP 305, and the data header indicates that there may be a time stamp, then additional data is requested from MAM 301. Option block 329 then searches data in MAM 301 for timestamp and validation block 330C verifies when a NCB was found by TTM 323.

Thereafter, validation block 330C performs a series of checks on a received segment to determine if further processing is required. If further processing is required, all the necessary data is passed to ACK processor 306E and data processor 306F. If any of the checks fail, output processor 306D is started to send completion messages and the received NCB is written back.

TCP options include timestamp option, which can be used by TCP senders to calculate round trip times. The TCP protocol recommends a 32-bit format for the first four bytes of the timestamp option data defined as 0x0101080a. The 0x01 are NOPs. The 0x08 is the "kind" field, which indicates timestamp, and the 0x0a is the length field, which indicates 10 bytes. Although this is the recommended format for the first byte of timestamp option data, there is no guarantee that all implementations will use it. Therefore, System 300 is designed to detect any format.

ITP 306 receives a data buflet which contains the TCP header and 12-bytes of option data. The option data, if formatted according to RFC 1323, Appendix A (Industry standard for "TCP Extensions for High Performance"), would contain the previously described word first, followed by the 4-byte timestamp value and the 4-byte timestamp echo reply value. A state machine, described below, parses the option data and looks for the 0x0101080a value in the first word. If the first word detected contains this value, then the next two option words are processed as timestamp and echo reply.

If the first option word is not based on RFC 1323 format, and the TCP length is greater than 32 bytes (20-byte TCP header and 12-byte TCP option data), that indicates that more option data is present. Such data is retrieved from local RAM 337, and each byte of the option data is parsed to detect the timestamp opcode.

Option data is read from local RAM 337 one word at a time. Each byte of the word is checked for the 0x08 timestamp opcode. When it is detected, one of the four cases is true. The location of the timestamp opcode is in one of the four possible byte positions within the word. This location is coupled (encoded as a number 1 through 4 to indicate its byte position with a zero value used to indicate no timestamp opcode detected yet), a "ts_found" flag is set, and the incoming word count+1 at the cycle the opcode was detected is latched as "ts_found_cnt". The four cases are identified based on the byte location of 0x08 to determine which byte positions of the subsequent words from local RAM 337 contain the actual timestamp and echo reply values, and these values are extracted from the data stream and saved.

FIG. 3C1 shows a state machine diagram of a state machine option block 329. FIG. 3C1 shows how option block 329 state machine determines if a timestamp is present and more data needs to be acquired from local memory 337. If a time stamp is included in the data from IFP 305, ts_present is set to 1 and ts_ecr & ts_val are updated. If not, and the header length is greater than 32 bytes, option data is received from memory 102.

Also, if TCP option field is found for a time stamp then ts_present is set to 1 and ts_ecr & ts_val values are updated.

FIG. 3C2 shows the various state machine states of validation state machine in the validation block module 330C. The validate state machine is divided into 4 sub state machines, as described below:

Idle State—Determines if the connection is in a valid TCP state to receive data. Also checks if there are any flags set that would require this segment be sent to the host.

Check Trimming—If trimming of this segment occurs, the set flags to indicate how. The actual trimming is handled in data processor 306F.

Timestamp—If a timestamp was found in the TCP options data, validate and save.

ACK—If the ACK is out of range, or if no ACK was sent at all, the segment is dropped.

FIG. 3C3 shows validation block module 330C state machine states for checking reset, SYN and/or invalid state. The following are the process steps for FIG. 3C3:

If NCB error
End the buflet index to output processor 306D.
END
If syn_flag
Send the buflet index to output processor 306D
END
If rst_flag
Set tcp_state=Closed
Send the buflet index to output processor 306D.
END
If tcp_state=Closed
Send the buflet index to the return processor 306B.
Set no_comp_msg=1
Start output processor 306D.
END
If tcp_state=Time_Wait
Set SAN bit in the NCB
Set the rstart_2msl & needoutput bits and send the buflet index to output processor 306D.
END
Reset the Idle timer FIG. 3C4 shows plural validation module 330C state machines for trimming.

If ti_len=0
Set len_eq_zero=1
If entire segment before window ((ti_seq+ti_len<rcv_nxt) or (((ti_seq+ti_len=rcv_nxt)& (fin==1)))

The first check "ti_seq+ti_len<rcv_nxt" verifies that the packet data is before the window. This applies regardless of whether the fin_flag is set or clear. The second check includes a test for the fin_flag. In that case, ti_len is the data length+1 for the fin_flag. If ti_seq+ti_len is equal to rcv_nxt which implies that there is 1 byte of data and the fin_flag is set (the 1 byte of data), then this is also a duplicate packet so we clear the fin_flag in the packet. The BSD code sends an ACK packet in this case, which may or may not be required. No received data is processed from this packet, however the ACK information is processed normally.

Set SAN bit
Set needoutput=1

Set len_eq_zero=1
Set use_rcv_nxt=1
Set needtrimming=1
Go to check timestamp.
Else If part of segment before the window ti_seq<rcv_nxt
Set use_rcv_nxt=1
Set needtrimming=1
If ((ti_seq+ti_len)>rcv_adv (part of segment after the window)
Set needtrimming=1
Set endtrimming=1
If entire segment after the window (ti_seq>=rcv_adv)
Set len_eq_zero=1
Set SAN bit
Set needoutput=1
If window probe received (((rcv_adv−rcv_nxt)=0) & (ti_seq=rcv_nxt))
Increment received window probe counter
Else
Send the buflet index to the return processor.
Set no_comp_msg=1
END FIG. 3C5 shows a block diagram of validation module 330C's state machine states for timestamp functionality, as illustrated by the following process steps:
If ts_recent !=0 (previously received a timestamp) & option block is idle, & ts_present, & (ts_val<ts_recent)
If PAWS check [(tcp_now−ts_recent_age)>TCP_PAWS_IDLE (4,147,200)]
Set ts_recent=0,
Else // really old segment.
Set SAN bit
Set needoutput=1
Send the buflet index to the return processor 306B.
Set no_comp_msg=1
Start output processor 306D
END If timestamp is present & ((ts_val>=ts_recent) or paws_flag) & ((ti_seq or rcv_nxt (depending on use_rcv_nxt flag))=<last_ack_sent)
Set ts_recent=ts_val
Set ts_recent_age=tcp_now FIG. 3C6 shows plural state machines used by ACK processor 306E. ACK processor 306E performs various functions, as discussed above. Input processor 306A contacts ACK processor 306E when a received packet is to be dropped/routed to host 104. ACK processor 306E handles some of TCP connection state machines including completing a "passive open" connection and handles state transitions when FIN segments are acknowledged.

ACK processor 306E handles receipt of duplicate packets, as described above, including fast retransmit and recovery mechanisms of TCP. ACK processor 306E also performs normal TCP path processing including updating congestion window and RTT times and updating send window at the transmit side. The following shows ACK Processor 306E states:

If ack_flag=0
Send the buflet index to the return processor 306B.
Set no_comp_msg=1
Start Output processor 306D
END
If (Syn_Received_state & ((snd_una>ti_ack) or (ti_ack>snd_max)))
Send the buflet index to output processor 306D.
END
If ACK is for data greater than what we sent (ti_ack>snd_max)
Set SAN bit
Set needoutput=1
Send the buflet index to the return processor 306B.
Set no_comp_msg=1
Start Output processor 306D
END
Unscale the send window into a 32 bit value Tiwin=ti_win <<snd_scale FIG. 3C7 shows the state machine process flow for data processor 306F. Data Processor 306F starts if ITP 306 determines that a segment should not be dropped or routed to the host. ITP 306 provides data processor (DP) 306F with miscellaneous header fields and in some cases the results of previously calculated values. DP 306F includes a Data Processor Controller (DC) whose functionality is described below:

Call Out of Order ("OOO") processor module (located within the data processor module 306F (FIG. 3B of ITP 306) to trim data that doesn't fit in window.
Update buflet offset to a point past the header to the first byte of data in the TCP segment.
Set the fin flag in the buflet header if FIN flag in TCP header is set and trimming didn't trim from the end of the segment.
    If segment is in order and nothing is on the Reassembly list
    If NCB has delayed ack timer set on
    Set NCB.SAN (send ack now).
    Clear delay timer
    Request Output Processor 306D to add to Output Request list.
    Else
    Start the delayed ack timer.
    Queue NCB on timer list.
    Update rcv_nxt.
    Pass segment up to output processor 306D.
    Else if Data is out of order or Reassembly list is not empty, pass segment to OOO Data Placement to place the buflet accordingly.
    Call OOO processor to properly place data.
    If in order data is received
    Update rcv_nxt.
    Set SAN (send ack now) bit.
    Pass segment to output block.
    Else (out of order data)
    Set SDA (send duplicate ACK) bit.
    Request Output Processor 306D to add to Output Request List
    Signal Output Processor 306D if new in order data was received.
    Update Re-assembly list if needed.

FIG. 3C8 shows a process flow diagram where DP 306F processes in-order packet, as described below:

In Order
Lock the NCB.
Read the delay ACK timer.
If (delay ack timer is set)
next_state=SEND_ACK_NOW
else next_state=DELAY_ACK.

FIG. 3C9 shows a process flow diagram where DP 306F processes out of order packets, as described below:
Out of ORDER
If (reassembly list is NOT empty)
Call place data.
Wait place data to finish.
If (reassembly list is empty)
Write recv'd buflet index into reassembly head
Else if (Out of order segment==NULL)
Invalidate the reassembly head.
Else if (Out of order segment returned from OO is not equal to the head)
Reassembly head=Out of Order segment returned by OO.
Else
Seg_length=new seg length from OO
If (out of order data recv'd)
Next_state=SEND_DUP_ACK.
Else
Next_state=SEND_ACK_NOW.

FIG. 3C10 provides a top-level view for ITP output processor 306D. Output Processor 306D state machine is split up into four sub-modules; idle, send error completion, send data, and fin processing.

The function of the sub-modules are described below:

Idle—Checks which module is requesting a completion and send the completion message if no NCB was found.

Send Error Completion—Sends the completion messages if Input Processor 306A detects an error with this segment.

Send Data—There is valid in order data to send to the host/embedded processor.

Fin Processing—The current valid segment was received with a fin flag. If this was the first fin notify the host/embedded processor when the segment is thrown.

TCP Table Manager

Figure 3D:
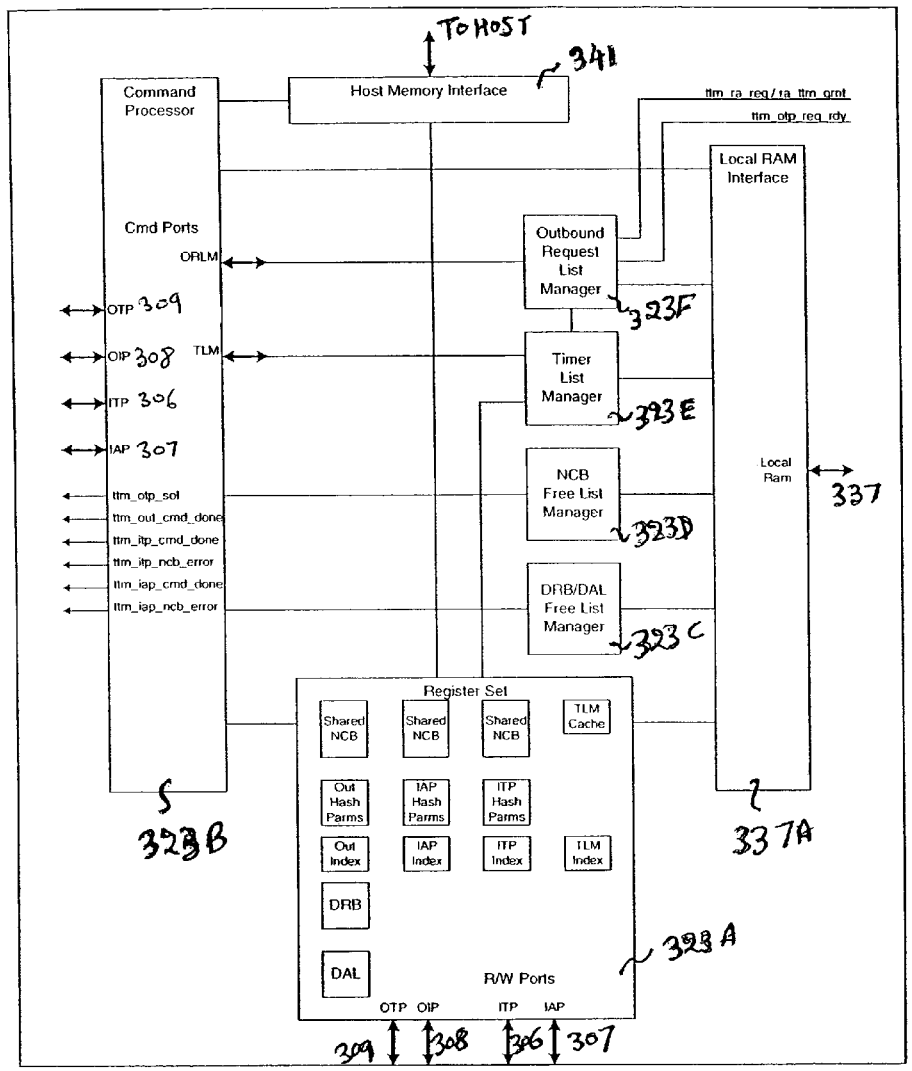
FIG. 3D is a block diagram of a TCP table manager, according to one aspect of the present invention.

FIG. 3D2 is a block diagram of TTM 323 showing plural sub-modules that are used, according to one aspect of the present invention. TTM 323 includes plural registers (register set 323A) for ITP 306, IAP 307 and OAP 312, and provides read/write access for the foregoing modules. TTM 323 provides Fetch/Update/Flush functions for working registers at host memory or local RAM 337. TTM 323 also sends error signal(s) to ITP 306 and IAP 307 if a requested inbound NCB is not present in local RAM 337. TTM 323 also sends an overload signal to OTP 309 if local RAM 337 resources are not available.

TTM 323 maintains timer functions for all TCP connections and co-ordinates all inbound and/or outbound channel access to network data structures. TTM 323 maintains a free list of data structures (323C), delayed request blocks that are used to place IOCBs into a waiting FIFO for processing. DRBs are also used to place OAL associated with an IOCB into local RAM 337. When an OAL is placed into local RAM 337 it may be referred to as a delayed address list (DAL).

TTM 323 also maintains a list of data structures to include NCBs (323D) for connections that need to be processed by OTP 309, and maintain an outbound request list, which is a linked list of NCBs that are processed by OTP 309. Typically, ITP 306 and timer list manager 323E add NCBs to the list.

TTM 323 includes a command processor (CP) 323B that interfaces with plural command buses from OTP 309, OIP 308, ITP 306, IAP 307, TLM (Timer List Manager) 323E and ORLM (Outbound Request List Manager) 323F. TTM 323 arbitrates between various command sources and acknowledges the winner. CP 323B translates commands that are received from various modules to specific output actions of other TTM 323 components, as discussed below.

Figure 3E:
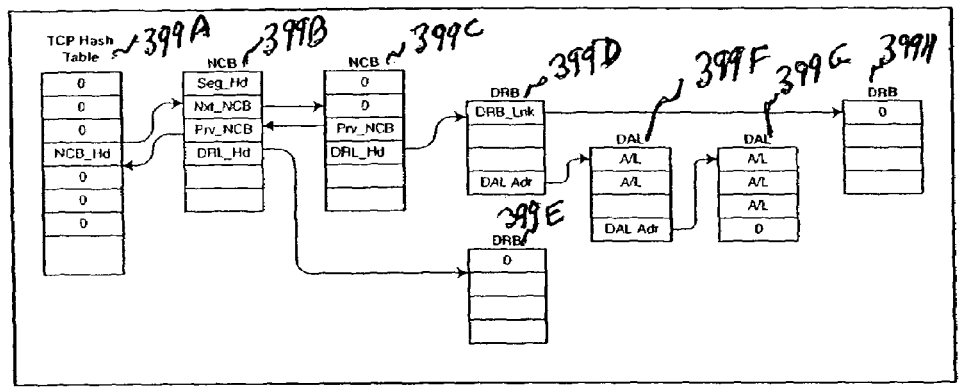
FIG. 3E is block diagram showing TCP table manager processing an NCB, according to one aspect of the present invention.

Outbound IOCB and NCM Management:

TTM 323 processes an outbound IOCB and builds the local RAM 337 data structures for the outbound channel. For a new IOCB for data transfer, the entire IOCB and OALs are read and placed in local RAM 337 before data is actually sent. In order to build a data structure for a newly created TCP connection, OTP 309 requests TTM 323 to do the following (see also 399, FIG. 3E):

Read the new NCB from host memory (not shown) and place it in register set ("RS") 323A, and then write the new NCB into local RAM 337 using an entry from NCB free list. Thereafter, accept hash parameters into register set ("RS") 323A and generate a hash value. Link the new NCB (399B) off the hash table (399A. FIGS. 3E and 402E in FIG. 3F) using the generated hash value. This may involve following links from a hash table (399A, FIG. 3E) entry that has other connections that match the same hash value.

For a hardware assisted TCP data transfer, the associated DRB is read from host memory and placed in register set ("RS") 323A. Resident DAL (399F) is linked to the most recent DRB (399D) using a DRB from the free list. It is noteworthy that many DALs (399F and 399G. FIG. 3E) may be coupled to a single DRB. After all the DALs for the transfer have been linked, a resident DRB (399H or 399E) is linked to the NCB (399C) in local RAM 337 using a DRB from the free list.

To build the local RAM data structure for an existing TCP connection, OTP 309 requests TTM 323 to perform the following:

Read NCB from local RAM 337 using the address provided in the DRB and place the NCB in register set ("RS") 323A. For a hardware assisted TCP data transfer, read the DRB from host memory and place it in register set ("RS") 323A. Thereafter, for each DAL, read the DAL from host memory and place it in register set 323A. Resident DAL is linked to the most recent DRB using a DRB from a free list. It is noteworthy that various DALs may be linked to a single DRB. After all DALs have been linked, link the resident DRB to the NCB in local RAM 337 using a DRB from the free list.

Flushing NCBs

OTP 309 may flush (or delete) an NCB after receiving commands from host 104 or OAP 312 through an IOCB to terminate an NCB. All data structures linked to the NCB are freed to their respective list managers. This includes DRBs, DALs and bufflets on the re-assembly lists. When the command to flush a particular NCB(S) is received, the NCB may be on the timer list, outbound request list, or in use by ITP 306 and/or IAP 307.

When CP 323B receives the command to flush the NCB, and the NCB is on either list, or in use, CP 323B updates the NCB's tcp-state field to "FLUSHED" but does not free the memory associated with the NCB. List managers remove any NCB with tcp_state flushed.

When a NCB is being used by ITP 306 and/or IAP 307, CP 323B updates the resident tcp_state to be flushed. ITP 306 and/or IAP 307 is allowed to finish the current segment, however, the NCB is not written back to local RAM 337 after the processing is complete.

Outbound Request List Management

Figure 3F:
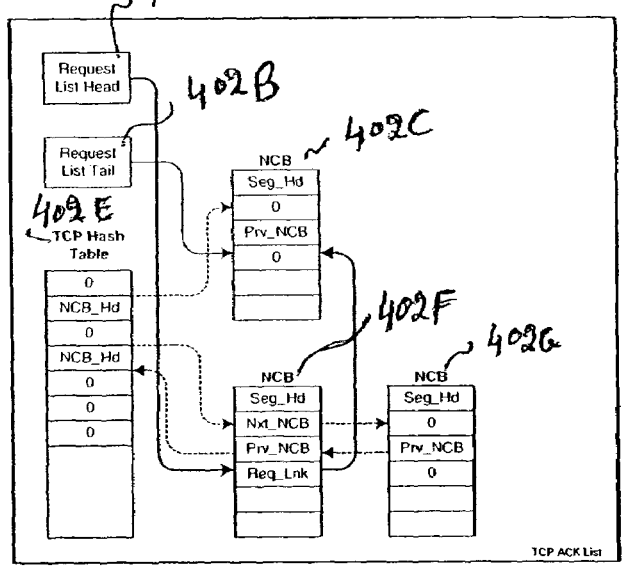
FIG. 3F shows a block diagram of yet another aspect of the present invention showing the support provided by TTM 323 to manage an outbound request list.

FIG. 3F shows a block diagram (402) of yet another aspect of the present invention showing the support provided by TTM 323 to manage an outbound request list. Typically, the outbound request list is used by ITP 306 and TTM 323 to signal OTP 309 that a NCB is ready for processing because of a timer event or change in credit values.

TTM 323 manages a first in-first out ("FIFO") process requests to OTP 309 from ITP 306 or TTM 323 itself. The FIFO process results in an "outbound request list". The FIFO is implemented in RAM 337. The list may include requests to send linked list through NCBs (402C, 402F and 402G, FIG. 3F) in local ACKs, notifications of ACKs received and notifications of data packets timeouts.

Typically, ITP 306 or TTM 323 place entries at the end of the request list (402B). If more than one request exists in the FIFO, TTM 323 requests arbitration to RA 310. When RA 310 grants permission, TTM 323 fetches the NCB. When the NCB is available, TTM 323 notifies OTP 309 and removes the outbound request from the head of the request list (402A).

Inbound Re-Assembly Data Structure Management

Figure 3G:
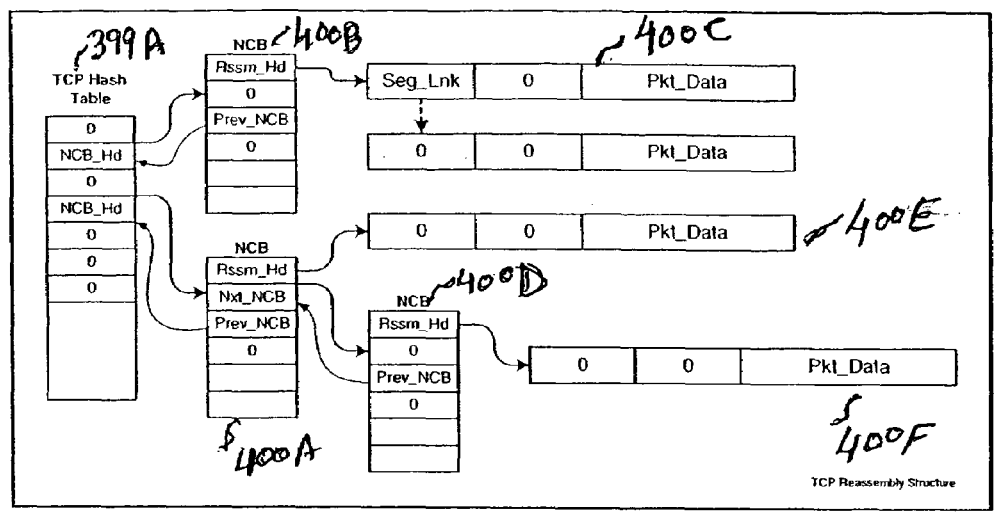
FIG. 3G shows a block diagram for re-assembling inbound data structures, according to one aspect of the present invention.
Figure 3H:
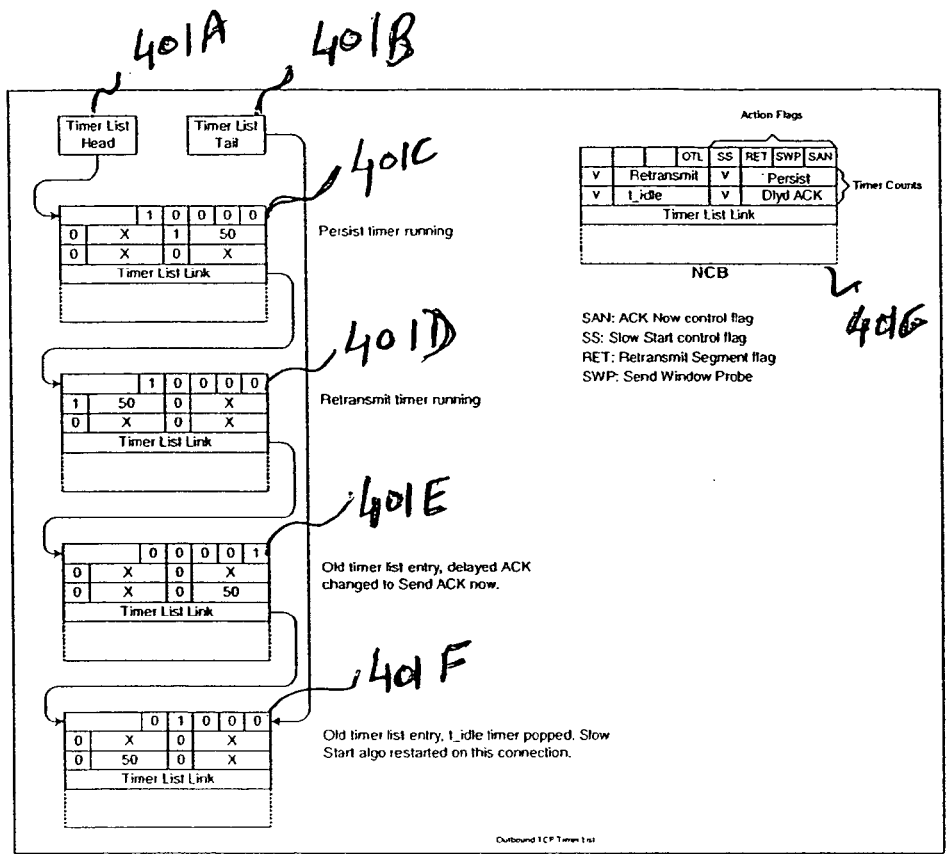
FIG. 3H shows an outbound TCP timer list, according to one aspect of the present invention.
Figure 31:
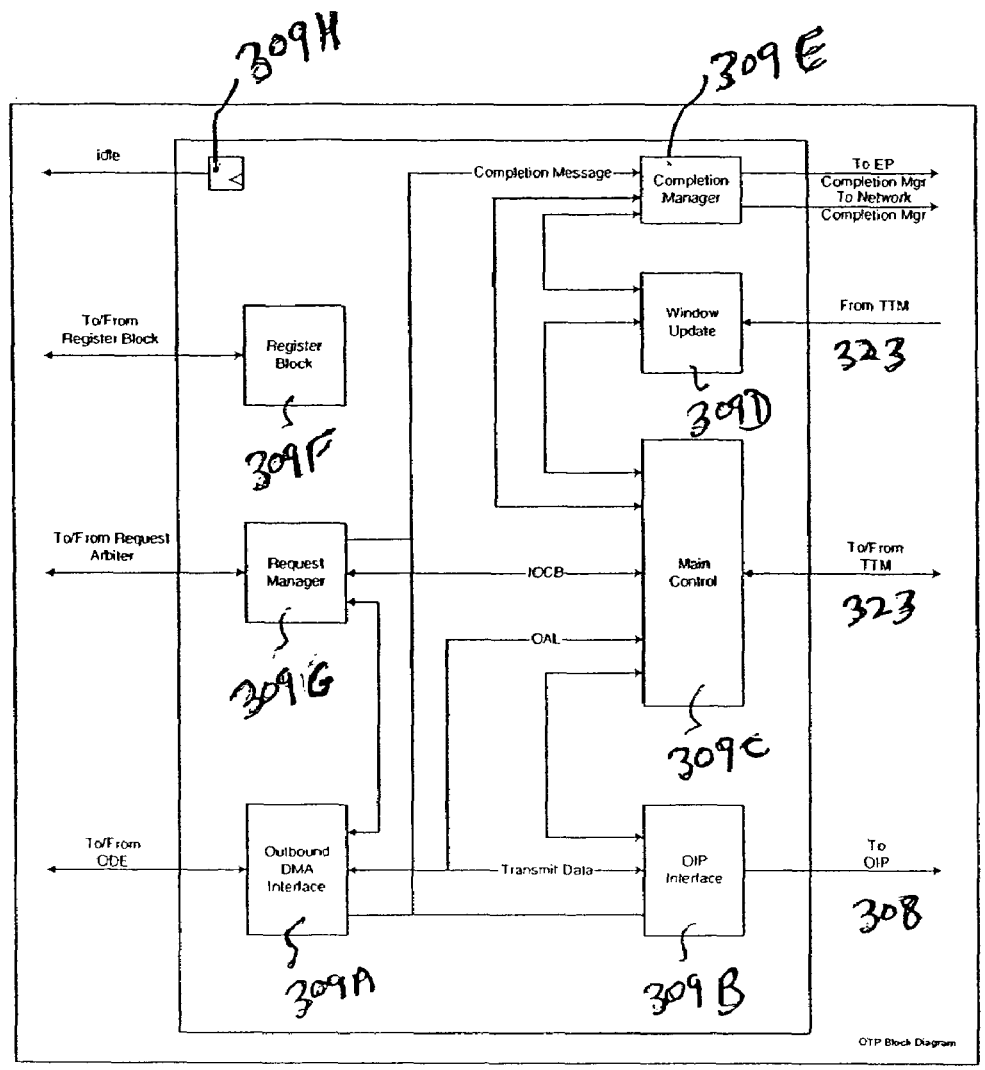

FIG. 3G shows a block diagram (400) for re-assembly of inbound data structure. TTM 323 accepts hash parameters from hash table 399A and loads identified NCB so that ITP 306 has access to inbound re-assembly packet information. ITP 306 assumes that a NCB is located in local RAM 337. TTM 323 allows ITP 306 and IAP 307 to be active at the same time. ITP 306 provides local port, remote port, MA bits and remote IP address information from ITP 306 and determines the hash index values. TTM 323 uses the index value to see if an entry exists in hash table 399A. If an entry exists, the NCB is registered. If the value does not exist, the NCB is not registered.

TTM 323 compares local port, remote port, MA bits and remote IP address information (400C, 400E and 400F, FIG. 3G) of the newly loaded NCB with the hash parameters in the hash parameter registers shown in register set 323A. If a match is found, ITP 306 is notified that a NCB is available. If a match is not found, TTM 323 searches for chained NCBs (400A, 400B, 400D, FIG. 3G), and if found, ITP 306 is notified.

Timer List Management

TTM 323 implements the timer function through timer list manager 323E. This includes a pre-set timer setting, actual timer list and the ability to scan the timer list at certain intervals. Timer list manager 323E manages events or lack of events for both ITP 306 and OTP 309. Timer list 401 (See FIG. 3H) may be maintained in local RAM 337 as a linked list within the NCB data structures.

For OTP 309, TTM 323 maintains a "persist" timer 401C (with timer list lead 401A and timer list tail 401B) and a "retransmit timer" 401D for each connection. For ITP 306, TTM 323 maintains an idle timer (401F) and a delayed ACK timer (401E) for each connection.

If a TCP connection needs to be timed and is not already on the timer list, OTP 309 or ITP 306 requests TTM 323 to add the connection's NCB to the timer list. When an NCB is added to the timer list, it is resident in TTM 323. When TTM 323 processes the timer list 401, it loads timer fields (401G) into a TTM 323 cache (not shown). However, timer link field may be resident in local RAM 337.

At a pre-determined interval or programmable time, TTM 323 scans timer list 401 and checks for timer flags (401G). If a flag is set, TTM 323 compares the timer value to the current tcp_now time. If the values are substantially equal then the timer has elapsed.

If a persist timer (401C) elapses, TTM 323 places an NCB to the outbound request list. If a re-transmit timer has elapsed, TTM 323 places the NCB on an outbound request list to re-transmit the oldest unacknowledged segment. If the delayed ACK timer has elapsed TTM 323 places the NCB on outbound request list to have OTP 309 send an ACK.

If the delayed ACK timer has elapsed, TTM 323 places the NCB on outbound request list to have OTP 309 send an ACK.

If a timed event needs to be cleared, OTP 309 and/or ITP 306 clears the timer valid flag. TTM 323 removes the entry from the list on its next timer list 401 scan, if no other timer flags are set.

Command Processor ("CP") 323B

Takes commands from OTP 309, OIP 308, ITP 306, IAP 307,

TLM 323E and ORLM. Arbitrates between command sources and acknowledge the winner. Completes processing on one command before starting another. Translates the received command to output actions to the other TTM 323 components.

The following provides a list of various command functions that command processor "CP" 323B executes:

store_ncb(reg_flag):

Writes an NCB from TTM 323 logical register set specified by reg_flag to local RAM 337 through the Local RAM Interface. Uses the Local RAM 337 Address Register to get the local RAM 337 address for NCB.

load_ncb(reg_flag, local_ram_addr):

Loads the NCB from specified local RAM address into TTM 323 register set specified by reg_flag using the Local RAM interface ("LRI") 337A.

load_drb(local_ram_addr):

Loads the DRB at local_ram_addr from local RAM 337 to the DRB registers store_dal(local_ram_addr):

Writes the resident DAL to local RAM 337 at the local_ram_addr.

CP write_register (reg_flag, addr, data):

CP 323B writes the a word (32 bits) of data specified by "data" to the logical register set specified by reg_flag at the register field specified by addr.

CP 323B read_register (reg_flag, addr):

CP 323B reads a word (32 bits) of data from the register set specified by reg_flag at the register specified by addr.

CP 323B write_ram (local_ram_addr, data):

CP 323B writes a word (32 bits) of data specified by "data" to the local RAM address specified by local_ram_addr.

CP 323B read_ram (local_ram_addr)

CP 323B reads the 1 word (32 bits) of data from the local RAM address specified by local_ram_addr.

check_resident (local_ram_addr)

Checks if the given address corresponds to any valid NCBs resident in the RS 323A, including the NCB, if any, in the TTM 323 cache.

copy_tlc(reg_set):

CP 323B sets cp_rs_active_flag=TLM, asserts cp_rs_rql and waits for rs_cp_gtl.

Timer List Manager ("TLM") 323E:

TLM 323E adds a persist expired timer counter and re-transmit timer expired counter. The following describes the various process steps for running the timer list (FIG. 3D1).

1. When an NCB is first entry in the list:
   curr=head
2. TLM 323E places "Fetch NCB Timer Fields" on tlm_cp_cmd bus, current on tlm_cp_addr bus, and asserts tlm_cp_cav. CP 323B asserts cp_tlm_cak when the command has been accepted (but has not been completed yet.) TLM 323E waits for cp_tlm_cmd_done, which signals the command is complete.
3. Read tmr_lnk word of current NCB from local RAM 337 and stores in "next."
4. Request register lock from RS 323A by asserting tlm_rs_rql and waiting for rs_tlm_gtl
5. Read status word of NCB from the register set and store in "ncb_stat"
6. If (ncb_stat.tcp_state==FLUSHED), remove NCB from timer list and request reflush from CP 323B
   Clear OTL bit in word0, write back and drop lock. TLM 323E places "Reflush NCB" on tlm_cp_cmd bus, and asserts tlm_cp_cav. TLM 323E asserts cp_tlm_cak when it accepts the command. TLM 323E waits for cp_tlm_cmd_done. Write next to tmr_lnk word of the previous NCB through LRI 337A. If curr==tail, the link valid bit should be clear, or else valid bit should be set to:
   curr=next
   Thereafter, return to step 2, described above.
7. Reads two timer words of current NCB from the Register Set 323A into prst_f, prst, retx_f, retx, idle_f, idle, dlack_f, and dlack.
8. If ({prst_f, retx_f, idle_f, dlack_f}==4'h0) remove NCB from timer list
   Clear OTL bit in word0, write back and drop lock.
   TLM 323E places "Writeback resident NCB Timer fields to Local RAM 337" on tlm_cp_cmd bus and asserts tlm_cp_cav. CP 323B asserts cp_tlm_cak when it accepts the command. TLM 323E waits for cp_tlm_cmd_done.
   Write "next" to the tmr_lnk word of the previous NCB. If (curr==tail), valid bit should be clear, else valid bit should be set.
   curr=next
   return to step 2
9. Check to see if timers have expired (these checks can be done in parallel)
   If (prst_f==1) and (prst==tcp_now>>time_scale)
      ncb_stat.swp=1
      tmr_prst_f=0
      add_to_orlm=1
      write_ncb_flags=1
   If (retx_f==1) and (retx==tcp_now>>time_scale)
      ncb_stat.ret=1
      tmr_retx_f=0
      add_to_orlm=1
      write_ncb_flags=1
   If (idle_f==1) and (idle==tcp_now>>time_scale)
      ncb_stat.ss=1
      tmr_idle_f=0
      add_to_orlm=0
      a write_ncb_flags=1
   If (dlack_f==1) and (dlack==tcp_now>>time_scale)
      ncb_stat.san=1
      tmr_dlack_f=0
      add_to_orlm=1
      write_ncb_flags=1
10. If (write_ncb_flags)
    If ({prst_f, retx_f, idle_f, dlack_f}==4'h0)
       ncb_stat.otl=0
    Write prst_f, prst, retx_f, retx, idle_f, idle, dlack_f, and dlack to NCB timer words in Register Set.
    Write ncb_stat to NCB status word in Register set update status flags (swp, ret, ss, san, otl).
11. Release register lock by de-asserting tlm_rs_rql.
12. If (add_to_orlm)
    TLM 323E places "Add resident NCB to tail of Outbound Request List" on tlm_cp_cmd bus, curr on tlm_cp_addr bus, and asserts tlm_cp_cav. CP 323B asserts cp_tlm_cak when it accepts the command. TLM 323E waits for cp_tlm_cmd_done.
13. If (write_ncb_flags) TLM 323E places "Writeback resident NCB Timer Fields" on tlm_cp_cmd bus, and asserts tlm_cp_cav. CP 323B asserts cp_tlm_cak when it accepts the command. TLM 323E waits for cp_tlm_cmd_done or else TLM 323E writes 32'h0004_0000 to NCB status register to clear the TLM 323E in use bit. Note that if NCB was using the TLM 323E Cache this also clears the local Ram address valid bit.
14. prev_tmr_ptr=curr_tmr_ptr
    curr_tmr_ptr=next_tmr_ptr
    Go to step 2

Outbound Request List Manager ("ORLM") 323F:
ORLM 323F creates and manages outbound request list by adding NCBs when requested by Command processor 323B, and removing NCBs when they can be given to OTP 309.

Outbound TCP Processor (OTP 309):
OTP 309:
Provides an "idle" signal to RA 310.
Reads outbound TCP IOCBs from NRM 333 and ERM 311 via Request Arbiter 310.
Writes an IOCB to TTM 323. Once the IOCB is written to TTM 323, its format changes, and is stored as a DRB.
Sends requests to ODE 338 for OALs associated with an IOCB and handshakes them to TTM 323 to be written to Local RAM 337. OTP 309 distinguishes between linking a DAL to the last DRB written to TTM 323 and linking a DAL to the last OAL written to TTM 323.
Sends requests to TTM 323 to read an NCB from host memory, if the NCB is resident in the host as indicated by the H and opcode bits in an IOCB.
Sends requests to TTM 323 to read an NCB from RISC memory, if the NCB is resident in the RISC memory.
If an NCB is downloaded from host/RISC memory, OTP 309 fills in the remaining fields in the NCB and saves the NCB to local memory 337 if instructed to do so.
Sends a request to TTM 323 to read a resident NCB from Local RAM 337.
Updates any local NCB fields required (all local fields are initialized to 0) when an NCB is created (H bit in the first word of the IOCB).
Reads appropriate fields within the local NCB to determine if data and/or ACK packets are transmitted for the NCB. This occurs when the IOCB's are read down from the host/EP or when the request ready signal from TTM 323 is asserted.
If data transmission for an NCB is required, OTP 309 insures if a valid segment is transmitted. This may require reading data from the current DRB followed by reading data from a DRB linked to the NCB to fill the segment.
When all the data for a given DRB has been transmitted, OTP 309 writes the maximum sequence number used by the DRB before instructing TTM 323 to add the DRB to the delayed request list.
Instructs OIP 308 to build a header for data transmissions. OIP 308 uses the local NCB to build the header.
OTP 309 builds the TCP header and handshakes it to OIP 308.
Reads Address/Length pairs using the TTM 323 interface to determine where to fetch data for transmission. This includes recognizing and following chains using the fetch OAL command to TTM 323.

Sends requests to the DMA Manager for data to be transmitted using Address/Length pairs read from TTM 323 and handshakes this data to OIP 308.

When all the data has been transmitted for a DRB or no data can be transmitted due to window size, update appropriate fields and instruct TTM 323 to writeback the NCB to Local RAM 337.

When a request ready signal is asserted from TTM 323, OTP 309 checks the NCB to determine if an ACK packet was received that completes the DRB at the head of the delayed request list. This is done by comparing the sequence number of the oldest unacknowledged byte (Snd_Una Seq #) to the sequence number in the DRB. If a completion is required, OTP 309 sources and handshakes an Outbound TCP Completion to NCM 336. DRB data required for the completion is obtained from TTM 323. OTP 309 then writes a command to TTM 323 to remove the DRB from the head of the delayed request list then checks the next DRB (if it exists) to determine if another completion is required.

Build iSCSI digests if the appropriate bits are set in the NCB.

FIG. 3I show a block diagram, of OTP 309. The various modules (including module 309H and register block 309F) in OTP 309 access TTM 323 through main block 309C. The functionality of the plural components is shown below:

Completion Manager 309E: Sends completion requests to either the network or NCM 336. Requests are sent from the various components of OTP 309 indicating the type of completion message to send. Completion manager 309E gets additional data, if required, from TTM 323 before setting the cm_cdone signal.

Request Manager 309G: Downloads an IOCB, saves it in TTM 323, and determines what action needs to be taken. If this is an update or flush command, it passes the command to TTM 323 and exits. If data is included in the IOCB it has Outbound DMA Interface (also referred to as ODE Interface Module) 309A fetch the OAL chain and links them. After the NCB has all the information in it, control is passed to the Main Control block 309C to continue data processing. After Main Control block 309C is finished, request manager 309G saves the NCB.

Window Update Module 309D: Handles all requests from TTM 323 for processing. This includes updating window size, updating the retransmission/persist timers, sending completion messages, and removing DRBs if all the data has been acknowledged. After all information in an NCB has been updated, control is passed to Main Control block 309C to continue processing. After Main Control block 309C has finished, the Window update module 309D saves the NCB.

Main Control block 309C: Determines if a NCB is in a valid state to send data, how much data is to be sent, and if data should be sent based upon amount to send, window size, if the Nagle algorithm is enabled, and timer status. If there is a segment to send, Window Update Module 309D starts ODE Interface block 309A and waits for it to finish. After ODE Interface block 309A has finished, if there is more data to send, the process is repeated.

ODE Interface Module 309A: This module scans an OAL chain and then links the chain to an NCB, and then scans the DAL chain. Thereafter, it fetches the requested length of data from ODE 338 and passes the data to OIP 308. This block also requests OIP 308 to generate the TCP header for a new segment.

OIP Interface Module 309B: When requested by ODE Interface Block 309A, this block gets all data necessary from TTM 323 to generate a TCP header. While generating the header, this block locks the NCB and obtains the latest ACK information that it can. It then clears the delay ACK timer before unlocking the NCB. This module also requests OIP 308 to generate the IP header.

IPV 302A (FIG. 3J):

IPV 302A has been described above with respect to various other modules. The following describes various sub-modules of IPV 302A with respect to FIG. 3J. IPV 302A includes registers 302A2 and an input processor 302A1 that is coupled to MAM 301 and BLM 302. Input processor 302A1 receives input data from IFB 325, processes the data and sends it to output processor 302A3, which is coupled, to IFP 305. Input processor 302A1 is also linked with IDE 317 and ILM 324.

FIG. 3J1 shows process flow diagram for a buflet list structure, as processed by IPV 302A. The following describes the various process steps:

If IFB 325 has data to send to local RAM 337:
ifb_ipv_dav is asserted (FIFO has a complete frame to pass to memory) and blm_ipv_bav is asserted to start accepting frame.

dak and store first dword of data (status)

bak buflet from BLM 302. Save current buflet index and index of first buflet of frame, "frame head buflet."

1. Transfer frame to MAM 301.
    a) Send MAM 301 length strobe with length=minimum data [i.e. data remaining in FIFO 325 for the frame and space remaining in the buflet]
    b) Send MAM 301 address strobe with address=cur_buf adr+24
    c) Transfer data from FIFO (IFB) 325 to MAM 301 until either:
        i. The end bit from FIFO (IFB) 325 is set (indicating the end of the frame)
        ii. The number of bytes transferred in MAM 301 transaction=space remaining in the buflet (data_len=bufsize, indicating that the system should request another buflet.)
2. Check data in transit from FIFO (IFB) 325 to MAM 301:
Check type field (use header length in status word) to see if the frame is meant for IP
If for IP:
    Verify IP header length (>=5 words=20 bytes), header checksum, actual data length, ip version and discard packet and free buflets on any failure.
    Set buflet offset to skip over MAC header
    Calculate TCP/UDP checksum, including pseudo header for frames where "More Fragments" bit is not set.
3. Update data structures:
    a) If not the first buflet (frame head buflet), update the control fields of the current buflet, including updating the buf_lnk field to point to the next buflet if frame continues. This requires baking the next buflet.

buf_lnk=cur_buf_ind or NULL if last buflet of frame.

buffer_offset=24 signature=signature buflet_data_len=save_data_len

All other fields in buflet control are null.
    b) Update loc_buf_lnk_tail to point to the current buflet
    c) Increment the buflet_cnt
4. Loop control decision
    if 2ci) above was true, then go to step 6.
    if 2cii) above was true then there is more data for this frame in FIFO (IFB) 325.

Next buflet received from BLM 302 in step 4.

Repeat steps 2-5 with appropriate addresses and lengths until all the data for the frame has been transferred.

5. Frame verified and stored in local RAM 337
       a) Update control fields of frame head buflet buf_lnk=loc_buf_lnk buf_lnk_tail=loc_buf_lnk_tail_ind buffer_offset=if MAC: 26; if IP: 24+mac_hdr_len
    (26 because 24 for buflet control+2 bytes of alignment padding on mac header. (Mac_hdr_len includes this 2 bytes)

signature=signature buflet_count=buf cnt
    buflet_data_len=For a frame where this is the ONLY buflet: save_data_len for a frame with multiple buflets: bufsize tcp_checksum=tcp_checksum length=if MAC: frame_length−2 (align padding), if IP: IPLEN−(IPHL*4)

I=1'b0 B=B, M=M, MA=MA, opcode=MAC∥IP
    6. Forward processing:

If not IP: Pass address of the frame head buflet to IDE 317 for forwarding to Host 104.

If IP and not known address: Pass address of frame head buflet to IDE 317 for forwarding to Host.

If IP and know address: add frame to tail of IFP 305 input list.
    if !(empty) {
       lock_tail=1
       store tail_frm_lnk→frm_lnk=frm_hd_buf_ind
       new_elem_ind=frm_bd_buf_ind
       add_to_list=1
       lock_tail=0
    }
    else {
       new_elem_ind=frm_hd_buf_ind
       add_to_list=1
    }
    7. Error Processing:
       a) Continue normal processing and storing frame to MAM 301 until the MAC header, IP header and 8 bytes of the IP payload are stored.
       b) Continue to accept data out of FIFO (IFB) 325, but do not store to MAM 301 until end flag is set.
       c) Write back current buflet control field as normal.
       d) Write back frame head buflet control field as normal but with the following error values:

buf_lnk=16'b0 buf_lnk_tail=frm_hd_buf_ind (points to self)

buffer_offset=26 (skip buflet control fields and mac align padding only)

signature=signature buflet_count=1 buflet_data_len=24+mac_hdr_len+IPHL*4+8 tcp_checksum=16'b0 length=mac_hdr_len−2+IPHL*4+8

I=1'b1, B=B, M=M, MA=MA, opcode=IP
    e) Send address of frame head buflet to IDE 317.

f) Free rest of buflets through BLM 302 (loc_buf_lnk should still be pointing to the head of this list, and the last buflet has been linked on this list as usual through 'c' above.

Figure 3K:
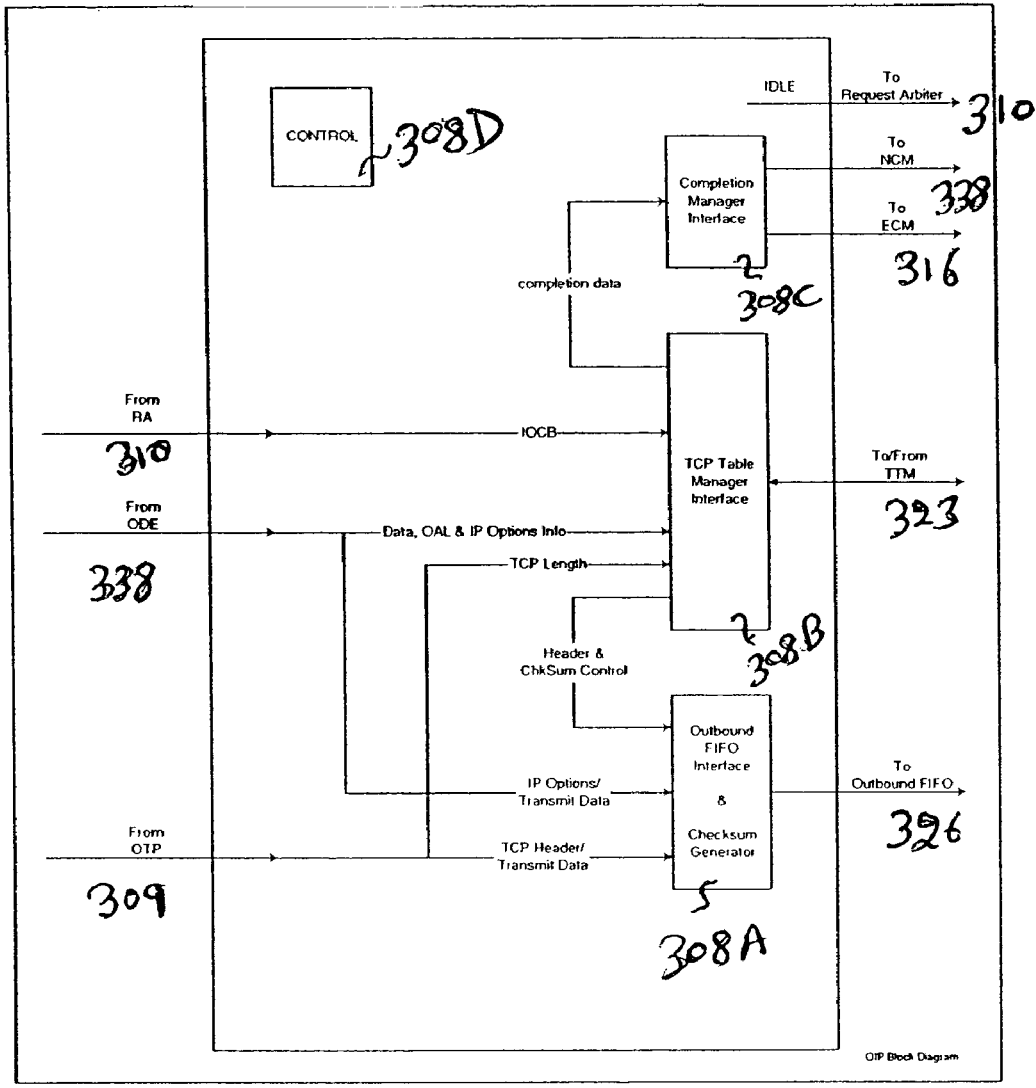
FIG. 3K shows a block diagram of an outbound IP/MAC processor, according to one aspect of the present invention.

OIP 308:

FIG. 3K shows a block diagram of OIP 308 showing various sub-modules, including Outbound FIFO Interface and checksum Generator 308A, TTM interface 308B and NCM interface 308C.

OIP 308 provide an "idle" signal to RA 310 and reads outbound IP or outbound MAC IOCB from RA 310 and passes to TTM 323 for temporary storage.

If it is an IP packet, OIP 308 requests TTM 323 to fetch the NCB from the host. After processing all the OALs in the IOCB, OIP 308 uses ODE 338 to fetch the OAL List associated with the IOCB and passes it to TTM 323. OIP 308 also reads the appropriate fields within the local NCB to build the IP and MAC Headers and writes these headers to Outbound FIFO OFB 326.

For source MAC address field, OIP 308 sends the index in the first byte to FIFO OFB 326. The MAC block converts this to a proper address. The index is taken from the first word of the NCB. The location of the source address in FIFO OFB 326 is maintained by padding it with zeros.

For IP packets, OIP 308 also calculates the IP header checksum and TCP checksum of the data as it passes through flags when the locations of the IP and TCP checksum fields are being passed to Outbound FIFO OFB 326; reads Address/Length pairs from TTM 323 and pass them to ODE 338 to fetch packet data.

OIP 308 handshakes data from ODE 338 and passes it to Outbound FIFO OFB 326 and byte packs data obtained from ODE 338/OTP 309. For an IP packet, OIP 308 also fragments data if the length from ODE 338 is greater than max_frame_size number of bytes (default 1500). This requires generation of a new header for each fragment.

OIP 308 sends completion error "Frame too long" if the IOCB request to add UDP checksum or a MAC header only transfer would cause data fragmentation because length is greater than max_frame_size number of bytes (default 1500).

OIP 308 also sends completion error "Frame too short" if the IOCB request to add UDP checksum and the Datagram Length is less than 8 bytes, MAC data transfer and the Datagram Length is less than 14 bytes, MAC data transfer with CRC disabled and Datagram Length is less than 64 bytes, or a MAC header only transfer has a Datagram Length of less than 20 (or any other number).

OIP 308 also sends "Frame padded" in the completion packet if the IOCB request MAC data transfer and the Datagram Length is less than, for example, 60 bytes.

When all the data has been sent, OIP 308 passes the IP packet and TCP checksums to Outbound FIFO OFB 326 with a flag, which indicates it is the actual checksum data inserted in the packet. The last word of data has an end bit set on it along with the length.

When all the data has been transmitted for an IOCB, OIP 308 generates a completion packet using data from the NCB/IOCB in TTM 323 and handshake this data to Completion Manager 309E.

Thereafter, OIP 308 stops transmitting packets (at the next possible packet boundary) while mac_pause_rxd is true.

Outbound FIFO interface 308A handles all handshaking in the outbound pipeline through a byte packer and calculates IP header checksum and TCP/UDP checksum. Outbound FIFO interface 308A uses dav/dak signals to transfer data. It calculates the IP header checksum and TCP checksum of the data as it passes through. It flags when the locations of the IP and TCP checksum fields are being passed to Outbound FIFO OFB 326; handshakes data from ODE 338, OTP 309, TTM Interface 308B and parses it to Outbound FIFO OFB 326; and byte packs data obtained from ODE When all the data has been sent, interface 308A passes the IP and TCP checksums to Outbound FIFO OFB 326 with a flag that indicates it is the actual checksum data to be inserted in the packet.

TTM interface 308B reads outbound IP IOCB from RA 310 and pass to TTM 323 for temporary storage and saves the H (mac_hdr_only), U (UDP_En), Opcode_Embedded, and D (Disable_Comp) bits in transit. Interface 308B requests TTM 323 to fetch the NCB from the host or EP based upon the Opcode_Embedded bit above. After processing all the OALs in the IOCB, it uses ODE 338 to fetch bytes of the OAL associated with the IOCB and passes it to TTM 323 for temporary storage. Interface 308B reads the appropriate fields within the local NCB to build the IP and MAC Headers and writes these headers to Outbound FIFO OFB 326.

When creating the source MAC address field, interface 308B passes the index to the correct MAC address registers instead of filling in the actual address. The MAC block converts this to the proper address. The index is taken from the first word of the NCB. IP length field is precalculated since it is placed in the header before some other IP header info.

a. Interface 308B flags the locations of the IP and TCP checksum fields with their start and end calculation to the OMI. Interface 308B reads Address/Length pairs from TTM 323 and passes them to ODE 338 to fetch packet data; handshakes data from ODE 338 is passed it to Outbound FIFO Interface 308A and fragments data if the length from ODE 338 is greater than max_frame_size number of bytes (default 1500). This requires the generation of a new header for each fragment.

IFP 305

Figure 3L:
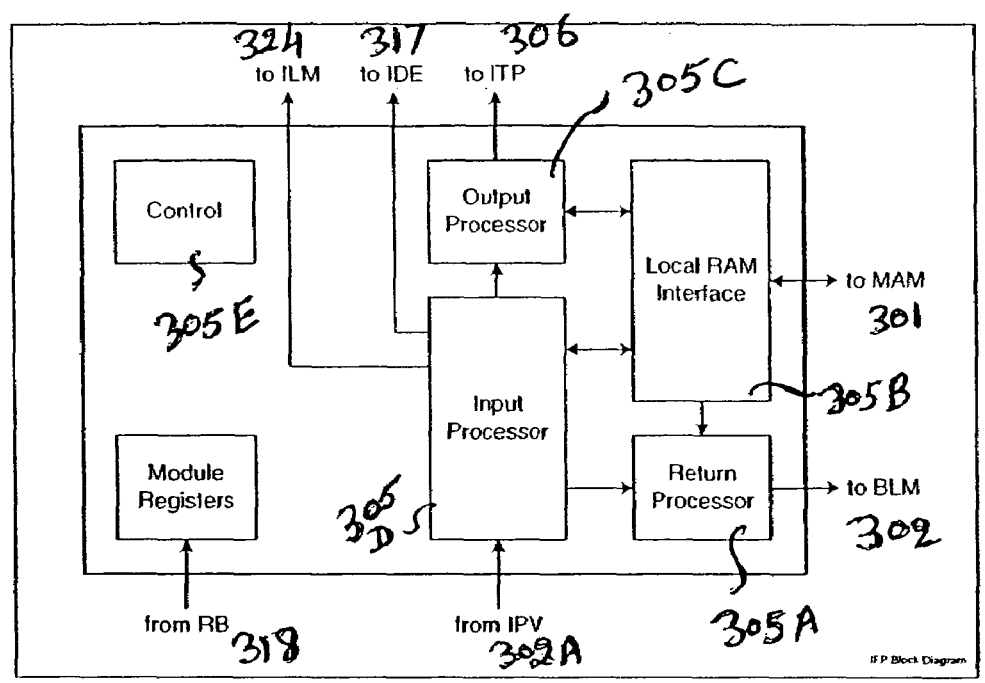
FIG. 3L shows a block diagram of an input fragment processor ("IFP"), according to one aspect of the present invention.
Figure 3L:
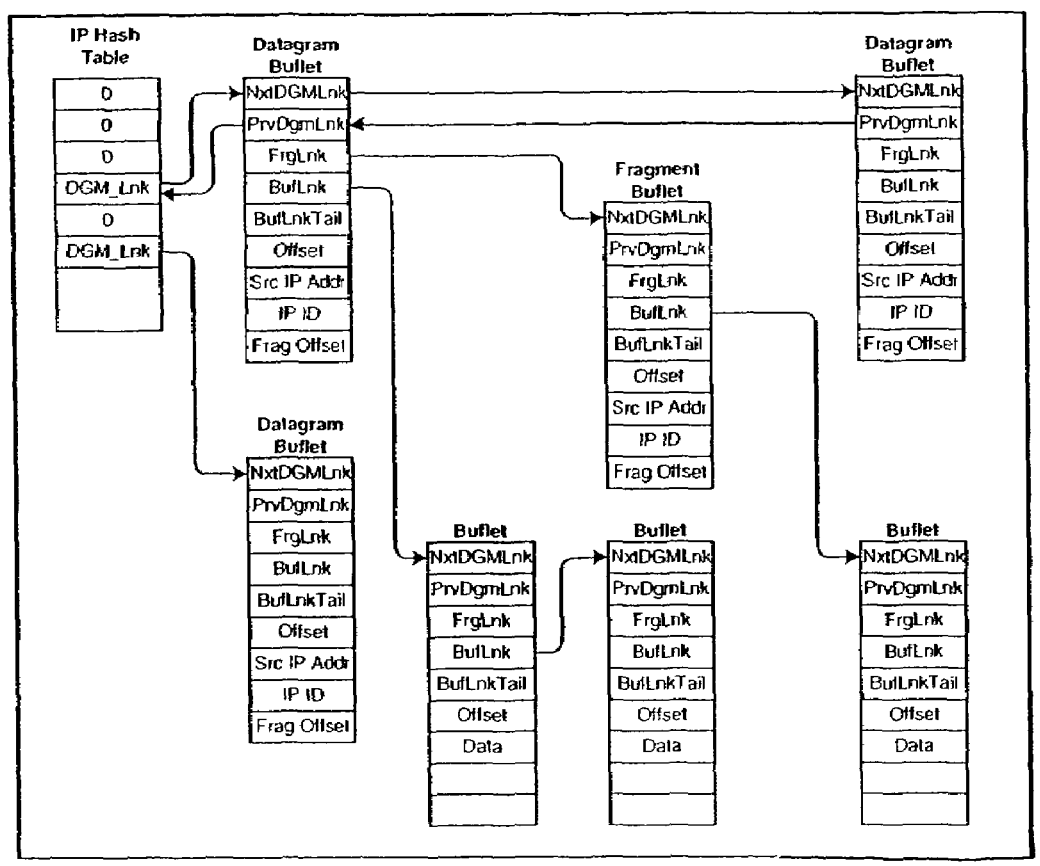

FIG. 3L shows a block diagram of IFP 305. The various aspects of IFP 305 with its sub-modules including local RAM interface 305B and control registers 305E will now be described. FIG. 3L1 shows a link list data flow diagram for IP reassembly as performed by IFP 305.

IFP 305 includes input processor 305D that is responsible for handshaking and parsing IP header data received from IPV 302A. Input processor 305D also assembles complete datagrams, including checking for timeout. It also provides buflets for completed datagrams to output processor 305C and provides timed out buflets to return processor 305A.

Figure 4B:
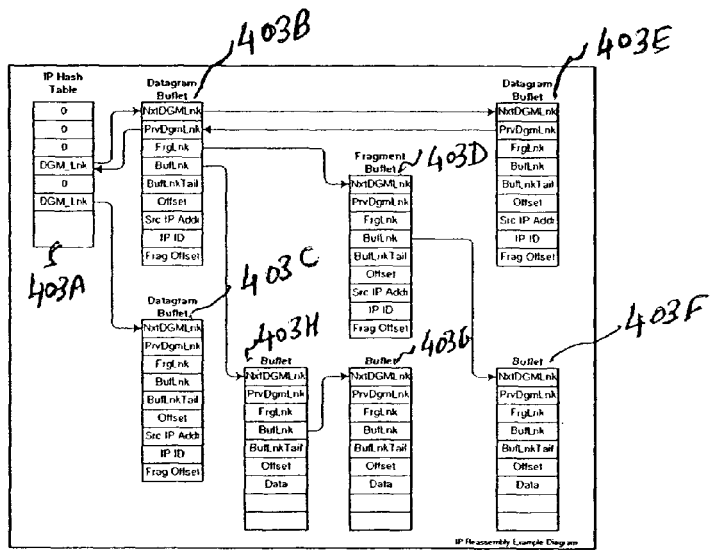
FIG. 4B shows an example of IP reassembly, according to one aspect of the present invention.

The following describes IFP 305 functionality including IP packet reassembly with respect to FIG. 3L1 (same as FIG. 4B).

Input Processor 305D handshakes received IP packet headers from IPV 302A. If the received IP packet from IPV 302A is a complete datagram, processor 305D passes the received IP packet header and buflet pointer to output processor 305C.

An "ipv_ifp_dav" signal from IPV 302A indicates that there is a frame for IFP 305 to process. Processor 305D accepts frame buflet address, status and IP header from IPV 302A. If the packet is a full datagram, the address of the first buflet of the frame is linked on the output queue. This queue of datagrams is sent to ITP 306. Each datagram may be identified by a 4-tuple {IPID, IPSRC, IPDST, IPP}. This identifier is hashed to a 16 bit value, using a 16 bit XOR function. A programmable number of bits are used to index into a hash table to search for a linked list of fragments.

If the packet is not full datagram, processor 305D checks if an entry already exists in reassembly list by hashing the IP 4-tuple and reading the corresponding hash table entry from MAM 301. Processor 305D checks the Valid bit in the returned entry to see if the entry is filled. If no entry exists in the hash table, an entry is made and the address of the first buflet of the frame is written in the entry with the Valid bit set. When the 1$^{st}$ fragment (fragment offset=0) of a datagram is added to the reassembly list, the first fragment flag is set in the status word in the 1$^{st}$ buflet.

If an entry already exists, the entry points to one or more datagrams that matched the hash. Processor 305D reads the IP header of the first frame associated with the hash from MAM 301. If the 4-tuple matches the 4-tuple of the current frame, the current frame is part of this existing datagram, if the tuple does not match IFP 305 follows the datagram link field in the buflet header and reads the IP header of the next frame on the datagram list for this hash entry from MAM 301 until a match is found or the end of list is reached.

If the datagram does not exist already, it is added to the end of the datagram list associated with the hash. When the 1$^{st}$ fragment of a datagram (fragment offset=0) is added to the reassembly list, the first fragment flag is set in the status word in the 1$^{st}$ buflet.

If the datagram is found on the list, the buflet for this fragment is added to the list of fragments for the datagram. The head of the datagram fragment list is saved. If the fragment is added as the first fragment of the datagram (fragment offset=0), the first fragment flag is set in the status word in the 1$^{st}$ buflet. If the fragment is the last fragment of the datagram, as signaled by the "more fragments" bit being clear in the IP header, the last fragment bit is set in the 1$^{st}$ buflet's status word.

When a fragment is added to the reassembly list, IFP 305 checks to see if the fragment is sequential to either the previous fragment or the next. If it is, Processor 305D trims the fragment and then buflinks the fragments. By doing this as each fragment arrives, the entire datagram is buflinked when that last fragment arrives and keeps IFP 305 from having to run the link list to do the required linking.

When fragments are combined, the partial TCP checksum fields are added together.

When a new datagram is added to the reassembly list, the timestamp field is set to current_time plus the programmable IP timeout value, typically 300 (30 seconds) and it is added to the tail of the timeout list.

If this is the first entry in the timer queue, this same value is loaded into the "head_timestamp_value" register.

Processor 305D then checks if the entire datagram is in memory, using the saved head of the datagram. The hardware checks if both the first and last fragment bits are set and that the fragment link is NULL. If the full datagram is present, the block removes the datagram from the reassembly list.

If the reassembled datagram is not destined for TCP, the address of the first buflet of the frame is passed to IDE 317 to send to host 104 for disposition.

If the reassembled datagram is destined for TCP, the address of the first buflet of the frame is added to the output queue. When there is an entry on the output queue, IFP 305 puts the address of the first buflet, the IP header, and the TCP header to Output FIFO 326, which handshakes this data to ITP 306. When finished, IFP 305 de-queues this item and determines if there are other items on the output queue, if so, the items are sent to ITP 306.

When IDLE, IFP 305 checks for timeout. If there is an entry on the timeout list, IFP 305 de-queues the entry (note that only entries at the head of the list can get de-queued). Because of this, de-queuing an entry means setting the "TO_list_head" to the entries "nx_TO_lnk". If TO_list_head is NULL, set "TO_list_tail" to NULL. The de-queued entry is given to BLM 302. It goes through frg_lnk and then to BLM 302.

FIG. 3L2 shows various sub-modules of input processor 305D, which are described below.

Input Register 305D4:

Input register 305D4 handshakes received IP packet headers from IPV 302A. If the received IP packet from IPV 302A is a complete datagram, it passes the received buflet pointer to output processor 305C.

If received IP packet is not a complete datagram, it signals Fragment Processor 305D2 to process the packet.

FIG. 3L3 shows a state machine diagram for input register 305D4, and the following describes the various states:

IDLE: Waits for data available signal from IPV 302A. When asserted, handshakes the data from IPV 302A and save in the input registers.

ld_irs=ipv_ifp_dav
xfer_cnt<=3

IR2OP: Transfer header data in reg0, reg1 and reg5 to output processor 305C.

ip_op_dav<=1 if (op_ip_dak)

xfer_cnt<=xfer_cnt−1 if (xfer_cnt=1)

ip_op_end<=1

WAIT_FP: Wait for the fragment processor 305D to complete

Fragment Processor 305D2:

FIG. 3L4 shows the sub-modules of fragment processor 305D2. Fragment processor 305D2 processes an IP packet that is not a complete datagram as described above. Each block in FIG. 3L4 represents a control state machine and associated logic to perform the tasks discussed above.

Fragment Processor Main 305D24 starts when the input register 305D4 determines that the packet currently being processed is a datagram fragment.

Fragment Processor Main 305D24 starts Hash logic 305D23, which calculates the hash, and if necessary runs the hash Nxt_Dgm_Lnk (see FIG. 3L1/4B) to try and find a match. If a match is found, the Fragment Processor 305D24 starts Place Data module 305D21, which determines where the received fragment is placed by running the Frg_Lnks.

If trimming is required, Placed Data module 305D21 starts the Trim Logic 305D22 to perform this function.

FIG. 3L5A-3L5C show the various state machine processes of Fragment main processor 305D24 to process IP datagrams. The following describes the various states:

IDLE: Wait for input register block to signal that it has received fragment for processing. Read the first 8 words pointed to by input register buflet pointer into the receive buflet registers, clearing the Nxt_Dgm_Lnk, Prv_Dgm_Lnk, and Frg_Lnk fields and updating the signature field.

If (frag & !ma_done)
ld_rxbr=1
mrd=1
buflet=ir.bp
offset=0
length=32

CHK_HASH_TBL: Check hash table: Read the Hash table entry (1 word) pointed to by the hash value computed by hash logic 305D23. Save the upper 16 bits from this read in treg1. If the V bit is set, signal hash logic 305D23 to check for a match of the 4 tuple.

buflet=hl.hash
mht=1
mrd=1
offset=0
length=4
if (ma_done)
treg1=ifp_rd_data[31:16]
treg2=16'h0000
hl.hcalc=ma_done & ifp_rd_data[0]

WR_HASH: Write the buflet pointer of the input registers to the hash table entry pointed to by hash value computed by the hash logic setting the V bit.

index=hl.hash
mht=1
mwr=1
length=4
data={hl.hash, 16'h0001}

WT_HASH: Wait for the hash logic 305D23 to complete. If the hash logic has a match, signal the place data logic to place the data and save the buflet pointer in treg1 to head datagram register.

If (!hl.hcalc & hl.match)
set_pl_dat=1
hddg=treg1

UD_PDG: Update the next datagram link of the last entry with the address of the received buflet. Update the receive buffer reg previous datagram link with the last entry.

mrmwl=1
index=treg2
offset=24
length=32
data=ir.bp
rxbr.pdgrm=treg2

WR_RXB: Write the 8 words in the receive buflet registers to memory. Buflet address is the buflet pointer in input registers.

wr_rxbr=1
mwr=1
index=ir.bp
offset=0
length=32
data=rxbr.dat

TMR_ADD: Signal the timer process to add the receive buflet address to the timer list.

WT_PLACE: Wait for the place data 305D21 state machine to complete. Check to see if the datagram was completed—Head frag link null, first and last bits set.

WT_CKSUM: Wait for the checksum calculation block to recalculate the tcp checksum.

RMV_DGM1: If P bit is set, write the Nxt_Dgm_Lnk of the receive buflet registers to the Hash table entry pointed to by the hash value computed by hash logic 305D23. If P bit is not set, read modify write memory address=Prv_Dgm_Lnk+7 update the Nxt_Dgm_Lnk at this location to the Nxt_Dgm_Lnk in the receive buflet registers.

If (rxbr.p_bit)
index=hl.hash
mht=1
mwr=1
offset=0
data=rxbr.ndg
else
index=rxbr.pdg
mrmwu=1
offset=28
data=rxbr.ndg RMV_DGM2: If P bit is set, read modify memory address=Nxt_Dgm_Lnk+12 set P bit. If the P bit is not set and the Nxt_Dgm_Lnk of the receive buflet registers is not null, read modify write memory address=Nxt_Dgm_Lnk+7 update the Prv_Dgm_Lnk at this location to the Prv_Dgm_Lnk in the receive buflet registers.
  If (rxbr.p_bit)
  index=rxbr.ndg
  mrmwu=1
  offset=12
  pb_ud=1
  else
  index=rxbr.ndg
  mrmwu=1
  offset=28
  data=rxbr.pdg RMV_DGM3: Update the PRV_DGM_LNK of the buflet pointed to by receive buflet registers Nxt_Dgm_Lnk to the hash index.
  index=rxbr.ndg
  mrmwl=1
  offset=28
  data=rxbr.pdg TMR_RMV: Signal timer processor 305D1 to remove the receive buflet address from the timer list.

PASS_2OUT: Signal input register 305D4 to handshake the IP packet header to output processor 305C.

GEN_COMP: Handshake the buflet pointer of the head of the datagram to completion processor 305D3.

Hash Logic 305D23:

Hash logic 305D23 calculates the hash value for the received ip packet when signaled by the fragment processor state machine, it runs the Nxt_Dgm_Link chain searching for a fragment link, which matches the 4-tuple of the received fragment. FIG. 3L8 shows the various state machine states and processes performed by hash logic 305D23. The following describes the process flow and the various states:

IDLE: Wait for hcalc to be set. When set read first 8 words of the buflet pointed to by treg1 and save in the temp buffer registers.
  index=treg1
  offset 0
  mrd=1
  length=32

CK_HDAT1: Read the 3 words of IP header data to include the 4-tuple. Check for a match between ipid, from the input register 305D23 and the ipid in the data from memory.
  index=treg1
  offset=tmpb_ipbofs
  mrd=1
  length=12

CK_HDAT2: Check for a match between ipp from the input register 305D23 and the ipp in the data from memory.

CK_HDAT3: Check for a match between ipsrc from the input register block and the ipsrc in the data from memory.

GET_NXT: Read the Nxt_Dgm_Lnk of the buflet pointed to by treg1 into treg.
  index=treg1
  offset=28
  mrd=1
  length=4
  if (ma_done)
  mn.treg1=ip_rd_data[31:16]
  mn.treg2=ip_rd_data[15:0]

FIG. 3L6A-3L6D shows the process flow diagram for Fragment Processor Place Data 305D21 state machines. The various states are described below:

IDLE: Wait for a place data request from the Fragment Processor 305D24. If a request occurs, read the first 8 words of the buflet pointed to by main treg1 and save in temp buflet registers.
  if (pl_dat & !ma_done)
  ld_tmpbr=1
  index=mn.treg1
  offset=0
  length=32
  mrd=1

CALC: "Calculate Position" Determine where the received fragment is placed relative to the tmp fragment.

UD_PDGM: "Update Previous Datagram" If the P bit is set in the temp buflet registers, write the hash table entry pointed to by Prv_Dgm_Lnk of the temp buflet registers with the receive buflet pointer. If the P bit is not set and the H bit is set, read, modify and write the Nxt_Dgm_Lnk of the buflet pointed to by Prv_Dgm_Lnk of the temp buflet registers with the receive buflet pointer.
  offset=0
  length=4
  if (tbr.p_bit)
  data={ir.bp, 16'h0000}
  index=tmpbr.pdgm
  mht=1
  mwr=1
  else if (tbr.h_bit)
  data=ir.bp
  index=tmpbr.ndgm
  mrmwu=1

BRANCH: Go to the correct state dependent on the calculated position of the receive fragment.

GET_NXT_DG: If backup, load the main temp_reg1 register with the last_frag address. If backup is not set, load the main temp_reg1 register with the Frg_Lnk from the temp buflet registers.
  mn.treg1=tmpbr.frg_lnk JOIN_P1: Copy the Nxt_Dgm_Lnk, Prv_Dgm_Lnk, Nxt_TO_Lnk, Prv_TO_Lnk, Frg_Lnk, Timestamp, Pbit and H bit from the temporary ("temp") buflet registers to the receive buflet register clearing these fields in the temp buflet registers
  rxbr.ndl=tmpbr.ndl
  rxbr.pdl=tmpbr.pdl
  rxbr.ntl=tmpbr.ntl
  rxbr.ptl=tmpbr.ptl
  rxbr.fl=tmpbr.fl
  rxbr.ts=tmpbr.ts
  rxbr.p_bit=tmpbr.p_bit

JOIN_P2:

If the Buf_Lnk field of the receive buflet registers is null, update it with the buflet address of the temp buflet (in treg1).
  If (rxblnk_null)
  rxbr.bl=mn.treg1

JOIN_P3: Write the Buf_Lnk field of the buflet pointed to by the Buf_Lnk_Tail of the receive buflet registers with the buflet address of the temp buflet registers (in treg1).

index=rxbr.bltl offset=0 length=4 data={mn.treg2, 16'h0000} mwr=1

JOIN_P4:

Load treg1 with the last fragment to go to "next".
mn.treg1=last_frag

Update the length field of the receive buflet registers with its value and the Length in the temp buflet registers.

new_len=rxbr.len+tmpbr.len rxbr.len=new_len

Update the Buflet Count field of the receive buflet registers with its value plus the Buflet Count field of the temp buflet registers.

new_cnt=rxbr.cnt+tmpbr.cnt rxbr.cnt=new_cnt

Update the Buf_Lnk_Tail of the receive buflet registers with the Buf_Lnk_Tail of the temp buflet registers.

rxbr.bltl=tmpbr.bltl

Update the checksum field of the receive buflet registers with its value+the checksum filed of the temp buflet registers.

new_cksum=rxbr.cksum+tmpbr.cksum rxbr.cksum=new_cksum

JOIN_N1:

If the Buf_Lnk field of the temp buflet registers is null, update it with the buflet address of the receive buflet. If (tmpblnk_null)

tmpbr.bl=ir.bp

If the Frg_link field of the temp buflet registers is equal to the buflet pointer of the receive buflet registers, update it with the Frg_link in the receive buflet registers (This is null if the datagram is complete).

if (tmpbr.fl==rxbr.fl)

tmpbr.fl=rxbr.fl

JOIN_N2: Write the Buf_Lnk field of the buflet pointed to by the Buf_Lnk_Tail of the temp buflet registers with the buflet address of the receive buflet address.

index=tmpbr.bltl
offset=0
length=4
data={mn.treg2, 16'h0000}
mwr=1

JOIN_N3:

Update the length field of the temp buflet registers with its value and the Length in the receive buflet registers.

new_len=rxbr.len+tmpbr.len tmpbr.len=new_len

Update the Buflet Count field of the temp buflet registers with its value plus the Buflet Count field of the receive buflet registers.

new_cnt=rxbr.cnt+tmpbr.cnt tmpbr.cnt=new_cnt

Update the Buf_Lnk_Tail of the temp buflet registers with the Buf_Lnk_Tail of the receive buflet registers.

tmpbr.bltl=rxbr.bltl

Update the checksum field of the temp buflet registers with its value+the checksum field of the receive buflet registers.

new_cksum=rxbr.cksum+tmpbr.cksum tmpbr.cksum=new.cksum

FRAG_LNK_N: Update the Frg_Lnk of the temp buflet registers with the receive buflet pointer.

tmpbr.fl=ir.bp

FRAG_LNK_P: Update the Frg_Lnk of the receive buflet registers with the temp buflet pointer. If the h_bit is set in the temp buflet registers, copy the Nxt_Dgm_Lnk, Prv_Dgm_Lnk, Nxt_TO_Lnk, Prv_TO_Lnk, Timestamp, and the P bit from the temp buflet registers to the receive buflet register clearing these fields in the temp buflet registers.

rxbr.fl=tmpbr.fl tmpbr.fl=0 if (tmpbr.h_bit)

mn.treg2=ifp_rd_data rxbr.ndl=tmpbr.ndl rxbr.pdl=tmpbr.pdl rxbr.ntl=tmpbr.ntl rxbr.ptl=tmpbr.ptl rxbr.fl=tmpbr.fl rxbr.ts=tmpbr.ts rxbr.p_bit=tmpbr.p_bit FREE_RX: Pass the receive buflet pointer to the return processor 305A to be freed.

free_req=1 buf2free=ir.bp

FREE_TMP1: Copy the following fields from the temp buflet registers to the receive buflet registers:

Timestamp, Nxt_TO_Lnk, Prv_TO_Lnk, Frg_Lnk, Nxt_Dgm_Lnk, Prv_Dgm_Lnk, and P bit. Pass the temp buflet pointer to the return processor to be freed. If the tmpbr frag link !=0, Load treg1 with the frag link in the temp buflet registers.

free_req=1 buf2free=mn.treg1 if (free_idle)

mn.treg2=ifp_rd_data rxbr.ndl=tmpbr.ndl rxbr.pdl=tmpbr.pdl rxbr.ntl=tmpbr.ntl rxbr.ptl=tmpbr.ptl rxbr.fl=tmpbr.fl rxbr.ts=tmpbr.ts rxbr.p_bit=tmpbr.p_bit FREE_TMP2: If the H bit is not set, read modify write address=last_frag.frag_lnk data=ir.bp (write the frag link field of the previous fragment with the address of the receive buflet).

If (!tmpbr.h_bit)

index=last_frag offset=?

data=ir.bp mrmwl=1

WR_RXBR: Write the receive buffer registers to memory.

wr_rxbr=1 index=ir.br offset=0 length=32 data=rxbr.data
 mwr=1
 mn.treg1=last_frag
 WR_TMPBR: Write the temp buffer registers to memory.

wr_tmpbr=1 index=mn.treg1 offset=0 length=32 data=tmpbr.data
 mwr=1
 Fragment Processor Trim Logic 305D22:
 Fragment Processor Trim Logic 305D22 performs different functions depending on the location of the received fragment relative to a temp fragment. If the receive fragment is located "before" the temp fragment, Fragment Processor Trim Logic 305D22 calculates the amount of data to save in the receive fragment then updates the buflet and or buflets linked through the buf link chain correctly.

If the receive fragment is located "after" the temp fragment, Fragment Processor Trim Logic 305D22 calculates the amount of data to trim from the beginning of the received fragment then updates the buflet and/or buflets linked through the buf link chain correctly.

FIG. 3L7A-3L7B shows various states for Fragment Processor Trim Logic 305D22 state machines. The following describes the various states:

IDLE: Wait for a trim data request from the Place Data State Machine. Calculate the new fragment length for the received fragment.

If (ptrim)
 Pre_calc=rx_begin−tmp_begin

Else
 Pre_calc=tmp_end−rx_end

Wk_len=pre_calc
 UD_LEN: Load the length of the receive buflet registers with the new length (new_len). Load wk_len with the amount of data to save or the amount of data to trim.

rxbr.len=new_len

If (ptrim)
 Pre_calc=rx_begin−tmp_begin

Else
 Pre_calc=rx_begin−tmp_end

Wk_len=pre_calc
 NTRIM: Determine if the current receive buflet has data equal to or less than the amount of data to be trimmed.
 NUPD_BUF: Load the Buflet Data_Len of the receive buflet registers with 0. Set the Buffer_Offset to the buf_size. Save the address in Buf_Lnk of the receive buflet registers (temp_reg2).

New_bdlen=0 rxbr.bdl=new_bdlen

New_ofs=buf_size rxbr.ofs=new_ofs mn.treg2=rxbr.bl

Wk_len=wk_len−buf_len

NWR_BUF: Write the receive buflet registers to memory.

wr_rxbr=1 index=ir.rb offset=0 length=32 mwr=1
 NRD_BNXT: Read the first 8 words of the buflet pointed to by Buf_Lnk of the receive buflet registers (address=treg2) into the receive buflet registers.

ld_rxbr=1 index=treg2 offset=0 length=32 mrd=1
 NLAST_BUD: Load the Buflet Data_Len of the receive buflet registers with the calculated length (new_bdlen). Load the Buffer Offset of the receive buflet registers with the calculated offset (new_bofs).

new_bdlen=bdlen rxbr.bdl=new_bdlen

New_ofs=bofs rxbr.ofs=new_ofs
 PTRIM: Determine if the current receive buflet has data equal to or less than the amount of data to be saved (wk_len). Save the address in Buf_Lnk of the receive buflet registers (temp_reg2).
 Mn.treg2=rxdr.bl
 PUPD_BUF: Load the Buflet Data_Len of the receive buflet registers with the Buflet Data Length−Working Length (new_bdlen). Save the address in Buf_Lnk of the receive buflet registers (temp_reg2).
 Mn.treg2=rxbr.bl
 New_bdlen=bdlen
 rxbr.bdl=new_bdlen
 PWR_BUF: Write the receive buflet registers to memory.
 wr_rxbr=1
 index=ir.rb
 offset=0
 length=32
 mwr=1
 PRD_BNXT: Read the first 8 words of the buflet pointed to by Buf_Lnk of the receive buflet registers (address=temp_reg2) into the receive buflet registers.
 ld_rxbr=1
 index=treg2
 offset=0
 length=32
 mrd=1
 PCLR_BUF: Clear the Buflet Data Length of the receive buflet registers.
 New_bdlen=0 rxbr.bdl=new_bdlen
 Timer Processor 305D1:
 Timer processor 305D1 maintains a linked timer list for IP datagram fragments and provides an "idle" signal to Fragment Processor. Timer processor 305D1 adds items to the end of the list and replaces items on the list when signal asserted by Fragment Processor. Timer processor 305D1 maintains timestamp of the item at the head of the list and generate a timeout signal if the item times out.

FIG. 3L9 shows various timer processor 305D1 states, which are described below:

IDLE: Wait for an add, remove, or swap request from the fragment processor 305D2. If remove request and head equals tail (1 item on the list), clear the head and the tail. If add request, load the rxbr.timeout with the to_value register. If add request and the list is empty, load the head and the tail with the new entry and load the to_value register with the timeout value. If swap request and head equals tail (1 item on the list), load the head and the tail with new index ir.bp.

UPD_TAIL: Read and modify upper the Nxt_TO_Lnk of the tail register with ir.bp. Update rxbr.Prv_TO_Lnk with the tail register.
  Index=tail
  Offset=20
  Length=4
  Rmwu=1
  Data=ir.bp READ_NEWTO: Read the timeout value of the new head and load the to_value register with this value.
  Index=rxbr.nextto
  Offset=16
  Length=4

UD_PREV: Read, modify and write the next timeout link of the buflet pointed to by tmpbr.prevto with tmpbr.nextto. If mn.treg1 equals tail, load tail with tmpbr.prevto.
  Rmwu=1
  Index=tmpbr.prevto
  Offset=20
  Length=4
  Data=tmpbr.nextto UD_NXT: Read, modify and write the previous timeout link of the buflet pointed to by tmpbr.nextto with tmpbr.prevto.
  Rmwl=1
  Index=tmpbr.nextto
  Offset=20
  Length=4
  Data=tmpbr.prevto LD_NEWHD: Load the head pointer with the new buflet pointer (ir.newbp).

SWAP_PREV: Read, modify and write the next timeout link of the buflet pointed to by the tmpbr.prevto with ir.bp. If treg1 equals tail, load tail with ir.bp
  Rmwu=1
  Index=tmpbr.prevto
  Offset=20
  Length=4
  Data=ir.bp SWAP_NXT: Read, modify and write the previous timeout link of the buflet pointed to by tmpbr.nextto with ir.bp.
  Rmwl=1
  Index=tmpbr.nextto
  Offset=20
  Length=4
  Data=ir.bp Output Processor 305C:

Output processor 305C maintains an "output list" of IP datagrams destined for TCP and maintains a register array to store header data destined for TCP. Processor 305C accepts a buflet pointer from processor 305D for received IP datagrams destined for TCP.

If the output list and the register array are empty, processor 305C handshakes the header data that follows the buflet pointer from processor 305D to the cut-thru register array and reads the buffer offset field and IP header length from memory to determine beginning of TCP header.

Processor 305C also reads the TCP header (20 bytes) and TCP options (12 bytes) from memory and writes to the output register array. If the output list or the register array is not empty. Drop the header data from the input processor on the floor and add the buflet pointer to the output list.

FIG. 3L10 shows the various states of Output processor 305C state machines. The various states are described below:

IDLE: State machine is waiting input to do the following in order:
  Load output register with the next item on the list.
  Load the output register with data from the input processor.
  Add the index from the input processor 305D to the head & tail if the output register is full and the list is empty.
  Add the index from the input processor to the tail of the list if the output register full and the list is not empty.

WR_TAIL:
  1) Assert op_ip_dak for as long as ip_op_dav is asserted to drain the ip data registers
  2) Write address of buflet pointer from the input processor to frag_lnk field of previous tail pointer.
  3) When ma_done is asserted, update the tail with the buflet pointer from the input processor.

DRAIN_IP: If data remain in the IP data registers (ip_op_dav is asserted), assert op_ip_dak until the registers are empty (~ip_op_dav).

SNP_BCTL: Store first 3 words of data to pass to ITP from IP into Cut-Through array.

RD_BCTL: Read words 2-6 of buflet control fields of head buflet and store buflet index, Checksum, length, and flags in register array.

RD_IPHDR: Read IP source address and store in register array.

RD_TCPHDR: Read TCP header and max size TCP options of head buflet and store in register array.

Return Processor 305A:

Return processor 305A takes buflets from input processor 305D and returns them and any frg_lnked buflets to BLM 302. FIG. 3L11 shows the various states of return processor 305A state machine(s). The various states are described below:

IDLE: Assert rp_ip_idle and wait for a fragment/buflet to return to BLM 302.

if (ip_rp_remove)
  curr_buf <=ip_rpbuf_ptr
  set curr_ff
  clear rp_ip_idle

RD_FRG_LNK: Read the frag_lnk field of the buflet pointed to by curr_buf.

If (ma_done)
  curr_buf <=ifp_rd_data
  curr_ff <=(ifp_rd_data !=0)
  ifp_free_adr<=curr_buf
  ifp_free_bav<=curr_ff FW_FRG: Release the buflet chain to BLM 302.

If (ifp_free_bak)
  if (curr_ff)
    set up read of next of frag_lnk field of buflet pointed to by curr_buf
  else
    set rp_ip_idle Although the present invention has been described with reference to specific embodiments, these embodiments are illustrative only and not limiting. Many other applications and embodiments of the present invention is apparent in light of this disclosure.

What is claimed is:

1. A hardware engine for completely offloading Transmission Control Protocol/Internet Protocol (TCP/IP) protocol processing both in a transmit path and a receive path from a host system software stack, comprising:

an inbound MAC Receive state machine for receiving a network packet and passing the network packet to an inbound memory buffer;

an inbound IP verifier hardware state machine for verifying IP packet headers if the received packet from the network is an IP packet;

an inbound IP fragment processing state machine for processing and reassembling IP packet fragments into an IP datagram that is stored in a local memory for the hardware engine; wherein the inbound IP fragment processing state machine assigns a timer to each IP datagram with a timeout value, and if a timeout occurs then the entire datagram is removed from a reassembly list and storage space associated with the timed out datagram is assigned to a free buffer list that is maintained by a buffer list manager, where the buffer list manner implements a hardware state machine to manage storage space in the local memory and grants free buffer space when available to the inbound IP verifier hardware state machine; and an inbound TCP hardware state machine for (a) processing TCP segments received from an IP layer by completely offloading TCP/IP protocol stack processing from the host system software stack to hardware; (b) re-ordering out of order TCP segments and then transferring the TCP data to the host system; and (c) transferring data from an iSCSI connection to a processor that processes iSCSI frames: wherein the inbound TCP hardware state machine retrieves a network control block from a TCP table manager and updates network state information in the network control block and maintains a segment reassembly list for each network connection;

wherein the inbound IP verifier state machine passes non-IP data packets to the host system via an inbound direct memory access engine (IDE).

2. The hardware engine of claim 1, wherein the inbound IP verifier hardware state machine verifies IP packet header information and if the header information is valid, then temporarily stores the packet in the local memory and if the header information is not valid then the packet is discarded and an address for a memory buffer for the discarded packet is passed to the buffer list manager.

3. The hardware engine of claim 1, wherein the inbound IP verifier state machine passes complete IP datagrams to the host that are non-TCP packets via the IDE.

4. The method of claim 1, wherein the TCP Table Manager maintains timer functions for all TCP connections at any given time in the hardware engine and maintains a linked list of network control blocks for processing network data sent by the hardware engine and received by the hardware engine.

5. A system for processing network data packets using a hardware engine coupled to a host system and a network, comprising:

a verification module that verifies incoming network data packets;

a first in-bound transmission control protocol (TCP) processor for (a) processing TCP segments received from a network by completely offloading a TCP/IP (Internet Protocol) protocol stack processing from a host system software stack to hardware; (b) re-ordering out of order TCP segments and then transferring TCP data to the host system; and (c) transferring data from an iSCSI connection to a second in-bound processor that processes iSCSI frames and non-TCP data; wherein the first in-bound TCP processor retrieves network control blocks and updates network state information in the network control block and maintains a segment reassembly list for each network connection;

a first outbound processor that obtains connection state information from a network control block; builds a TCP header and sends TCP data to the network;

a second outbound processor that processes media access control (MAC) and IP transfer requests;

a fragment processor that receives data packet fragments and reassembles the data packet fragments into complete datagrams for delivery; wherein the fragment processor assigns a timer to each datagram with a timeout value and if a timeout occurs then the entire datagram is removed from a reassembly list and storage space associated with the timed out datagram is assigned to a free buffer list that is maintained by a buffer list manager where the buffer list manager implements a hardware state machine to manager storage space in a local memory and grants free buffer space when available to the verification module;

a third outbound processor for processing small computer system interface (SCSI) requests received from the host system via a hardware TCP stack; and a TCP Table manager that interfaces with the first outbound TCP processor, the first in-bound TCP processor, the second in-bound processor and the third outbound processor; the TCP Table Manager maintains timer functions for all TCP connections at any given time in the hardware engine and maintains a linked list of network control blocks for processing network data sent by the hardware engine and received by the hardware engine.

6. The system of claim 5, wherein the second outbound processor builds a header for IP data requests based on entries from a network control block maintained at the local memory.

7. The system of claim 5, wherein the first outbound TCP processor builds TCP header data and passes the header data to the second outbound processor.

8. The system of claim 5, wherein the verification module passes non-IP data packets to a host via an inbound direct memory access module.

9. The system of claim 5, wherein the verification module verifies IP data packet header information and if the header information is valid, then the data packet is added to a list maintained by the verification module at the local memory.

10. The system of claim 5, wherein the fragment processor sets a flag if overlapping datagrams are received, and the flag indicates when a TCP checksum is to be performed.

11. The system of claim 5, wherein the first inbound TCP processor re-orders out of order data segments.

12. The system of claim 5, wherein the first inbound TCP processor maintains a segment re-assembly list for each network connection and is linked with a network control block.

13. The system of claim 5, wherein the first inbound TCP processor includes a receive block that receives data; a validation block that validates data segments; and an option block for validating a TCP timestamp that is found in TCP option data; and an acknowledgement processor that performs TCP acknowledgement processing.

14. The system of claim 5, wherein the first inbound TCP processor receives a data segment with a TCP header and option data.

15. A system for processing incoming TCP data packets received by a hardware engine that is coupled to a network and a host system, comprising:

an input TCP processing module that includes:

(a) an input processing module that determines if a TCP connection is established and checks for TCP flags to determine if a TCP data packet should be processed; wherein the input processing module obtains a network control block from a TCP table manager for a valid TCP data packet; and the TCP table manager maintains timer functions for all TCP connections at any given time in the hardware engine and maintains a linked list of network control blocks for processing network data sent by the hardware engine and received by the hardware engine;

(b) an acknowledgement processor module that interfaces with the input processing module, where the acknowledgement processor module (i) handles any acknowledgement information included in the TCP data packet; and (ii) updates TCP congestion window for a TCP connection; and (c) a Data processor module that handles any data included in the TCP data packet and if a TCP data packet does not have to be discarded or sent to the host system; wherein the first input processing module validates and saves TCP timestamps by checking if a received timestamp is greater than a most recently saved timestamp; and wherein the hardware engine completely offloads TCP/IP protocol processing from a host system software.

16. The system of claim 15, wherein the Data Processor module determines if a received packet was in order or out of order and trims the packet if it requires trimming before sending the packet to a destination.

17. The system of claim 15, wherein the TCP Table Manager provides a read/write register interface to allow simultaneous access to fields within the network control blocks.

* * * * *

UNITED STATES PATENT AND TRADEMARK OFFICE
CERTIFICATE OF CORRECTION

PATENT NO.        : 7,403,542 B1                                    Page 1 of 2
APPLICATION NO. : 10/620040
DATED             : July 22, 2008
INVENTOR(S)       : Michael I. Thompson It is certified that error appears in the above-identified patent and that said Letters Patent is hereby corrected as shown below:

In column 1, line 18, delete "PACKETS"." and insert -- PACKETS", --, therefor.

In column 4, line 44, after "includes" insert -- , --.

In column 7, line 39, delete "203." and insert -- 203, --, therefor.

In column 8, line 11, delete "201A." and insert -- 201A, --, therefor.

In column 8, line 55, delete "PCT." and insert -- PCI. --, therefor.

In column 25, line 19, delete "t_Idle" and insert -- t_idle --, therefor.

In column 33, line 11, delete "ORDER" and insert -- Order --, therefor.

In column 34, line 22, delete "(399A." and insert -- (399A, --, therefor.

In column 34, line 30, delete "399G." and insert -- 399G, --, therefor.

In column 34, line 55, delete "NCB(S)" and insert -- NCB(s) --, therefor.

In column 35, line 66, after "equal" insert -- , --.

In column 36, line 5, after "elapsed" insert -- , --.

In column 36, line 7-8, after "ACK." delete "If the delayed ACK timer has elapsed, TTM 323 places the NCB on outbound request list to have OTP 309 send an ACK.".

In column 41, line 7, delete "_Ink" and insert -- _lnk --, therefor.

In column 41, line 15, delete "buf cnt" and insert -- buf_cnt --, therefor.

Signed and Sealed this

Twenty-sixth Day of October, 2010

David J. Kappos
*Director of the United States Patent and Trademark Office*

CERTIFICATE OF CORRECTION (continued)
U.S. Pat. No. 7,403,542 B1

In column 43, line 4, after "ODE" insert -- 338/OTP309/TTMI 308B. --.

In column 55, line 21, in claim 1, delete "manner" and insert -- manager --, therefor.

In column 55, line 33, in claim 1, delete "frames:" and insert -- frames; --, therefor.

In column 56, line 19, in claim 5, delete "manager" and insert -- manager, --, therefor.

In column 56, line 21, in claim 5, delete "manager" and insert -- manage --, therefor.